(12) United States Patent
De Bruin

(10) Patent No.: US 11,786,035 B2
(45) Date of Patent: Oct. 17, 2023

(54) CABINET LEVELLING APPARATUS

(71) Applicant: Designerscope Limited, Albany (NZ)

(72) Inventor: Wim Jan De Bruin, Albany (NZ)

(73) Assignee: Designerscope Limited, Albany (NZ)

( * ) Notice: Subject to any disclaimer, the term of this patent is extended or adjusted under 35 U.S.C. 154(b) by 242 days.

(21) Appl. No.: 16/644,129

(22) PCT Filed: Sep. 4, 2018

(86) PCT No.: PCT/IB2018/056717
§ 371 (c)(1),
(2) Date: Mar. 3, 2020

(87) PCT Pub. No.: WO2019/043660
PCT Pub. Date: Mar. 7, 2019

(65) Prior Publication Data
US 2020/0405054 A1    Dec. 31, 2020

(30) Foreign Application Priority Data
Sep. 4, 2017 (NZ) ........................ 735236

(51) Int. Cl.
*A47B 91/02* (2006.01)
*B25B 13/48* (2006.01)
(Continued)

(52) U.S. Cl.
CPC .......... *A47B 91/024* (2013.01); *B25B 13/481* (2013.01); *B25B 17/00* (2013.01);
(Continued)

(58) Field of Classification Search
CPC .............. F16M 2200/08; A47B 91/024; A47B 91/026; F25D 2323/0011; B25B 13/481; B25B 17/00
See application file for complete search history.

(56) References Cited

U.S. PATENT DOCUMENTS

| 809,078 A | 1/1906 | Seymour |
| 1,073,294 A | 9/1913 | Siewert |

(Continued)

FOREIGN PATENT DOCUMENTS

| AU | 2009227484 B2 | 7/2013 |
| CN | 1701198 A | 11/2005 |

(Continued)

OTHER PUBLICATIONS

International Search Report issued in PCT/NZ2014/000215 dated Mar. 30, 2015.

(Continued)

*Primary Examiner* — Bradley Duckworth
(74) *Attorney, Agent, or Firm* — Arnold & Porter Kaye Scholer LLP

(57) ABSTRACT

An apparatus for adjusting a height adjustable leg for supporting a cabinet, appliance or structure is described. The apparatus includes a foot of a height adjustable leg and a tool comprising a driving member and a torque input for applying torque to the driving member. The foot includes a rotatable foot part with a driven member and a base part to support the rotatable foot part on a floor or supporting surface. The tool and the foot are complementarily adapted to releasably maintain engagement between the driving member and the driven member to allow the driving member to drive the driven member to rotate the rotatable foot part about a longitudinal axis of the leg for height adjustment of the leg.

17 Claims, 34 Drawing Sheets

(51) Int. Cl.
*B25B 17/00* (2006.01)
*B25B 23/00* (2006.01)

(52) U.S. Cl.
CPC ......... *A47B 91/026* (2013.01); *B25B 23/0014* (2013.01); *B25B 23/0028* (2013.01)

(56) References Cited

U.S. PATENT DOCUMENTS

| | | | |
|---|---|---|---|
| 1,632,383 | A | 6/1927 | Seiden et al. |
| 2,512,068 | A | 6/1950 | Mayo |
| 2,828,578 | A | 4/1958 | McCabe |
| 2,906,153 | A | 9/1959 | Erb |
| 4,991,805 | A | 2/1991 | Solak et al. |
| 5,292,095 | A | 3/1994 | Cattaneo |
| 5,709,136 | A | 1/1998 | Frenkel |
| 5,967,472 | A | 10/1999 | Wilhelmstatter et al. |
| 6,070,840 | A * | 6/2000 | Kelley ................. A47B 9/04 248/188.4 |
| 6,135,401 | A | 10/2000 | Chen |
| 6,279,860 | B1 | 8/2001 | Swanger |
| 6,910,665 | B2 | 6/2005 | Avendano et al. |
| 7,293,484 | B2 | 11/2007 | Liu |
| 7,500,412 | B1 | 3/2009 | Maciejewski |
| 7,556,227 | B2 | 7/2009 | Thuelig |
| 7,762,158 | B2 | 7/2010 | Shieh et al. |
| 7,934,440 | B2 | 5/2011 | Samudosky |
| 8,727,301 | B2 | 5/2014 | Arslankiray et al. |
| 8,960,633 | B2 | 2/2015 | Hunze |
| D769,095 | S | 10/2016 | De Bruin et al. |
| D793,194 | S | 8/2017 | De Bruin et al. |
| D796,882 | S | 9/2017 | De Bruin et al. |
| 10,006,582 | B2 * | 6/2018 | Ozyuksel ................. F16H 1/16 |
| 10,278,500 | B2 * | 5/2019 | De Bruin ............. D06F 39/125 |
| 10,765,209 | B2 * | 9/2020 | De Brun ................ A47B 91/02 |
| 2003/0136887 | A1 | 7/2003 | Gabriel |
| 2005/0247834 | A1 | 11/2005 | Teulig |
| 2006/0162505 | A1 | 7/2006 | Choi et al. |
| 2006/0162508 | A1 | 7/2006 | Liu |
| 2008/0168855 | A1 | 7/2008 | Giefer et al. |
| 2009/0090220 | A1 | 4/2009 | Kimberly |
| 2011/0297802 | A1 | 12/2011 | Gennaretti et al. |
| 2012/0280607 | A1 | 11/2012 | Doberstein et al. |
| 2012/0297939 | A1 | 11/2012 | Spata |
| 2016/0235200 | A1 | 8/2016 | De Bruin |
| 2019/0331287 | A1 * | 10/2019 | Olsen ....................... F16M 7/00 |
| 2020/0383475 | A1 * | 12/2020 | Mulligan ........... B25B 23/0021 |

FOREIGN PATENT DOCUMENTS

| | | | |
|---|---|---|---|
| CN | 201303926 Y | 9/2009 | |
| CN | 202140751 U | 2/2012 | |
| CN | 202184706 U | 4/2012 | |
| CN | 102654724 | 5/2012 | |
| CN | 102654724 A | 9/2012 | |
| CN | 203023749 U | 6/2013 | |
| DE | 25 54 109 A1 | 6/1976 | |
| DE | 25 54 138 A1 | 7/1976 | |
| DE | 29 03 835 A1 | 4/1980 | |
| DE | 8908536 U1 | 10/1989 | |
| DE | 10124092 A1 | 1/2003 | |
| DE | 102004 050362 A1 | 4/2006 | |
| DE | 202015001689 U1 | 6/2015 | |
| EP | 0 292 921 A2 | 11/1988 | |
| EP | 0 321 005 B1 | 2/1992 | |
| EP | 0 783 855 A1 | 7/1997 | |
| EP | 0 904 899 A2 | 3/1999 | |
| EP | 1 313 180 A2 | 5/2003 | |
| EP | 3 055 603 A2 | 8/2016 | |
| EP | 3138445 A1 * | 3/2017 | ............. A47B 91/02 |
| IT | RE20100070 A1 | 3/2012 | |
| JP | 09206147 A | 8/1997 | |
| JP | 2733833 | 3/1998 | |
| JP | H11270515 A | 10/1999 | |
| JP | 2008-036717 | 2/2008 | |
| JP | 2008-213058 | 9/2008 | |
| JP | 4865441 | 2/2012 | |
| KR | 200395362 Y1 | 9/2005 | |
| KR | 20080057394 | 6/2008 | |
| NZ | 574230 A | 5/2010 | |
| RU | 2438548 C2 | 1/2012 | |

OTHER PUBLICATIONS

International Search Report issued in PCT/IB2018/056717 dated Mar. 10, 2020.
European Search Report issued in European Patent Application No. 18849915.6 dated Feb. 1, 2022.

* cited by examiner

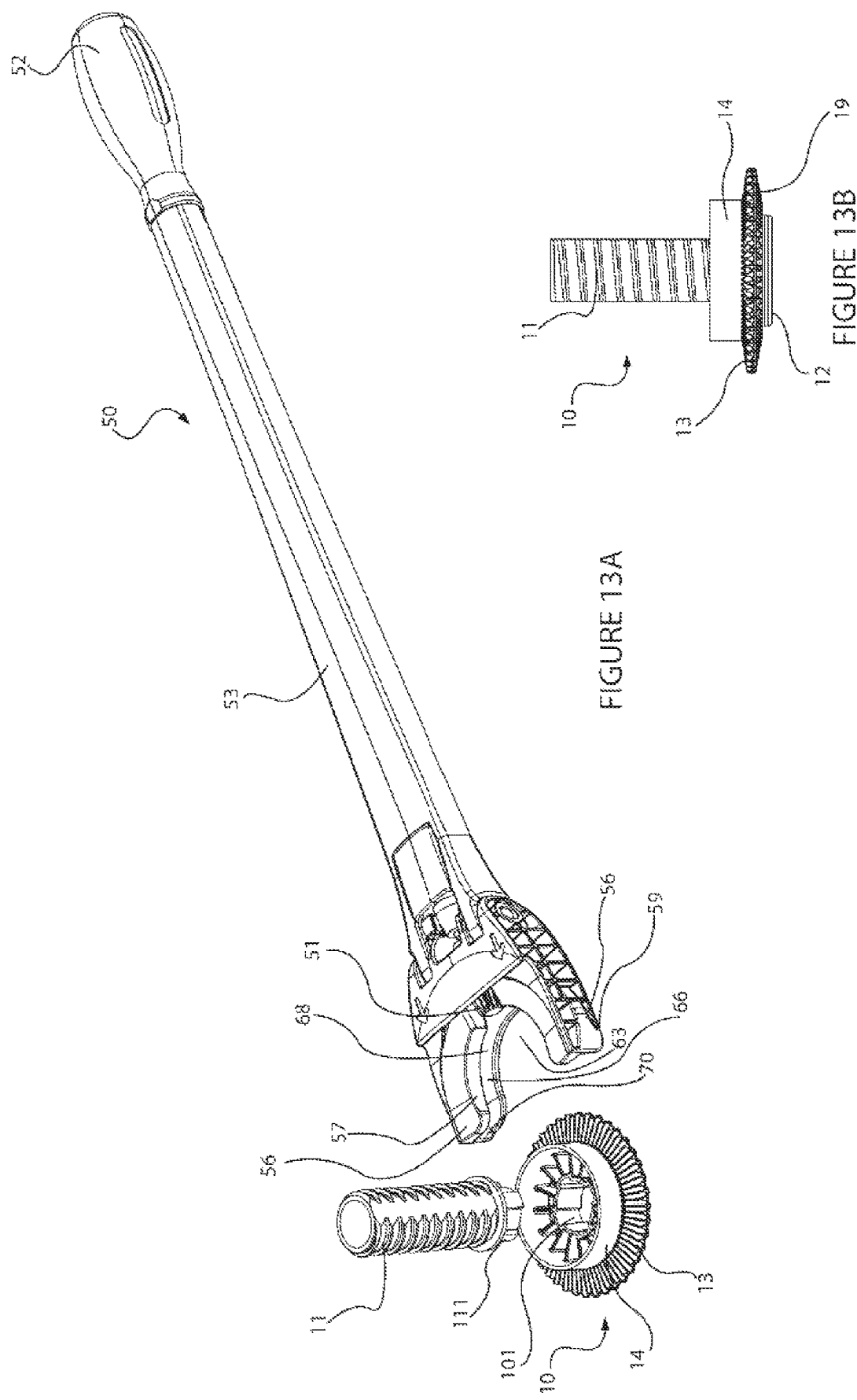

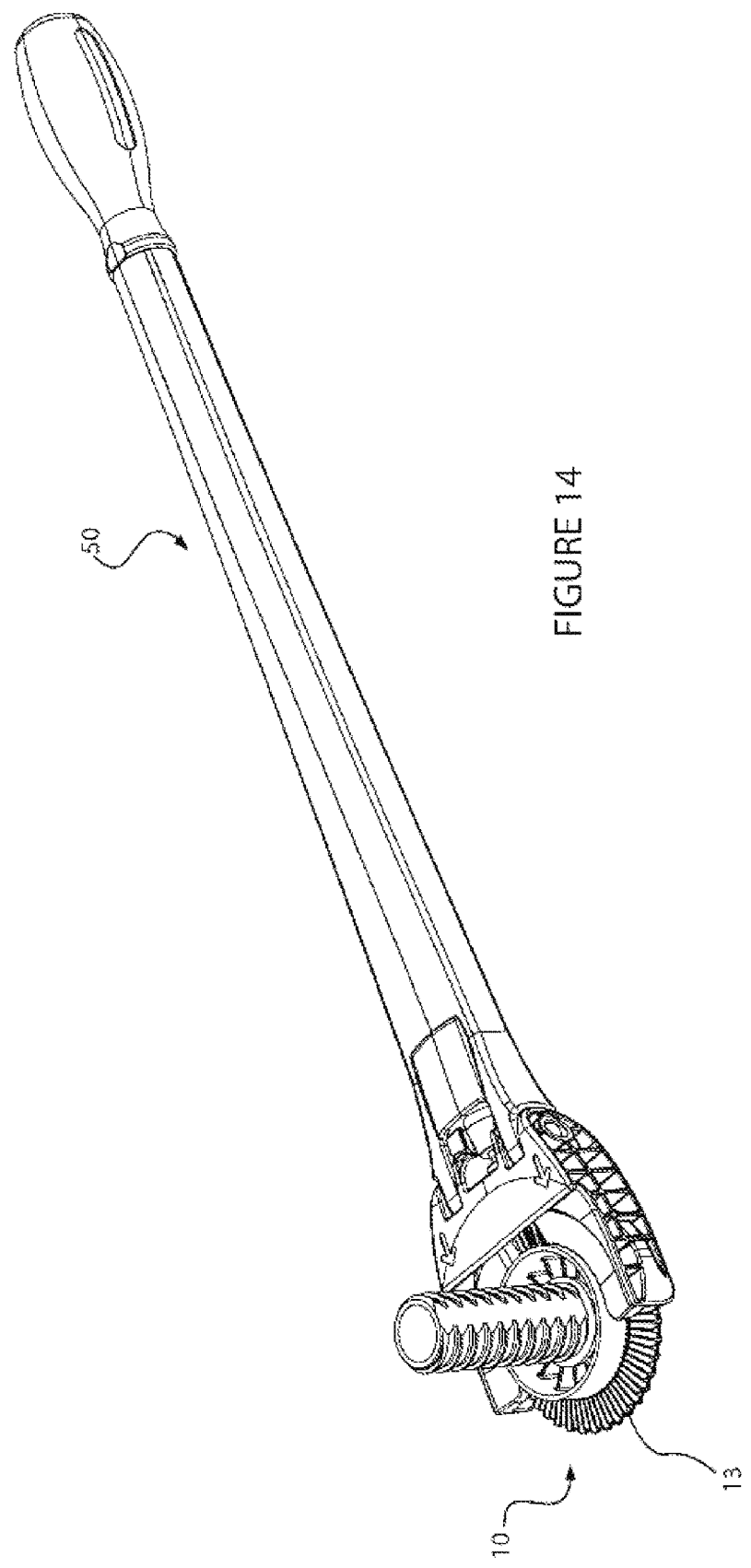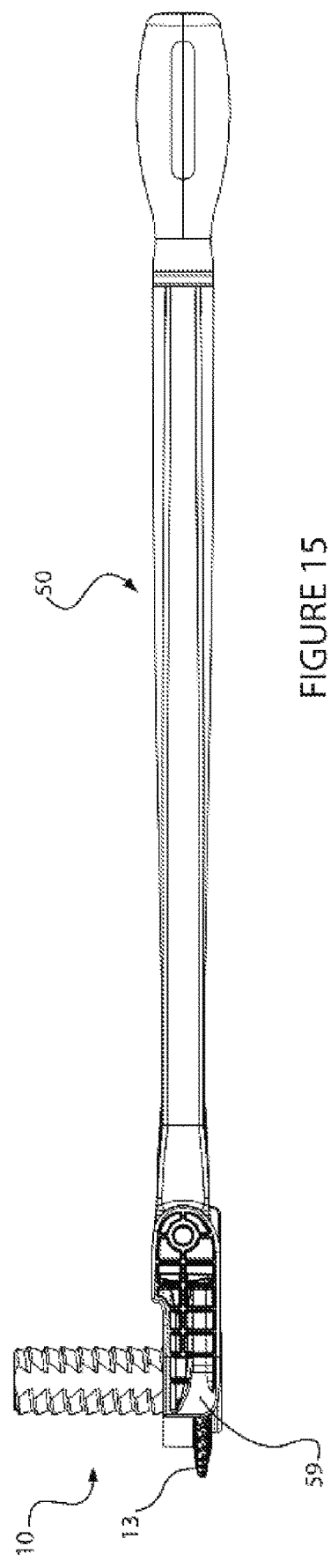

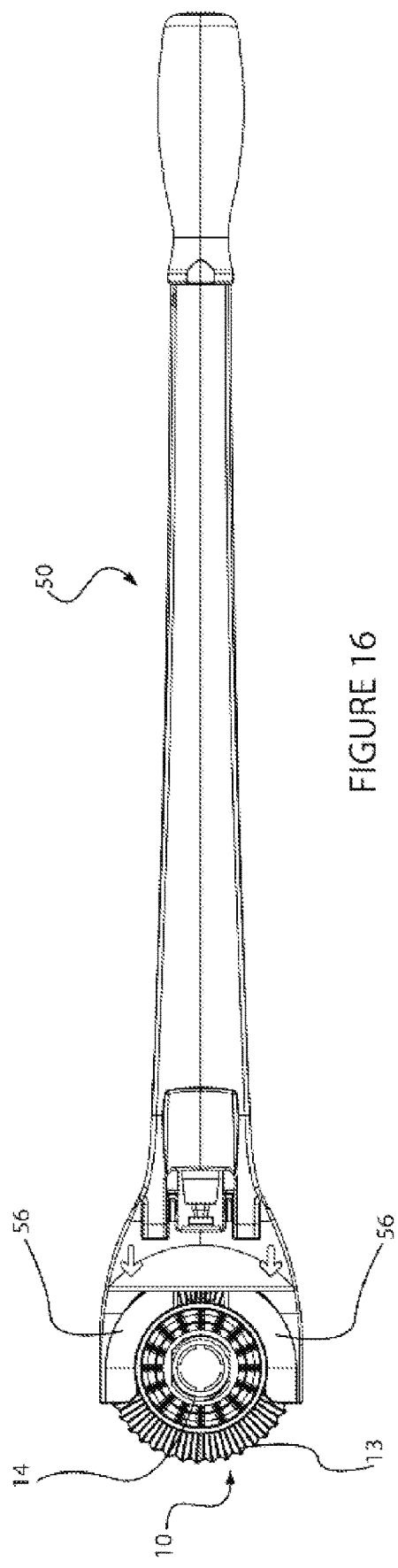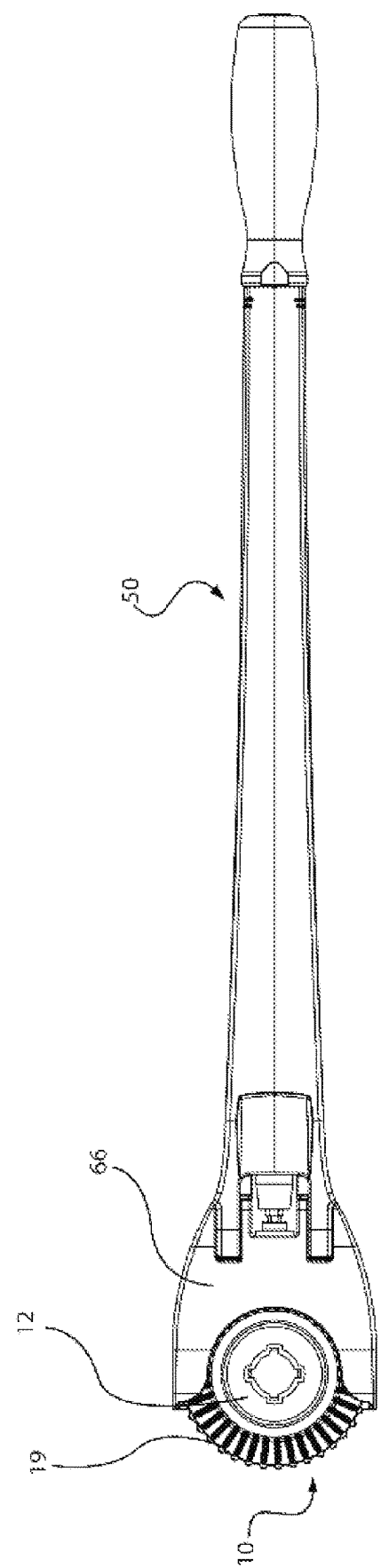

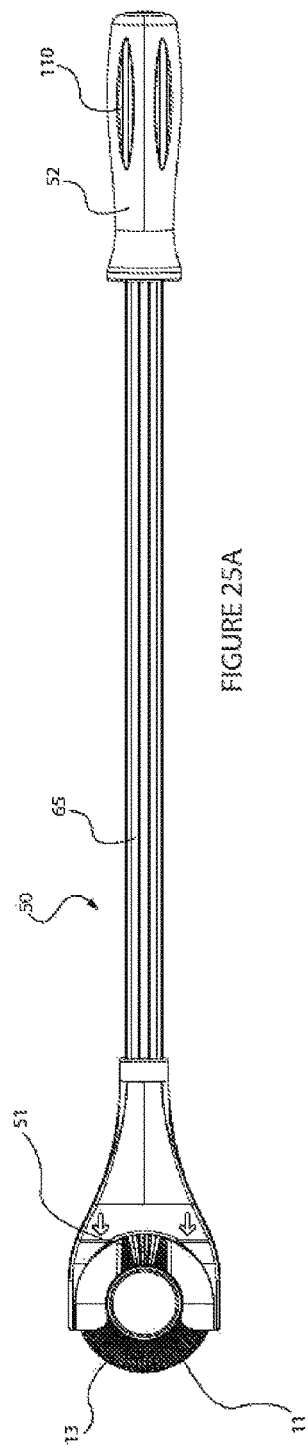
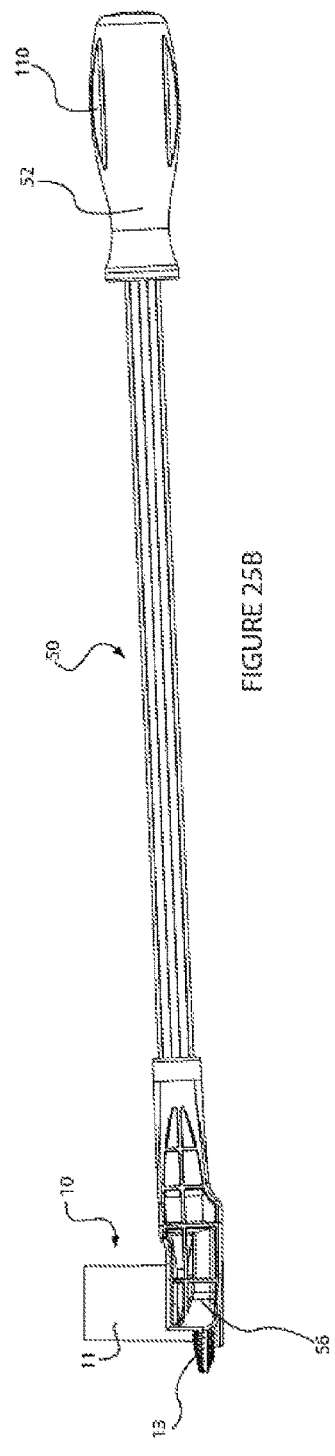
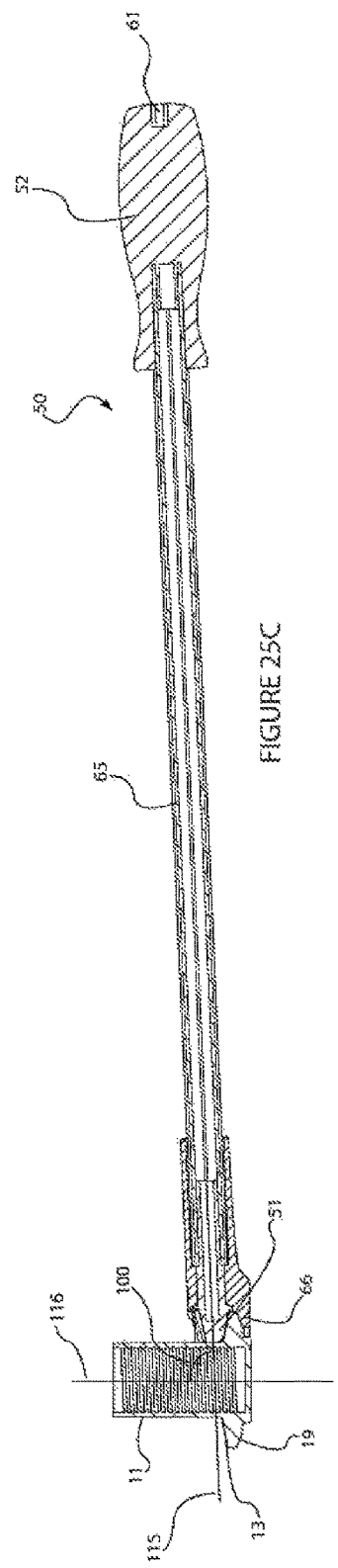
FIGURE 25A
FIGURE 25B
FIGURE 25C

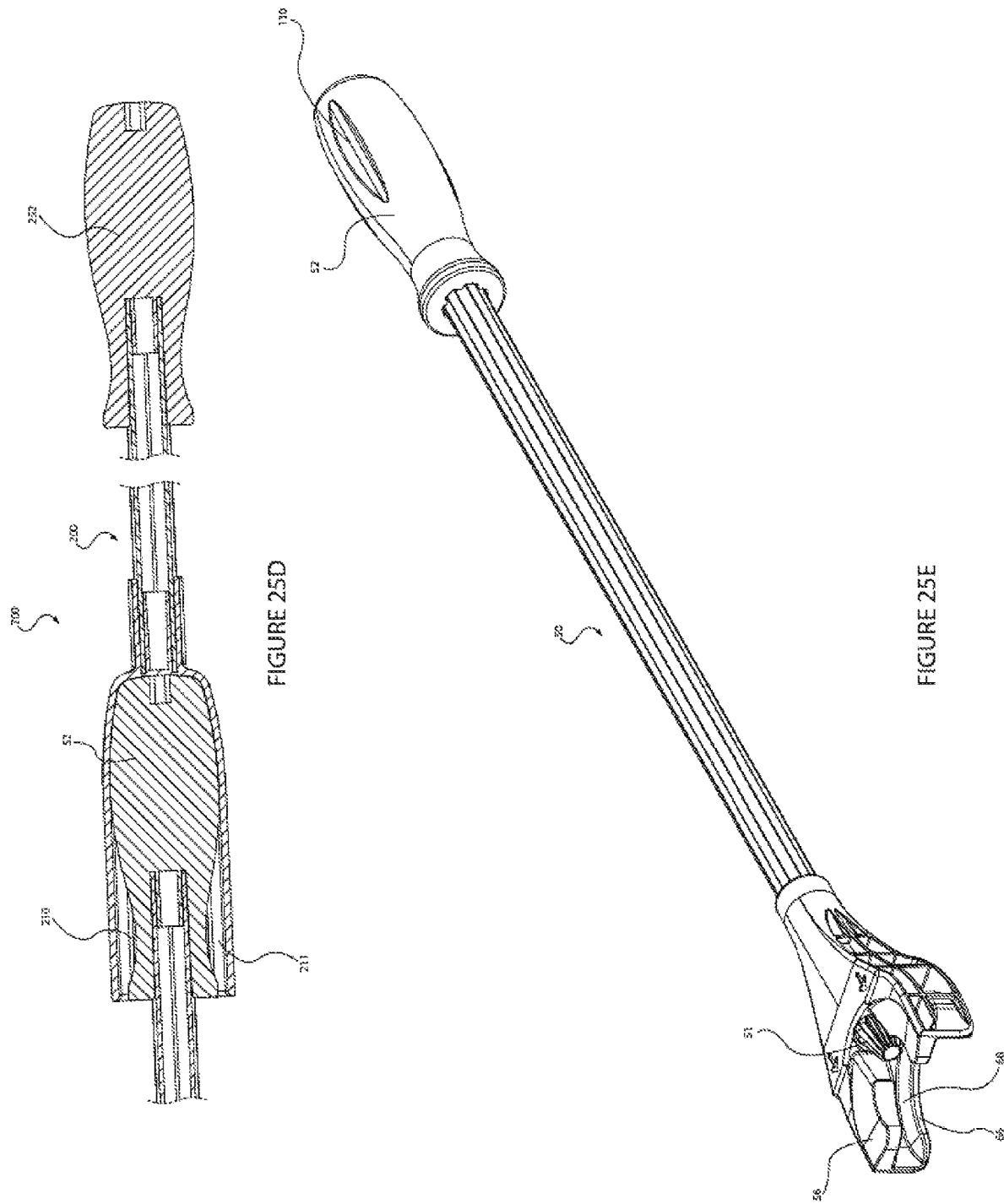

CABINET LEVELLING APPARATUS

CROSS REFERENCE TO RELATED APPLICATION

This application is a national phase application based on International Application No. PCT/IB2018/056717, filed Sep. 4, 2018, which claims priority to NZ Application No. 73523 filed Sep. 4, 2017, both of which are incorporated in their entireties herein.

FIELD OF THE INVENTION

The present invention relates to an apparatus for adjusting a height adjustable leg for leveling or adjusting the height of cabinetry such as kitchen, bathroom or laundry cabinetry, or an appliance, or other object that requires height or leveling adjustment. The present invention may also relate to a coupling for forming part of a height adjustable leg, and a tool for adjusting the height of a height adjustable leg via such a coupling.

BACKGROUND TO THE INVENTION

Height adjustable legs that are used to support cabinets, appliances, furniture or the like are known. They typically comprise a vertically extending threaded shaft received in a corresponding threaded socket fixed to an appliance or cabinet to be height adjusted or levelled. The socket is fixed to the object, so that rotation of the shaft causes a foot of the leg to move axially relative to the socket to set the height of the object supported by the foot. To rotate or turn the threaded shaft in the corresponding threaded socket, the foot may comprise an engagement feature such as a hexagonal or square profile to which a laterally extending tool such as a spanner may engage. Alternatively the foot may be rotated by hand by a user.

A tool used for adjusting the height of the leg may engage the foot from a lateral direction. A tool such as a spanner when engaged with the foot extends laterally from the foot to provide a moment arm for turning the foot. A user adjusts the height of the leg by moving the handle of the tool through an arc about or around the foot. Movement of the handle of the tool around the foot can be impeded by adjacent feet, equipment, walls, or cabinetry positioned beside the object being height adjusted, or the object itself, such that the foot may be adjusted only through a series of repeated short arc lengths. Height adjustment of a leg may hence require a user to disengage and re-engage the tool and foot many times to turn the foot through a sufficient amount of angular movement within a limited arc length or angle of rotation. This can be time consuming and alignment may not be easy to achieve each time the tool is to be re-engaged. Alignment vertically, tangentially and radially is necessary in order to re-engage.

Adjustment of a foot located at the rear of a cabinet or appliance may be difficult, as an extra long tool handle may be required to reach the back feet from the front of the cabinet, such that the adjustment arc for the tool handle to operate in is further limited. Additionally, alignment between the jaw of the tool and the corresponding engagement feature on a rear foot can be difficult due to the difficulty in viewing and/or reaching the rear feet of a cabinet. A user may be required to lie down on a floor surface to view the rear feet in order to properly engage an adjustment tool to the foot for height adjustment. Tools such as standard spanners or screw drivers typically used to adjust height adjustable legs are not designed specifically for the purpose of adjusting a height adjustable leg. The use of non-specific tools or adjusting a leg by hand can present health and safety issues for the user.

In an alternative height adjustable leg, the threaded shaft of the leg may be received in a threaded collar or sprocket that is fixed in height relative to the object to be levelled, but free to rotate. Rotation of the threaded shaft of the foot is prevented, for example by a flat section or sections on the threaded shaft received in a corresponding socket fixed to the object to be height adjusted. Rotation of the collar causes the shaft to move axially relative to the collar to set the height of the object supported by the foot. The collar may comprise an engagement feature such as a hexagonal or square profile to which a laterally extending tool such as a spanner may engage. Adjustment of a foot threaded shaft and collar arrangement may have similar problems for height adjustment as described above; limited adjustment arc length and difficulty in aligning the tool and the collar for adjustment.

An adjustable foot for an appliance is described in U.S. Pat. No. 7,556,227 (Miele). The appliance is fitted with a rod and pinion. The pinion engages with a sprocket so that rotation of the rod rotates the sprocket to adjust the height of the foot. The rod is supported by the appliance to be held in engagement with the sprocket and extends to the front of the appliance. Adjustment of the rear feet of the appliance can be made using a standard screw driver from the front of the appliance. The appliance is fitted with a pinion and rod for each rear foot so that each rear foot can be adjusted from the front of the appliance. This mechanism may be complex to install within the appliance. Each foot has an associated pinion and driving mechanism which effectively become redundant once the height is set. The front feet are adjusted by a standard screw driver inserted in a vertical slot of the foot. The screw driver is moved through an arc length and may be engaged and disengaged with a front foot a number of times to complete height adjustment of the front of the appliance.

A tool for adjusting a foot or leg of an appliance is described in JP1997-206147 (Takigen). The tool includes a ratchet mechanism comprising a ratchet lever or pawl for engaging a ratchet gear on the shaft. With the lever engaged with the gear, the tool is used to adjust the foot by moving the handle of the tool through an arc about or around the foot to rotate the foot, in much the same way in which a standard spanner is used to adjust a foot. The ratchet lever engages the gear in one direction of rotation, and disengages from the gear in the opposite direction of rotation, to allow the tool handle to be moved back and forth in a defined arc length around the foot to adjust the height of the leg in one direction. To change the direction of adjustment (for example from upwards to downwards) it is necessary to switch the lever arm of the ratchet mechanism between two positions.

JP2008-213058 (Takigen) describes a similar foot to JP1997-206147 but includes a horizontally pivoting tool head to allow the tool to engage with a foot around obstacles. The pivoting head reduces the arc length in which the handle must be moved to crank the foot for height adjustment. Like the tool of JP1997-206147, to change the direction of adjustment (for example from upwards to downwards) it is necessary to switch the lever arm of the ratchet mechanism between two positions.

EP0292921 describes a fitting element for internal furnishings. Via its internal thread 34, a first mitre wheel 36 moves a rod 30 which is provided with an external thread 32 and is a movable support foot. The drive of the first mitre wheel 36 is affected via a second mitre wheel 50 of a tool which can be inserted into a depression in a housing of the fitting element from either of two opposite sides of the fitting element.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

It is an object of the present invention to provide an improved apparatus for adjusting a height adjustable leg, or an improved tool for adjusting a height adjustable leg, or an improved coupling adapted to be attached to or engaged with a height adjustable leg for interfacing with a tool for adjusting the leg, or to at least provide the industry with a useful choice.

SUMMARY OF THE INVENTION

Accordingly, in a first aspect the present invention relates to aspect an apparatus for adjusting the height of a cabinet above a supporting surface comprising:
(a) a length adjustable leg having an elongate axial direction, for supporting the cabinet and comprising:
  a first part for securing to or forming part of the cabinet and presenting an external or internal threaded region,
  a foot comprising:
  a rotatable foot part that comprises a rotationally driven member and an externally or internally threaded member to rotate about an axis of rotation coaxial the axial direction with the driven member and to engage with the internally or externally threaded region of the first part to allow the distance between the foot and the cabinet to be adjusted upon rotation of the foot part relative the first member about the axis of rotation, and
  a spacer to engage the foot part and locate between the supporting surface and the foot part to support the foot part above said supporting surface, wherein the spacer comprises a radially extending flange having an axial direction registration surface or surfaces,
(b) a tool comprising a driving member, a torque input for applying torque to the driving member, and the tool adapted to bear against the registration surface(s) to axially locate the tool to the foot so that the driving member is held relative the driven member in the axial direction to engage the driven member and allow the driven member and foot part to be driven by the driving member about the axis for length adjustment of the leg.

In some embodiments, the driven member is a rotary rack presenting radial gear teeth and the driving member is a pinion.

In some embodiments, the radial gear teeth face in a direction away from the supporting surface, or wherein the radial gear teeth face in a direction towards the supporting surface.

In some embodiments, the registration surface(s) of the flange substantially faces in a direction away from the driven member and is/are in use elevated above the support surface.

In some embodiments the registration surface(s) of the flange substantially faces in a direction toward the driven member and is/are in use elevated above the support surface, the driving member to be held upwardly by the registration surface(s) against the driven member.

In some embodiments, the registration surface(s) of the flange substantially faces in a direction towards the supporting surface, or wherein the registration surface(s) faces in a direction away from the supporting surface.

In some embodiments, the tool comprises a tool flange presenting surface to engage the registration surface of the flange and be held axially relative the foot thereby.

In some embodiments, the foot part rotationally engages with the spacer to rotationally support the foot part on said supporting surface, the spacer remaining rotationally fixed relative the supporting surface.

In some embodiments, the foot part engages with the spacer to rotationally support the foot part on said supporting surface, the spacer remaining rotationally fixed relative the foot part.

In some embodiments, the foot part engages with the spacer in an adjustable manner to allow the height of the foot part above the supporting surface to be adjusted.

In some embodiments the adjustable manner is by a threaded engagement between the spacer and the foot part.

In some embodiments the spacer is a unitary body.

In some embodiments the flange of the spacer is an annular flange and the indexing surface of the flange comprises radial teeth, and wherein the tool comprises a tool flange with complementary teeth to engage the teeth of the flange to rotationally hold the tool flange to the spacer once engaged.

In some embodiments, the registration surface of the flange faces in a direction towards the teeth of rotary rack, and with the tool engaged with the foot the pinion is captured between the rotary rack and registration surface and as the pinion rotates each tooth tip of the pinion contacting the axial surface of the flange of the base part to maintain engagement between the pinion and the rotary rack.

In some embodiments, the tool comprises a jaw to laterally engage the tool to the foot (e.g. to the foot base or spacer) to laterally align the driven member and driving member.

In some embodiments the tool comprises a jaw to laterally engage the tool to the spacer to laterally align the driven member and driving member.

In some embodiments, lateral extensions forming the jaw comprise the axial surface to bear against the axial surface of the flange.

In some embodiments, the jaw engages a diameter of the rotatable foot part or the spacer to laterally align the tool and foot.

In some embodiments, substantially no relative rotation about the longitudinal axis of the leg occurs between the tool and the spacer when driving the driven member for rotation.

In some embodiments, the spacer provides a low friction interface between the rotatable foot part and the supporting surface, and/or a low friction interface between the rotatable foot part and the tool.

In some embodiments, the spacer is composed of a low friction material.

In some embodiments, the spacer comprises a socket to receive the rotatable foot part.

In some embodiments, the foot part comprises a socket to receive the spacer.

In some embodiments, the flange of the base part is an annular flange providing an annular axial direction registration surface.

In some embodiments, the spacer is rotationally coupled to the base of the rotatable foot part to allow for relative rotation between the base of the rotatable foot part and the spacer.

In some embodiments, the flange of the base part axially supports an axial surface of the rotatable foot part.

In some embodiments, the flange is of a diameter the same as the diameter of the driven member.

In some embodiments, the flange is of a diameter larger than the diameter of the driven member.

Another aspect of the invention relates to a length adjustable leg having an elongate axial direction, for supporting a cabinet and being adjustable in length by a tool comprising a rotary driving member and a torque input for applying torque to the driving member, the leg a comprising:
- a first part for securing to or forming part of the cabinet and presenting an external or internal threaded region,
- a foot comprising:
- a rotatable foot part that comprises a rotationally driven member and an externally or internally threaded member to rotate about an axis of rotation coaxial the axial direction with the driven member and to engage with the internally or externally threaded region of the first part to allow the distance between the foot and the cabinet to be adjusted upon rotation of the foot part relative the first member about the axis of rotation, and
- a spacer to engage the foot part and locate between the supporting surface and the foot part to support the foot part above said supporting surface, wherein the spacer comprises a radially extending flange having an axial direction registration surface or surfaces for the tool to bear against to axially locate the tool to the foot so that the driving member is held relative the driven member in the axial direction and engage the driven member and allow the driven member and foot part to be driven by the driving member about the axis for length adjustment of the leg.

Another aspect of the invention relates to a system for adjusting the height of a cabinet, appliance or structure above and supported on a supporting surface, the system comprising:
- (a) a length adjustable leg having an elongate axial direction, for the supporting a cabinet, appliance or structure, the leg comprising:
- a rotatable foot part comprising a rotationally driven member to be rotated about an axis of rotation and,
- a spacer to support the rotatable foot part on said supporting surface, wherein the spacer comprises a flange extending radially to said axis of rotation,
- (b) a tool comprising a driving member, a torque input for applying torque to the driving member, and the tool adapted to bear against the flange to locate the tool to the foot in an axial direction, so that the driving member engages and is held in an axial direction to the driven member to allow the driven member and rotatable foot part to be driven by the driving member about a longitudinal axis of the leg for length adjustment of the leg.

This aspect of the invention may include any one or more of the features described in relation to the previous aspect of the invention herein above described.

In another aspect the present invention maybe said to be a length adjustable leg having an elongate axial direction, for supporting a cabinet on a supporting surface and being adjustable in length by a tool comprising a rotary driving member and a torque input for applying torque to the driving member, the leg a comprising:
- a first part for securing to or forming part of the cabinet and presenting an external or internal threaded region coaxially presented with the axial direction,
- a rotatable foot part that comprises an externally or internally threaded member threadingly engaged with the external or internal threaded region of the first part and to threadingly rotate relative the first part,
- a rotary driven member mounted or integrally formed coaxially to the axial direction to and rotate with one of the first members and second members to be driven for rotation to allow the distance between the foot and the cabinet to be adjusted upon rotation of the foot part relative the first member about the axis of rotation.

In some embodiments the rotary driven member is mounted to or integrally formed with the foot part to define a foot.

In some embodiments, a spacer is provided to engage the foot part and locate between the supporting surface and the foot part to support the foot part above said supporting surface, wherein the spacer comprises a radially extending flange having an axial direction registration surface or surfaces for a tool as herein described to bear against to axially locate the tool to the foot part so that the driving member is held relative the driven member in the axial direction and engage the driven member and allow the driven member and foot part to be driven by the driving member about the axis for length adjustment of the leg Another aspect of the invention relates to a foot for forming part of a length adjustable leg for supporting a cabinet, appliance or structure on a supporting surface, the foot comprising:
- a rotatable foot part comprising a rotationally driven member, and
- a spacer to engage a base of the rotatable foot part and support the rotatable foot part on said supporting surface, wherein the spacer comprises a radially extending flange.

In some embodiments the flange is to bear against a tool comprising a driving member to axially locate the tool to the foot, so that the driving member engages the driven member to allow the driven member and rotatable foot part to be driven by the driving member about a longitudinal axis of the leg for length adjustment of the leg.

In some embodiments, the driven member is a rotary rack presenting radial gear teeth and the driving member is a pinion.

In some embodiments, the radial gear teeth face in a direction away from the supporting surface or wherein the radial gear teeth face in a direction towards the supporting surface.

In some embodiments, the axial surface of the flange of the base part substantially faces in a direction away from the teeth of the driven member, or wherein the axial surface of the flange of the base part substantially faces in a direction towards the teeth of the driven member.

In some embodiments, an axial surface of the flange substantially faces in a direction towards the supporting surface or wherein the axial surface of the flange of the spacer substantially faces in a direction away from the supporting surface.

In some embodiments, the flange of the spacer is an annular flange and the axial surface of the flange of the spacer comprises radial teeth to engage complementary teeth of the tool to rotationally lock the spacer to the tool.

In some embodiments, the spacer rotationally engages the base of the rotatable foot part to rotationally support the rotatable foot part on said supporting surface.

In some embodiments, the axial surface of the flange of the spacer faces in a direction towards the teeth of the rotary rack to capture a pinion of the tool between the rotary rack and axial surface of flange of the spacer, and as the pinion rotates each tooth tip of the pinion contacting the axial surface of the flange of the spacer to maintain engagement between the pinion and the rotary rack.

In some embodiments, wherein the spacer rotationally engages the base of the rotatable foot part to rotationally support the rotatable foot part on said supporting surface.

In some embodiments, substantially no relative rotation about the longitudinal axis of the leg occurs between the tool and the spacer when driving the driven member for rotation of the rotatable foot part.

In some embodiments, substantially no relative rotation about the longitudinal axis of the leg occurs between the flange and the supporting surface when driving the driven member for rotation of the rotatable foot part.

In some embodiments, the spacer provides a low friction interface between the rotatable foot part and the supporting surface, and/or a low friction interface between the rotatable foot part and the tool.

In some embodiments, the spacer is composed of a low friction material.

In some embodiments, the spacer comprises a socket to receive the rotatable foot part.

In some embodiments, the flange is an annular flange providing an annular axial bearing surface.

In some embodiments, the registration surface of the flange comprises a surface presented perpendicular to the rotational axis of the foot.

In some embodiments, the spacer is rotationally coupled to the base of the rotatable foot part to allow for relative rotation between the base of the rotatable foot part and the spacer.

In some embodiments, the flange of the spacer axially supports an axial facing surface of the rotatable foot part.

In some embodiments, the axial surface of the rotatable foot part faces in a direction towards the supporting surface.

In some embodiments, the axial surface of the rotatable foot part is a back side of the driven member.

In some embodiments, the foot comprise a threaded shaft or socket to engage a corresponding threaded socket or shaft of a first part of the leg to be fixed to the appliance or structure, relative rotation between adjusting height of the leg.

Another aspect of the invention relates to an apparatus for adjusting the height of a cabinet, appliance or structure above a supporting surface and comprising:
  a height adjustable leg that has a longitudinal axis and that comprises a foot part comprising a driven member able to be rotated relative to the support surface about the longitudinal axis, and
  a tool comprising a handle and an extension arm dependent from the handle, a driving member to rotate relative the extension about a rotational axis of the driving member that extends in use radial to the longitudinal axis and a torque input for applying torque to the driving member, wherein one of the extension arm and the driving member can releasably register the tool in the longitudinal axis direction relative to the foot part to releasably hold the driving member in engagement with the driven member to allow the driving member to drive the driven member to rotate the foot part about the longitudinal axis for height adjustment of the leg without needing to rotate the handle about the longitudinal axis, and
  wherein the driving member and the driven member are gears that can releasably mesh together at a plurality of radial locations relative to the longitudinal axis of the leg.

Another aspect of the invention relates to a cabinet, appliance or structure above a supporting surface and comprising:
  a height adjustable leg that has a longitudinal axis and that comprises a foot part comprising a driven member able to be rotated relative to the support surface about the longitudinal axis, and
  a tool comprising a handle and a driving member to rotate relative the handle about a rotational axis of the driving member that extends in use parallel to the longitudinal axis and a torque input for applying torque to the driving member that includes a worm gear drivingly coupled to the driving member, and
  wherein the driving member and the driven member are gears that can releasably mesh together at a plurality of radial locations relative to the longitudinal axis of the leg.

In one embodiment the gears are spur gears or helical gears.

In one embodiment worm gear is driven by a drive shaft extending along the handle.

In one embodiment the tool comprises at least one extension arm, one of the extension arm and the driving member can releasably register the tool in the longitudinal axis direction relative to the foot part to releasably hold the driving member in engagement with the driven member to allow the driving member to drive the driven member to rotate the foot part about the longitudinal axis for height adjustment of the leg without needing to rotate the handle about the longitudinal axis.

In one embodiment, the driven member is rotationally engaged or integral with a threaded shaft or threaded socket.

In one embodiment, the threaded shaft engages in a threaded socket of a first part of the adjustable leg that is engaged to the supported object, or the threaded socket extends about a threaded shaft of the first part of the adjustable leg engaged to the supported object so as to create relative movement between the two during rotation of the driven member.

In one embodiment, the driven member rotates about a threaded shaft.

In one embodiment, the threaded shaft is rotationally fixed relative the supported object.

In one embodiment, the foot part comprises one or more axial direction registration surfaces that are adapted to receive a portion of the tool to allow the tool axially bear against, to aid the driven member and driving member to be operatively engaged.

In one embodiment, the axial registration surface(s) is one more selected from a slot, groove, edge, horizontal surface, flange and lip.

In one embodiments, the driving member is a pinion and comprises an extended portion extending from its tip to engage with a complimentary groove in the foot part to provide an axial bearing surface to support the driving member against the driven member.

In one embodiments, the foot part comprises an axial registration surface configured to engage with a surface or edge of the tool to axially support the tool or resist the tool from becoming disengaged axially with the driven member in use.

In one embodiment, the driving member is held at a constant angle relative one or more selected from the support surface and the driven member.

In one embodiment, the tool comprises a feature that extends from the tool to engage with one or more selected from the leg above the driven member, the leg below the driven member, and the supporting surface.

In one embodiment, the feature is a jaw that engages with and/or about the leg and is configured to keep the driving member at a constant angle with respect to the driven member.

In one embodiment, the feature is a support that is configured to engage with the supporting surface to keep the driving member at a constant angle with respect to the driven member.

In one embodiment, the tool comprises a jaw.

In one embodiment, the jaw is configured to a least control radial movement of the tool with respect to the leg in a direction of a rotational axis of the driving member and handle.

In one embodiment, the jaw is configured to a least control the lateral movement of the tool with respect to the leg in the direction perpendicular to the rotational axis of the driving member and handle, and parallel to the supporting surface.

In one embodiment, the jaw extends around more than 180° of a diameter of the leg.

In one embodiment, the jaw may be elastically flex to extend about the diameter.

In an alternative embodiment, the jaw is configured to move relative to the arm of the tool between an open position, to allow the tool to engage with the foot, and a closed position where the jaw of the tool is captured to the leg at a diameter of the leg.

In one embodiment, the diameter is located on one or more of the leg, the foot part such as threaded member of the foot part or the driven member of the foot part or he spacer.

In one embodiment, the jaw extends around a diameter of the foot by less than 180°.

In one embodiment, the jaw extends around a diameter of the foot by more than 180°.

In one embodiment, the jaw extends around a diameter of the foot in its closed condition by more than 180°.

In one embodiment, the driven member is of a spoked configuration and is adapted to engage with a like configured driving member.

In one embodiment, the driven member is of a disc type configuration with a plurality of holes, slots or grooves located about its periphery and is configured to receive or engage with a complementary driving member.

In one embodiment, the driven member comprises a vertically orientated teeth configured to be driven by a complementary driving member.

In one embodiment, the driving member is a vertically orientated gear having a rotational axis parallel to the rotational axis of the driven member.

In one embodiment, the driving member is a gear having a horizontal rotational axis and the gear is configured to engage with the teeth of a driven member with vertical teeth.

In one embodiment a plurality of spacers are provided each capable of selectively being engaged to the for part and each of a different configuration.

Preferably each spacer can set the foot part at a different height to the support surface.

Another aspect of the invention relates to an apparatus for adjusting the height of a cabinet, appliance or structure above a supporting surface and comprising:

a height adjustable leg that has a longitudinal axis and that comprises a foot part comprising a driven member able to be rotated relative to the support surface about the longitudinal axis, and a tool comprising a handle and a worm gear to rotate relative the handle about a rotational axis of the worm gear and a torque input for applying torque to the worm gear, and wherein the worm gear and the driven member can releasably mesh together at a plurality of radial locations relative to the longitudinal axis of the leg.

Another aspect of the invention relates to a foot for forming part of a length adjustable leg for supporting a cabinet, appliance or structure on a supporting surface, the foot comprising:

a rotatable foot part comprising a rotationally driven member, and a spacer to engage a base of the rotatable foot part and support the rotatable foot part on said supporting surface, wherein the spacer comprises a radially extending flange to bear against a tool comprising a driving member to axially locate the tool to the foot, so that the driving member engages the driven member to allow the driven member and rotatable foot part to be driven by the driving member about a longitudinal axis of the leg for length adjustment of the leg.

Another aspect of the invention relates to an apparatus for adjusting the height of a cabinet above a supporting surface comprising:

(a) a length adjustable leg having an elongate axial direction, for supporting the cabinet and comprising:

a first part for securing to or forming part of the cabinet and presenting an external or internal threaded region, a foot comprising:

a rotatable foot part that comprises a rotationally driven member and an externally or internally threaded member to rotate about an axis of rotation coaxial the axial direction with the driven member and to engage with the internally or externally threaded region of the first part to allow the distance between the foot and the cabinet to be adjusted upon rotation of the foot part relative the first member about the axis of rotation, and (b) a tool comprising a driving member, a torque input for applying torque to the driving member, and the tool adapted to bear on the support surface and having a height adjustment feature to set the height of the driving member above the support surface in order to allow the tool to slide along the support surface, to become engaged with the foot so that the driving member is held above the support surface relative the driven member in the axial direction and become operatively engaged with the driven member so that the driven member and foot part can be driven by the driving member about the axis for length adjustment of the leg.

Another aspect of the invention relates to an apparatus as claimed above wherein the height adjustment feature is at least one member able to be moved relative to the driving member.

In one embodiment the tool comprises jaws and the at least one member is a prop able to be moved and set at least two positions relative to the jaws.

In one embodiment there is provided a spacer to engage the foot part and locate between the supporting surface and the foot part to support the foot part above said supporting surface.

In one embodiment the spacer comprises a radially extending flange having an axial direction registration surface or surfaces.

In one embodiment the tool is adapted to bear against the registration surface(s) to axially locate the tool to the foot so that the driving member is held relative the driven member in the axial direction and engage the driven member and allow the driven member and foot part to be driven by the driving member about the axis for length adjustment of the leg.

In some embodiments the tool comprising a jaw, a driving member to rotate relative to the jaw about a rotational axis and at least one torque input for applying torque to the driving member, the jaw configured and adapted for releasably capturing the foot part with the tool lateral to the longitudinal axis direction to hold the driving member in releasable engagement with the driven member to allow the driving member to drive the driven member to rotate the foot part about the longitudinal axis of the leg for height adjustment of the leg.

In some embodiments the driving member and the driven member are gears that can releasably mesh together from a plurality of radial directions relative to the longitudinal axis of the leg and wherein the tool is able to remain in a stationary radial position relative to the longitudinal axis of the leg yet allow the driving member to rotationally drive the driven member.

In some embodiments said at least one torque input and the driving member rotate about an axis that is lateral relative to a longitudinal axis of the leg when driving the driven member.

In some embodiments the tool and foot part are adapted to remain continuously engaged when the driving member drives the driven member to rotate the coupling about the longitudinal axis of the leg in both rotational directions so that the direction of height adjustment of the height adjustable leg in the longitudinal direction can be reversed without releasing the tool from the foot part.

In some embodiments, with the tool engaged with the foot part the driving member and the driven member are adapted to remain engaged to allow for continuous adjustment of the height adjustable leg in at least one direction, or are adapted to remain continuously engaged for adjusting the height of the height adjustable leg in both directions.

In some embodiments, the tool comprises a guide or positioning feature or features for setting the driving member at a height fixed relative to the driven member so that the driving member is positioned axially fixed relative to the coupling for engagement with the driven member.

In some embodiments the feature or features are registered by the supporting surface and are adjustable to allow a variable setting of height of the driving member relative the supporting surface.

In a further aspect the present invention is said to be a tool for rotationally driving a driven member of a foot part of a height adjustable leg having an elongate axis and for supporting a cabinet, appliance or structure, the tool comprising:
  a driving member,
  a torque input for applying torque to the driving member,
    a jaw, relative to which the driving member can rotate, to releasably engage the height adjustable leg in a manner to capture the foot part in a direction lateral to the elongate axis to releasably maintain engagement between the driving member and the driven member to allow the driving member to rotationally drive the driven member upon rotation of the driving member to adjust the height of the cabinet, appliance or structure, and
  wherein the driving member is a gear adapted to releasably mesh with the driven member.

In some embodiments the jaw is able to move relative the driving member between an open condition where it can be manoeuvred to locate to the foot part and a closed condition where it can capture at least in part around the foot part and remain retained to the foot part.

In still a further aspect the present invention may be said to be a height adjustment system for adjusting the height of a cabinet above a support surface carrying a threaded component, the system comprising
  an adjustable foot comprising, a threaded member to threadably engage to the threaded component, relative rotation between the threaded member and the threaded component moving the threaded member axially relative to the threaded component and thereby adjusting the height of the cabinet, appliance or structure, and a driven member to rotate with the threaded member relative to the threaded component,
  a tool for adjusting the foot relative to the cabinet, appliance or structure, comprising;
  a handle and an extension dependent from the handle, a driving member to rotate relative the extension about a rotational axis of the driving member and a torque input for applying torque to the driving member, the extension to releasably hold the tool relative the foot in at least one of a direction parallel the axis of the threaded member and lateral to the axis of the threaded member to hold the driving member and the driven member in releasable engagement and allow the driving member to drive the driven member to rotate the threaded member to move the threaded member axially relative to the threaded component without needing to rotate the handle about the axis, and
  wherein the driving member and the driven member are gears that releasably mesh together when the tool is engaged with the foot.

Another aspect of the invention relates to a height adjustment system for adjusting the height of a cabinet above a support surface carrying a threaded component, the system comprising
  an adjustable foot comprising, a threaded member to threadably engage to the threaded component, relative rotation between the threaded member and the threaded component moving the threaded member axially relative to the threaded component and thereby adjusting the height of the cabinet, appliance or structure, and a driven member to rotate with the threaded member relative to the threaded component,
  a tool for adjusting the foot relative to the cabinet, appliance or structure, comprising;
  a handle and an extension dependent from the handle, a driving member to rotate relative the extension about a rotational axis of the driving member that extends in use radial to the axis of the threaded member and a torque input for applying torque to the driving member, the extension to releasably hold the tool relative the foot in at least one of a direction parallel the axis of the threaded member and lateral to the axis of the threaded member to hold the driving member and the driven member in releasable engagement and allow the driving member to drive the driven member to rotate the threaded member to move the threaded member axially relative to the threaded component without needing to rotate the handle about the axis, and wherein the driving member and the driven member are gears that releasably mesh together when the tool is engaged with the foot, wherein the tool includes a support surface registration region to in use contact the support surface and to hold the driving member at a set height above the support surface upward against a downward presented driven member gear.

Another aspect of the invention relates to a height adjustment system wherein said support surface registration region is adjustable relative to the driving member to in use contact the support surface and to hold the driving member at a set but variable height above the support surface upward against a downward presented driven member gear.

The term "comprising" as used in this specification and claims means "consisting at least in part of". When interpreting each statement in this specification that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

As used herein the term "floor" or the phrase "floor surface" should be interpreted to mean any surface which supports the foot being described or claimed.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples only.

BRIEF DESCRIPTION OF THE DRAWINGS

Preferred embodiments of the invention will be described by way of example only and with reference to the following drawings.

FIG. 13A is a perspective view of a foot and a tool according to another embodiment of the present invention.

FIG. 13B is a side view of the foot illustrated in FIG. 13A.

FIG. 14 is a perspective view of the foot and the tool of FIG. 13A with the tool engaged with the foot.

FIG. 15 is a side view of the foot and the tool of FIG. 13A with the tool engaged with the foot.

FIG. 16 is a top view of the foot and the tool of FIG. 13A with the tool engaged with the foot.

FIG. 17 is a bottom view of the foot and the tool of FIG. 13A with the tool engaged with the foot.

FIG. 25A is a part sectional plan view of a tool according to another embodiment of the present invention shown engaged with a height adjustable leg.

FIG. 25B is a part side view of the tool of FIG. 25A shown engaged with a height adjustable leg.

FIG. 25C is a part sectional side view of the tool of FIG. 25A shown engaged with a height adjustable leg.

FIG. 25D is a part cross sectional view of a handle extension fitted to a handle of the tool of FIG. 25A.

FIG. 25E is a perspective view of the tool from FIG. 25A.

FIG. 30b is a bottom view of the foot and tool of FIG. 30a.

DETAILED DESCRIPTION OF PREFERRED EMBODIMENTS

Figure 1:
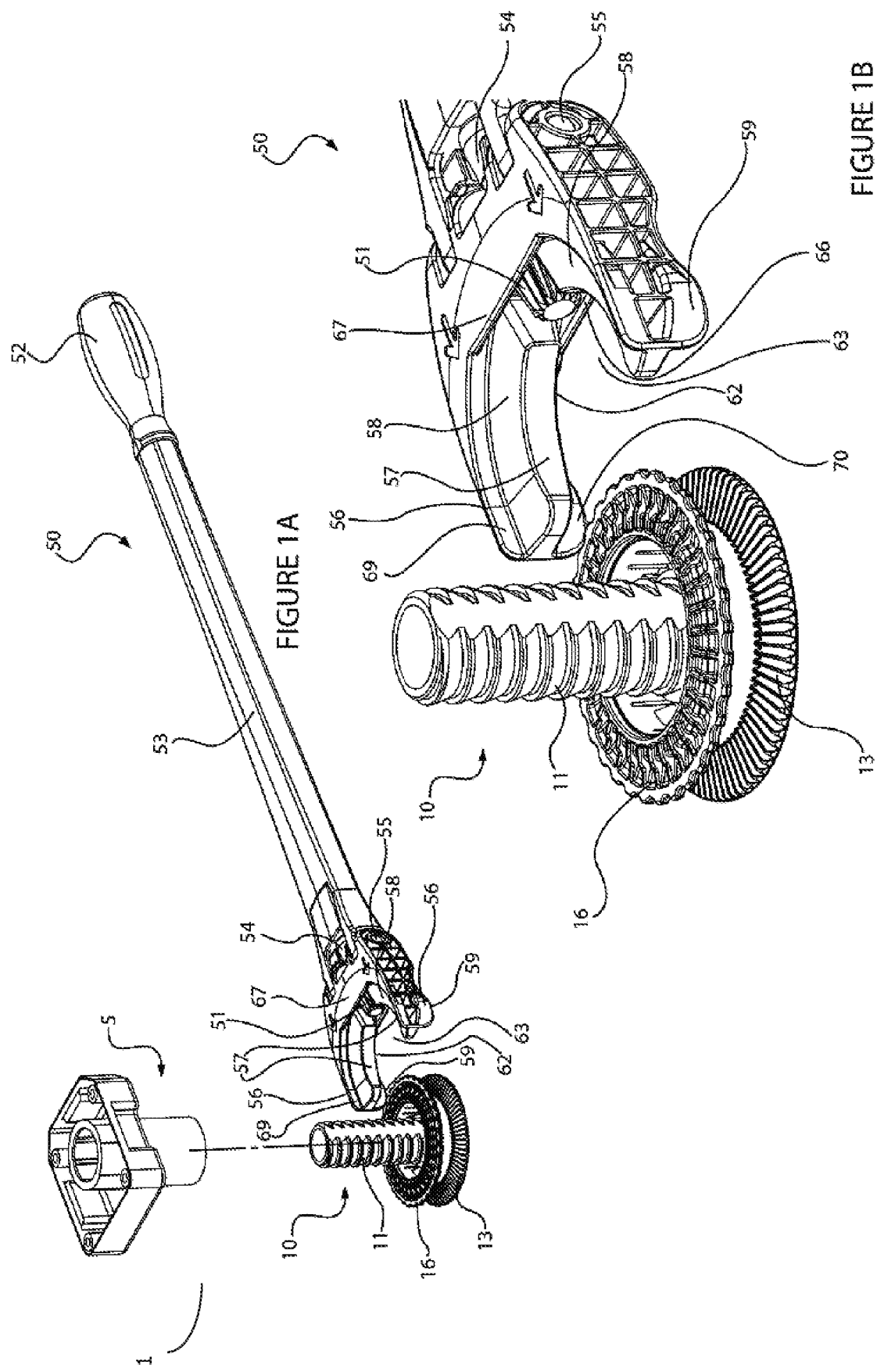
FIG. 1A is a perspective view of a foot and a tool for adjusting the foot to adjust the height of an object supported by the foot that in is partially received in a threaded socket attached to the object.
FIG. 1B is a close up view of part of the tool and the foot of FIG. 1A.
Figure 2:
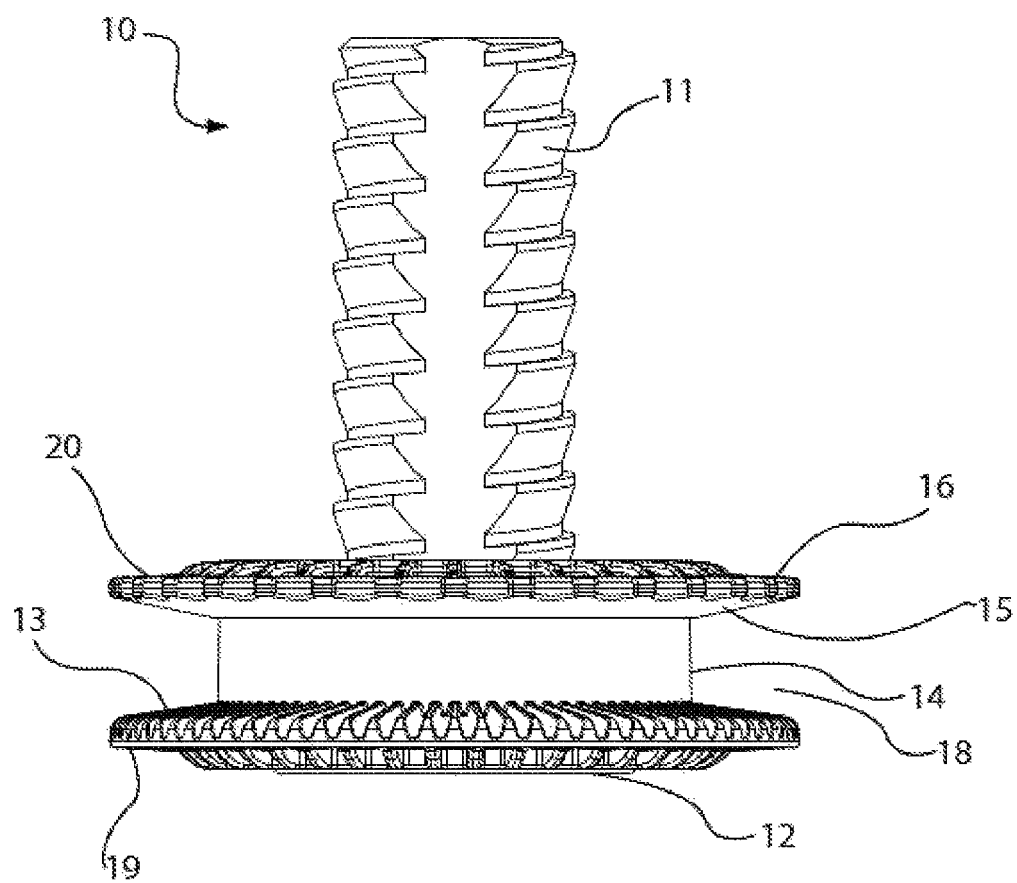
FIG. 2 is a side view of the foot illustrated in FIG. 1A.
Figure 3:
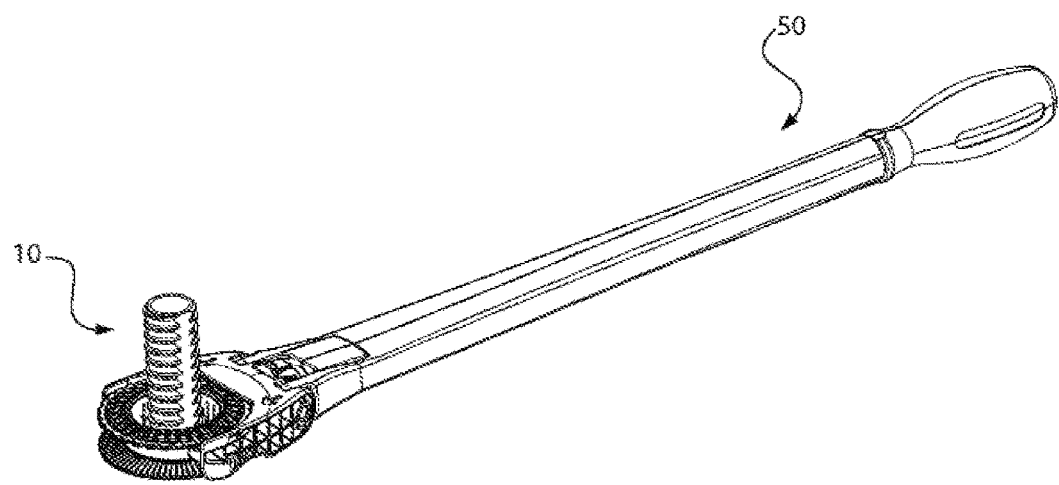
FIG. 3 is a perspective view of the foot and the corresponding tool of FIG. 1A with the tool engaged with the foot.
Figure 4:
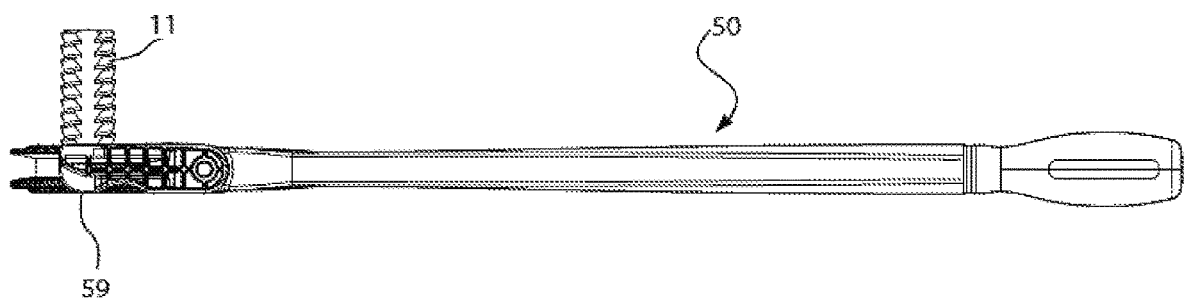
FIG. 4 is a side view of the foot and tool of FIG. 1A with the tool engaged with the foot.

Various embodiments of a height adjustable leg comprising a first part 5 and an engageable foot 10, as well as a tool 50 for adjusting the length of the leg via the foot 10 are described with reference to the Figures. The same reference numerals are used throughout to designate the same or similar components in various embodiments described.

Figure 30A:
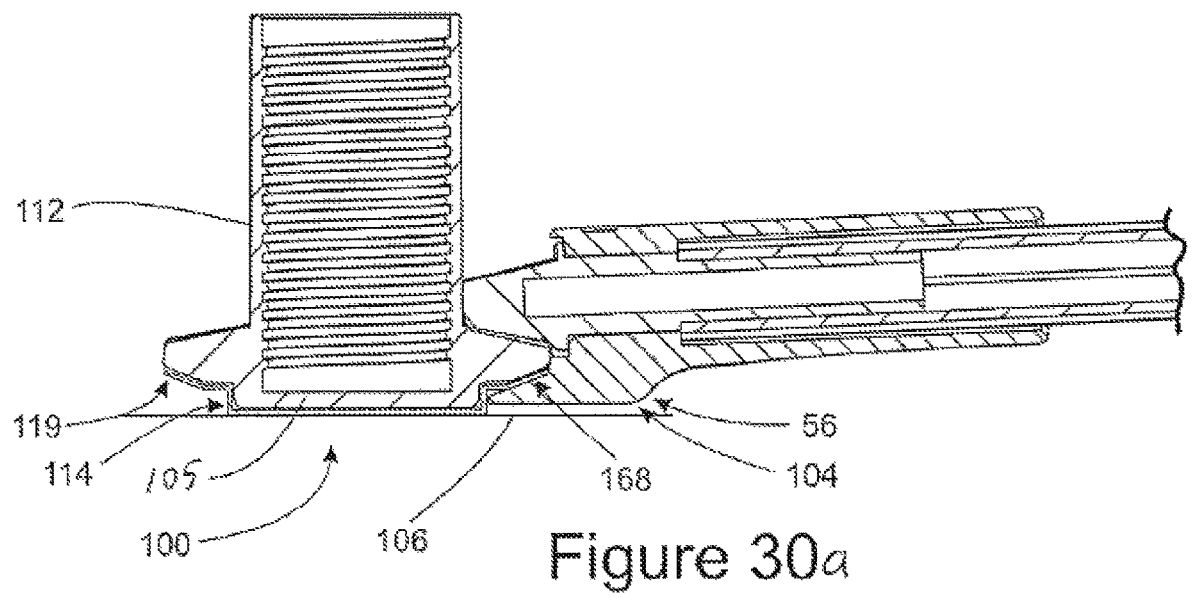
FIG. 30a is a side cross sectional view of the foot and spacer and tool engaged in an alternative embodiment.

FIGS. 1A to 10 illustrate a height adjustable leg 1 and a tool 50 for adjusting the overall length of the leg 1 according to some embodiments of the present invention. The leg 1 is referred to herein as a leg for height adjustment of a cabinet, appliance or structure or other object. A person skilled in the art will understand the leg 1 could also be used for sideways support of an object, for example supporting a cabinet from a vertical wall. In some embodiments the foot 10 comprises a threaded shaft 11. In use the threaded shaft 11 is received in the first part 5, in some embodiments, a threaded socket 5 or component (for example a nut), fixed to a cabinet, appliance or structure (herein an object) or other object to be height adjusted or leveled. The foot and threaded socket 11 (first part) preferably engaged together for a height adjustable leg. Rotation of the shaft 11 (foot) in the socket 5 (first part) causes the foot 10 to move axially relative to the socket 11 to change the length of the leg 1 to set the height of the object supported by the leg 1. Typically an object will be supported on two, three, four or more height adjustable legs 1 so that the height and level of the object may be adjusted. A base 12 of the foot 10 contacts a floor surface or other surface supporting the object. In some embodiments the shaft 11 may be rotationally supported on the base 12, so that the base 12 rests on a floor surface or other surface supporting the object without rotation when turning the shaft for height adjustment. FIG. 30a shows a foot 10 having a threaded sleeve for threaded engagement with a threaded shaft of the fixed to the cabinet. This is a reversal of the threaded shaft/socket relationship of the height adjustable leg of FIG. 1A.

Figure 55:
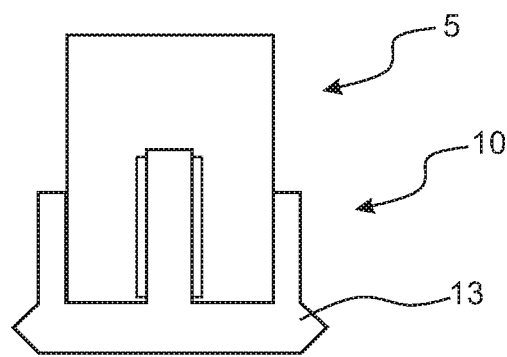
FIG. 55 shows an alternative foot arrangement.

In some embodiments the shaft 11 may be fixed to the base 12 so that the base and threaded shaft turn together when adjusting the height of the supported object. The threaded shaft 11 may comprise a thread along its full length or part way along its length. For example, in some embodiments the threaded shaft may have a threaded portion at an end of the shaft to engage a corresponding threaded socket part. In some embodiments the threaded shaft may comprise a hollow threaded portion. That is the threaded shaft may have an internal thread to mate with a corresponding threaded shaft or male thread, in other embodiments it may have an external facing thread as shown in FIG. 55. In other words, in some embodiments the foot 10 may comprise a threaded socket having an internal thread to mate with a corresponding threaded shaft attached to the object being supported. An example of a foot comprising a threaded socket is illustrated in FIG. 25C.

A tool 50 is used for turning or rotating the foot to adjust the height of the object via adjusting the length of the leg. The tool comprises a driving member 51. The foot comprises a corresponding driven member or feature 13. In the embodiment illustrated in FIGS. 1A to 10, the driving member is a pinion 51 and the driven member or feature comprises a rotary rack 13 on (fixed to) the threaded shaft. In some embodiments the tool comprises a handle 52 coupled directly or indirectly to the driving member 51. A connecting rod 65 may be used as shown in FIG. 10. In the illustrated embodiment the rod coupled between the handle 52 and the driving member 51 is shrouded by an arm 53 extending between the driving member 51 and the handle 52. Rotation of the handle 52 about a longitudinal axis of the handle causes rotation of the driving member 51. With the tool engaged with the foot 10 the driving member 51 is engaged or meshed with the driven member 13 so that rotation of the handle 52 turns the threaded shaft 11 for height adjustment. In the embodiment of FIGS. 1A to 10 the driving member 51 rotates about a lateral axis relative to a longitudinal axis of the threaded shaft when driving the driven member or feature 13. The driving member 51 drives the driven member 13 to rotate the driven member 13 about the longitudinal axis of the leg. In some embodiments the lateral axis is substantially perpendicular to the longitudinal axis of the threaded shaft. In some embodiments the lateral axis is arranged at an angle to the longitudinal axis of the threaded shaft.

Figure 5:
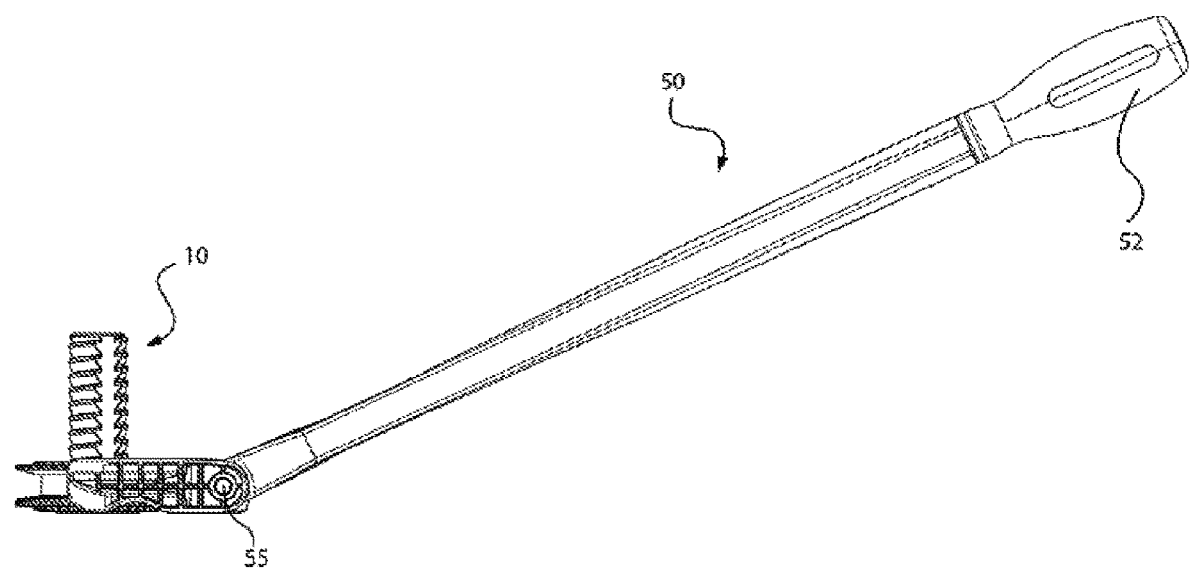
FIG. 5 is a side view of the foot and tool of FIG. 1A with the tool engaged with the foot, and with a handle of the tool articulated to a raised position.
Figure 6:
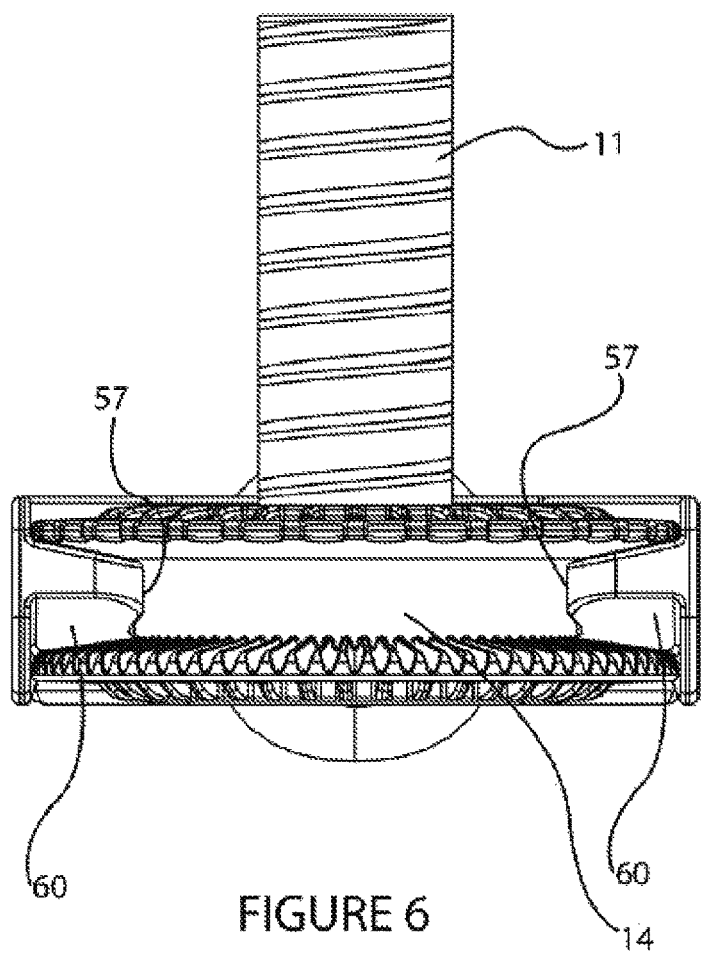
FIG. 6 is an end view of the foot and tool of FIG. 1A with the tool engaged with the foot.
Figure 7:
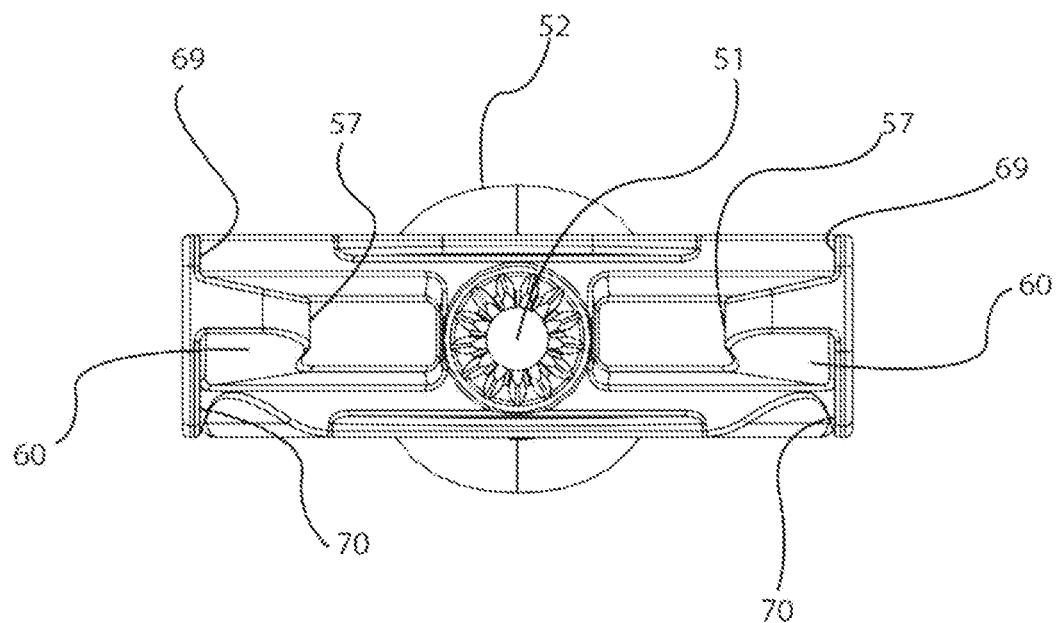
FIG. 7 is an end view of the tool of FIG. 1A on a driving member end of the tool.

In some embodiments the tool comprises a joint 54 between the handle 52 and the driving member 51 so that driving member 51 has a rotational axis able to articulate from a rotational axis of the handle 52. For example joint 54 is a universal joint. In some embodiments the articulation allows a user to move the handle up and down by rotation of the handle and arm about a substantially horizontal axis 55. This movement of the handle may ergonomically assist with use of the tool for height adjustment of the leg. Articulation between the handle and the driven member 13 with the handle rotated about axis 55 to a raised position is illustrated in FIG. 5.

Figure 8:
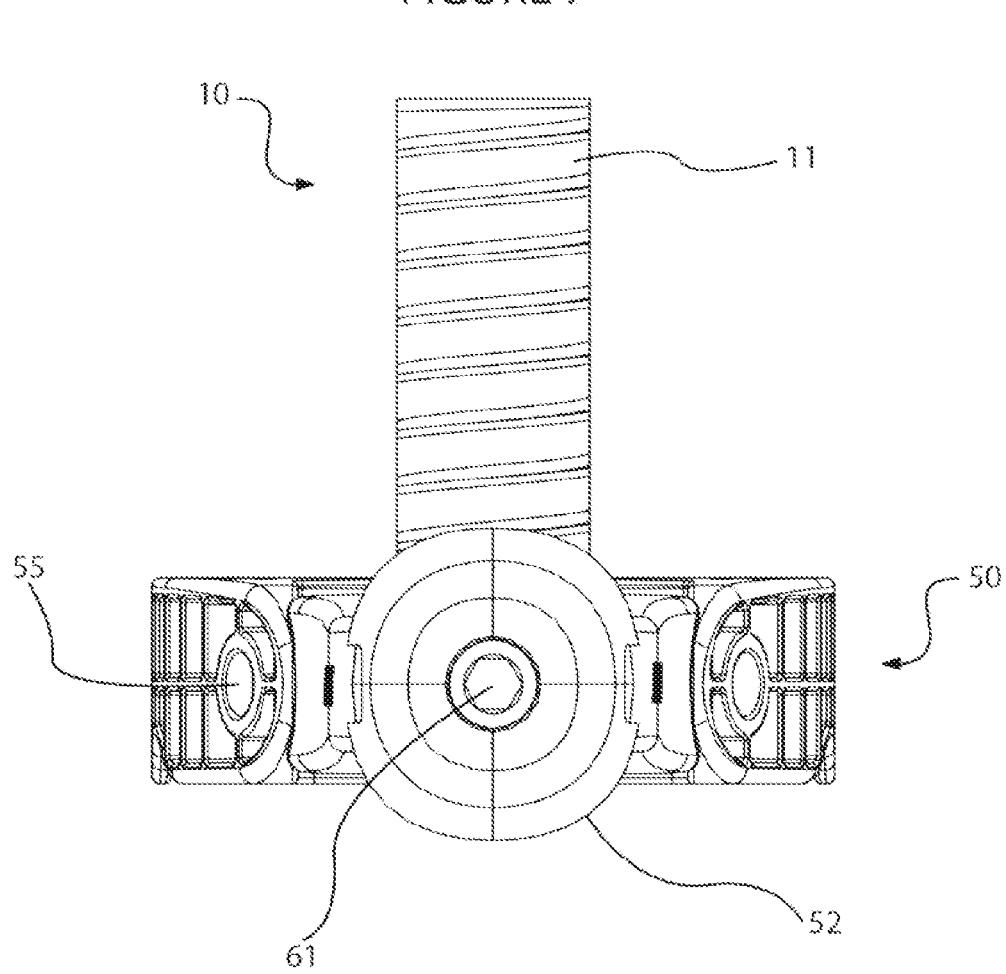
FIG. 8 is an end view of the tool of FIG. 1A on a handle end of the tool with the tool engaged with the foot.

In some embodiments, the handle may be fitted with an interface for connecting an additional tool for applying torque to driving member via the handle. For example, the illustrated embodiment as shown in FIG. 8 comprises a hexagonal socket 61. A user may fit a tool such as a wrench or a power drill to the handle via the hexagonal socket to provide torque to the handle for turning the foot via the driving member. Whether a user turns the handle by hand or by a tool fitted to the handle may depend on the weight of the object being supported by the foot. The handle 52 and/or the interface 61 may be described as a torque input for applying torque to the driving member. The torque input allows a user to apply torque to the driving member, for example by hand using handle 52 wherein the handle is the torque input. In some embodiments the handle 52 is not fitted with an interface for attaching an additional tool, wherein the handle is the torque input. In some embodiments, the tool 50 does not have a handle, but comprises a torque input for attaching an additional tool to tool 50, for example interface 61. In some embodiments the handle of the tool does not rotate to turn the driving member. A user may hold the handle and rotate the driving member using an additional tool via the torque input, for example socket 61.

Other torque input examples are a slot for receiving a screw driver and a square or hexagonal male interface for being received in a female square or hexagonal socket of a drive tool.

In some embodiments the tool may be a power tool. That is, the tool may comprise an electric motor as the torque input for driving the driving member. A motor may be located in a (stationary) handle of the tool, or between the handle and the driving member.

The tool and the foot are complementarily adapted to releasably maintain engagement between the driving member 51 and the driven member or feature 13 to allow the driving member to drive the driven member or feature to rotate the shaft 11. The tool and the foot comprise complementary features to releasably maintain engagement between the driving member and the driven member when the tool is engaged with the foot. The tool and the foot comprise complementary features to releasably maintain engagement between the tool and the foot to releasably maintain engagement between the driving member and the driven member. In some embodiments, the tool and the foot comprise complementary features to assist with alignment of the tool with the foot when engaging the tool to the foot. The foot 10 may be described as a coupling or coupling part of the height adjustable leg for coupling to the tool so that the tool is releasably engagable to the height adjustable leg for height adjustment.

Figure 35:
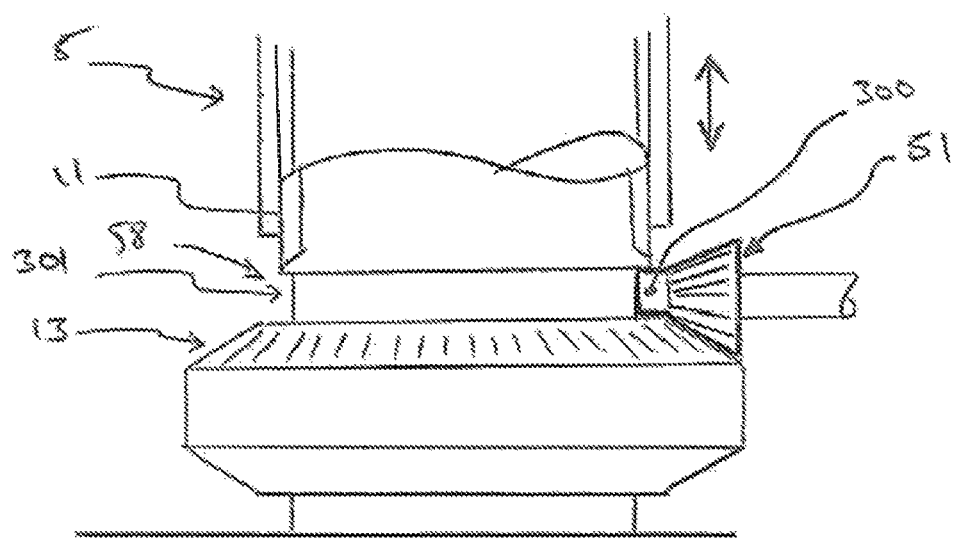
FIG. 35 is a side view of a foot with a feature to allow the driving member to axially register with the driven member, optional radial and lateral registration/hold features not shown.
Figure 36:
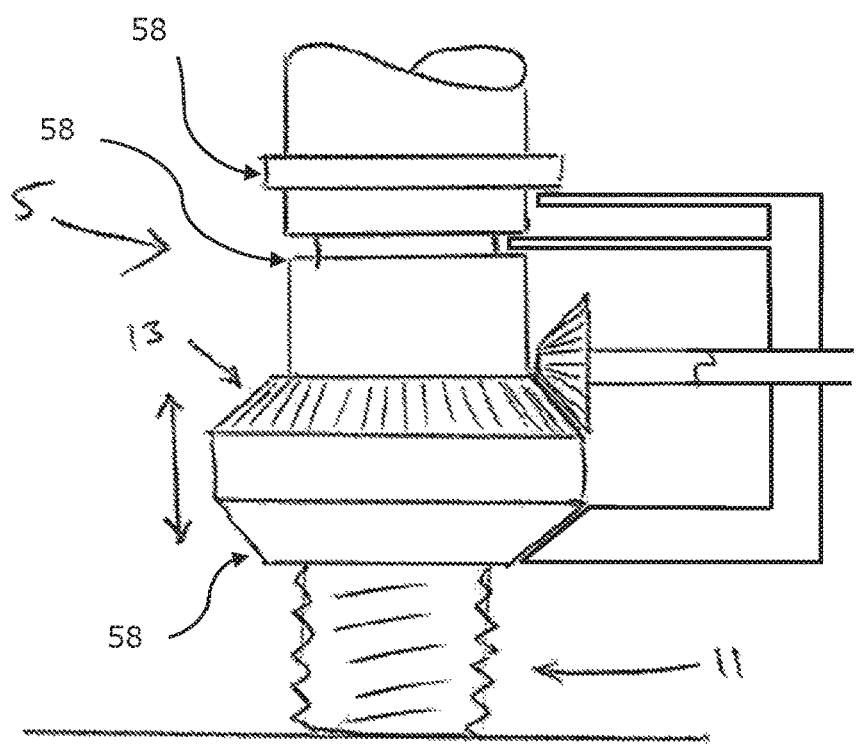
FIG. 36 is a side view of a foot showing a plurality of possible axial direction registration surfaces, one or more of which could be used by the tool to help axial registration and potentially also angle of engagement registration

To engage correctly for operation to allow height adjustment, the tool 50 must be aligned correctly, and stay engaged with the foot 10 in particular so that the driving member and driven member remain coupled together in a condition to ensure rotation transmission. The following conditions are typically required for this to happen;

The driving member 51 is preferably to be registered axially (being in a direction parallel the elongate direction of the leg) to the driven member 13 (i.e. axially). For example as shown in FIG. 35 and FIG. 36.

Figure 37A:
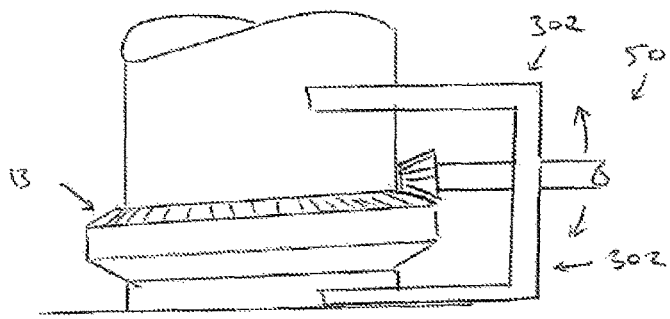
FIG. 37A is a side schematic view of a foot and tool with the ability to control rotation the foot relative the tool there being two options for jaws to provide lateral registration of the tool with foot, axial registration features now shown, for clarity purposes.
Figure 37B:
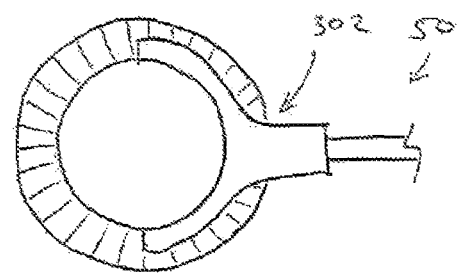
FIG. 37B is a top schematic view of FIG. 37A.
Figure 38:
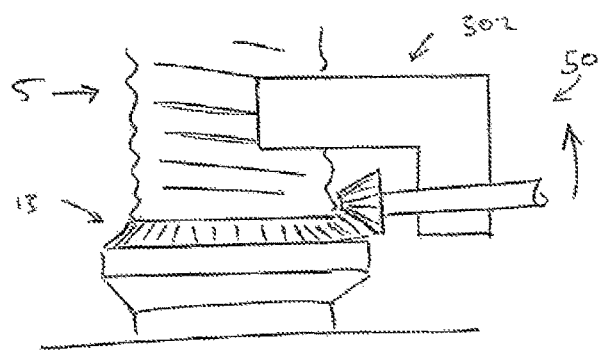
FIG. 38 is a side schematic view of a foot and tool with the ability to control rotation the foot with respect to the tool and there being one option for the tool for lateral registration with the foot, axial registration features now shown, for clarity purposes.
Figure 40:
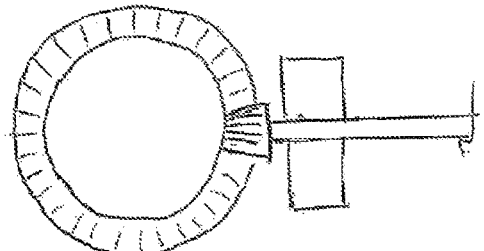
FIG. 40 is a top view of FIG. 39.
Figure 39:
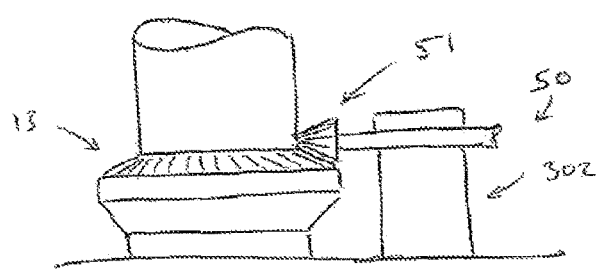
FIG. 39 is a side schematic view of a foot and tool with the ability to control the rotation of with the foot with respect to the tool and the tool utilizing the floor for axial direction registration, lateral registration features now shown, for clarity purposes.
Figure 41:
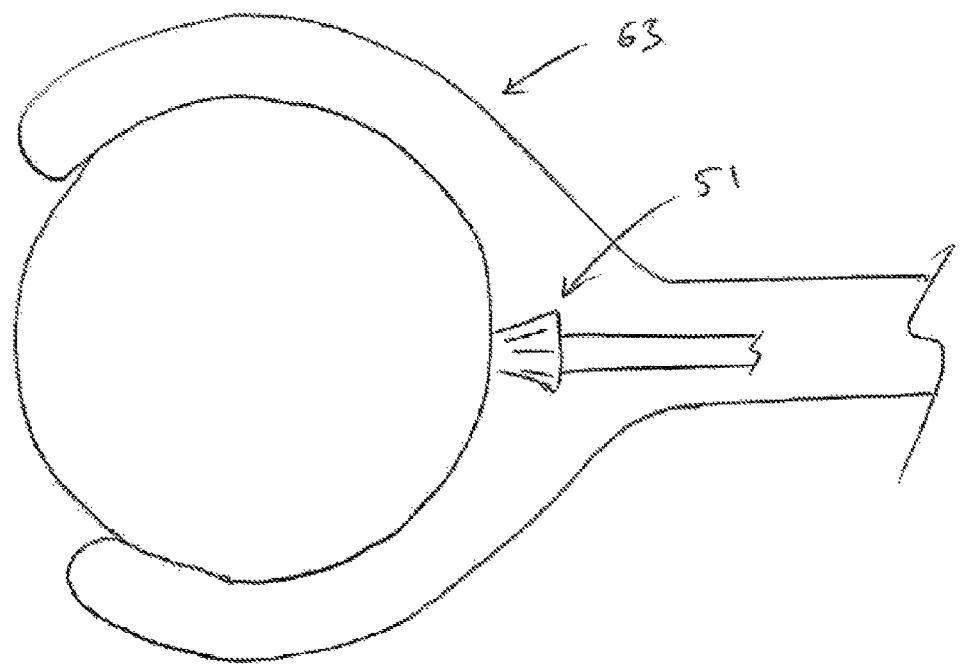
FIG. 41 is a top view of a foot and tool engaged with features to control lateral registration and radial registration by virtue of a snap-fit like jaw being used to capture to the foot.
Figure 42:
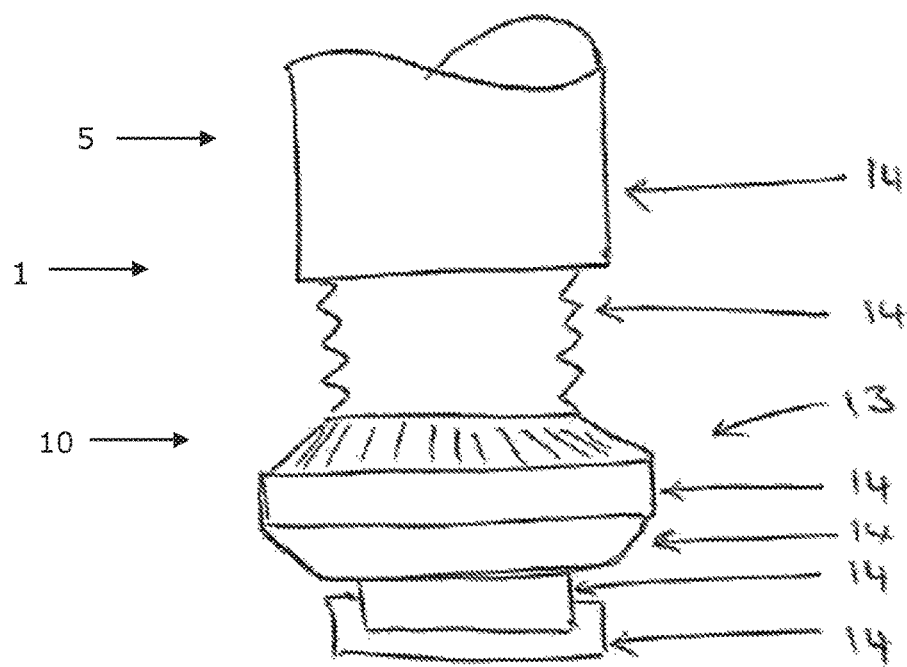
FIG. 42 is a side schematic view of a foot showing possible locations for lateral registration surfaces of the jaw of a tool.

The driving member 51 is preferably registered at a desired rotational angle to the driven member 13 (off horizontal). For example as shown in FIGS. 37-39.

The driving member 51 is preferably registered radially into the driven member 13 (to keep pinion engaged). For example as shown in FIGS. 41-47.

The driving member 51 is preferably registered to the centre of the foot so that the driving member can apply rotational torque to the driven member (i.e. lateral alignment to keep driving member 51 engaged)

There are many features that can provide the above conditions. Some features may satisfy more than one condition.

For lateral registration of the tool and the foot, in some embodiments, the tool comprises a lateral extension 56 for capturing or bearing against a lateral facing surface of the foot, for example surface 14. In some embodiments the tool comprises a lateral extension 56 for capturing or bearing against a lateral facing surface of the foot to releasably retain the tool to the foot in a lateral direction. For example, in the embodiment illustrated in FIGS. 1A to 10 and 41-42, the tool comprises two spaced apart lateral extensions 56. The lateral extensions 56 provide a jaw 63 for capturing the foot laterally to laterally register the tool to the foot. In some embodiments, the jaw 63 captures the foot laterally to releasably retain the tool to the foot in a lateral direction to releasably maintain engagement between the driving member 51 and the driven member 13. A diameter of the foot is complementarily sized to bear against radially facing surfaces of the tool to laterally align the position of the tool correctly to the foot. For example, a diameter 14 of the foot may be complementarily sized to bear against radially inward facing surfaces 57 of the jaw 63 to laterally set the position of the tool correctly to the foot. When the tool engages with the foot the diameter 14 is received within the jaw. In the illustrated embodiment of FIGS. 1A to 10, radial facing surfaces 69 may bear against an outside diameter of circular flange 16. In the illustrated embodiment of FIGS. 1A to 10, radial facing surfaces 70 may bear against an outside diameter of the driven member or feature 13. In some embodiments the tool may comprise lateral extensions 56 for engaging an outer diameter of the threaded shaft. For example, the tool lateral extensions 56 may engage the major diameter of the thread of the threaded shaft, the threaded shaft rotationally sliding on the radial facing surfaces 57 of the lateral extensions when the tool rotationally drives the foot. In some embodiments the foot may comprise a threaded socket and the lateral extensions may engage an outer diameter of the threaded socket.

Figure 11:
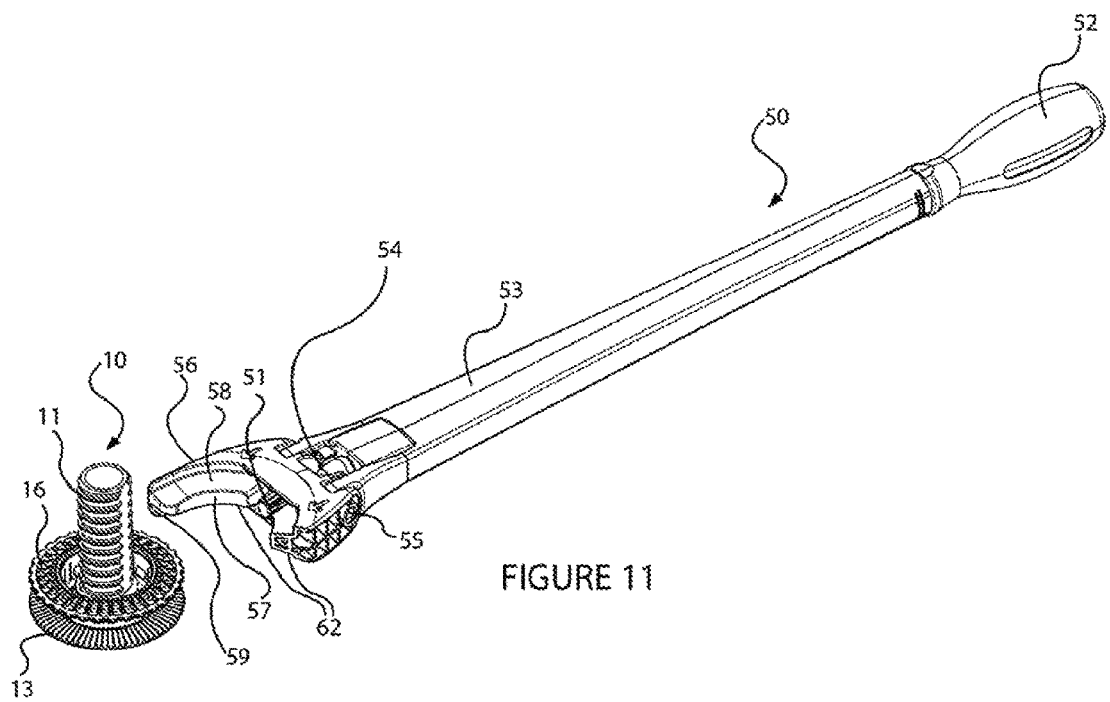
FIG. 11 is a perspective view of the foot of FIG. 1A and an alternative tool for adjusting the foot to adjust the height of an object supported by the foot.

In some embodiments the tool may comprise one lateral extension 56, as illustrated in FIG. 11. The lateral extension comprises a radially inward facing surface 57 that bears against the corresponding diameter 14 of the foot 10. In some embodiments the lateral extension 56 is provided to a side of the foot so that the radial inward facing surface 57 of the tool bears against the corresponding diameter of the foot when the tool is used to drive the threaded shaft of the foot in a direction to increase the height of the object being supported. This arrangement ensures the tool remains engaged to the foot laterally when driving the foot against the weight of the object being supported.

With reference to FIGS. 28 to 32, in some embodiments the foot 10 of a height adjustable leg is comprised of a rotating or rotatable foot part 112 and a spacer 100. The rotating foot part comprises or carries the driven member 13. The spacer 100 may engage the base 105 of the rotating foot part 112 to support the rotating foot part 112 on the floor or supporting surface. The spacer 100 may be attached to the rotating foot part, or may be a separate item to be assembled to the rotating foot part, for example during installation. A spacer 100 may be useful where the foot 10 is supporting an object from a surface that is soft, for example a carpeted floor. A spacer 100 may also be used when overlay flooring is used where the foot would sit on the concrete below the level of the overlay floor, thus preventing tool engagement if the tool is supported by the overlay flooring. Where the leg sits on a carpeted floor or other soft surface, the weight of the object being supported by the leg may push the foot down into the carpet or soft surface such that the tool does not correctly align vertically with the foot when attempting to engage the tool to the foot. In such an installation, the spacer 100 attached to the base 105 of the rotating foot part 112 takes up vertical displacement of the foot into a soft surface so that the rotating foot part 112 and driven member 13 are positioned at a correct vertical height for the tool to engage the foot so that the driving and driven member engage.

In some embodiments the spacer 100 is a cap that attaches to the base 105. The spacer 100 may clip onto or over the base 105. For example an outer diameter or perimeter of the base 105 may be received in an inner diameter of the spacer 100. The inventor has found that a spacer 100 height of about 10 mm to 15 mm can be useful for use on a carpeted surface to assist with ensuring the foot is a suitable height for interfacing with the tool. In some installations a spacer may be useful where the foot is supporting an object from a floor surface below an adjacent surface level on which the tool may be positioned. For example, a cabinet may be supported by a foot on a concrete floor. Adjacent to the cabinet the concrete floor may be covered with a floor overlay such as floor boards. In this example, the spacer 100 may be used to raise the rotating foot part 112 by the thickness of the floor boards so that the tool positioned on the floor boards may reach the foot at the correct height. In some embodiments, the spacer may have a height of about 10 mm to 20 mm. In some embodiments a range of spacers may be provided, each spacer of a different height to suit different floor surface softness or to account for a height difference between adjacent floor surfaces. For example a plurality of spacers may be provided in the height range of 5 mm to 20 mm. For example there may be a height difference of 0.5 mm or 1 mm between spacers in a plurality of spacers.

Figure 28:
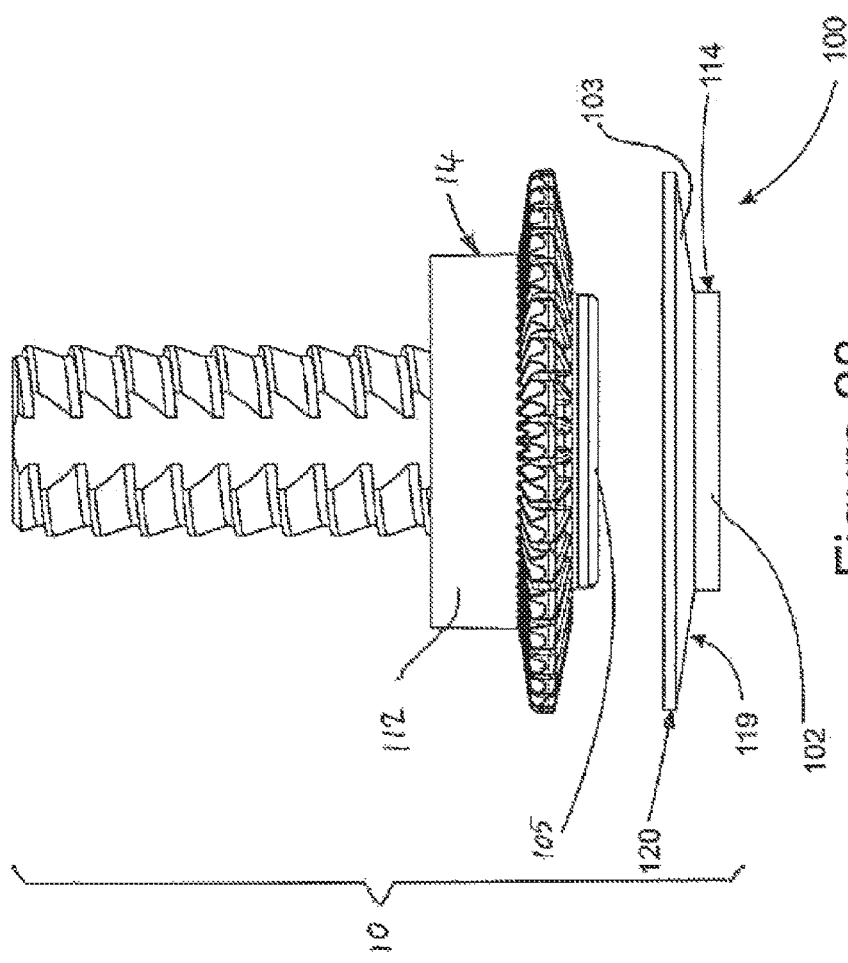
FIG. 28 is an exploded front view of a foot of an alternative embodiment with a spacer.

The spacer 100 may comprise a socket 102 that is capable of receiving and/or indexing the rotating foot part 112. The spacer 100 may further comprise a flange 103 that extends radially outward from the socket 102, as shown in FIG. 28. The flange 103 is configured to receive and guide axial forces from the tool. The socket 102 and/or flange 103 may be configured to receive and guide lateral forces from the tool.

Figure 30B:
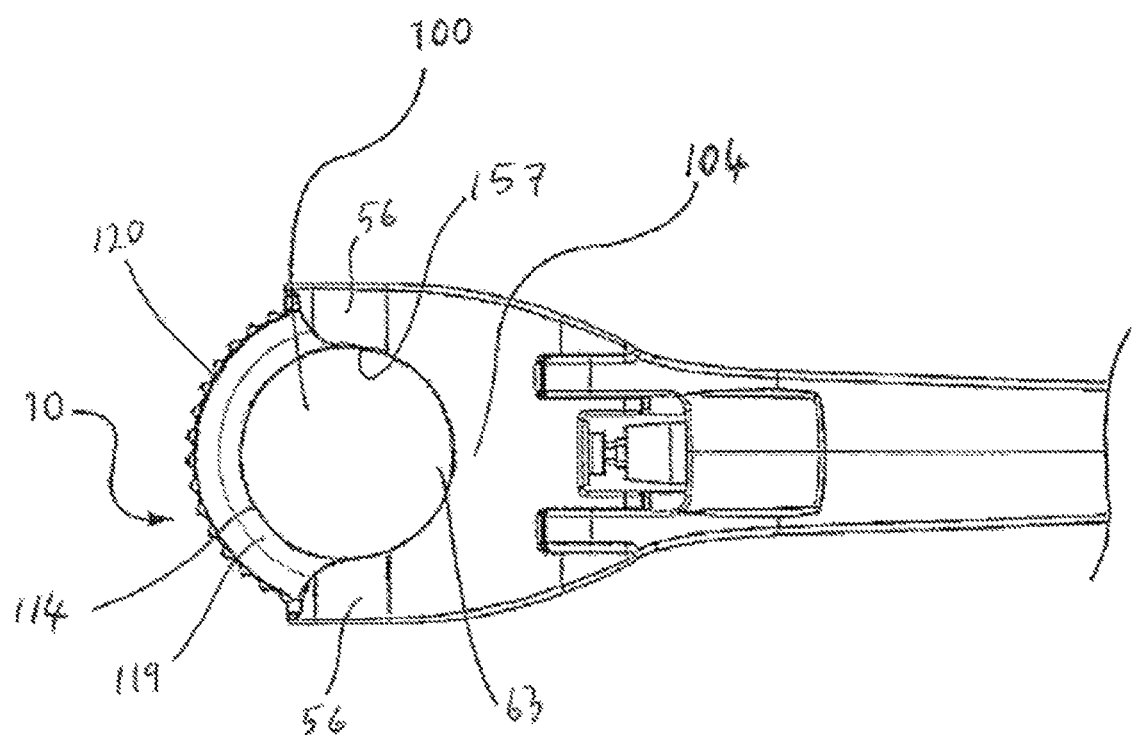
Figure 31:
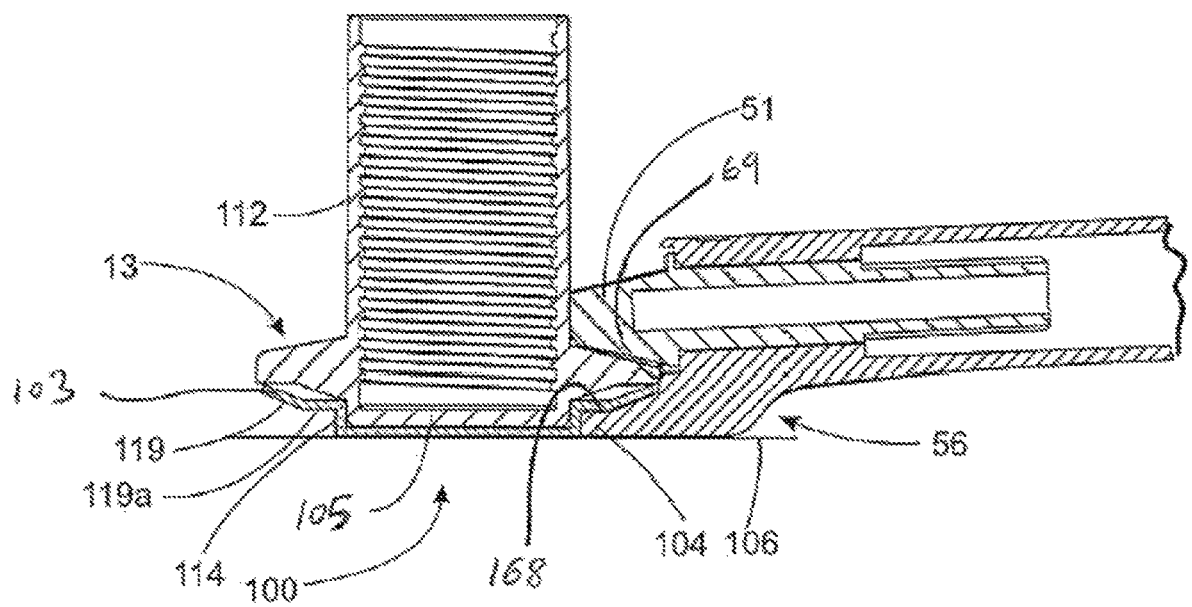
FIG. 31 is a side cross sectional view of the foot and spacer and tool engaged in an alternative embodiment.

The spacer is preferably configured to present an axial direction registration surface to help axially align the tool 50 to the foot 10, to releasably maintain engagement between the driving member 51 of the tool and the driven member 13 of the foot in the axial direction as described below. In some embodiments, the spacer 100 may be configured to also laterally align the tool 50 to the foot to releasably maintain engagement between the driving member and the driven member. For example, as shown in FIGS. 30a to 31, in some embodiments the tool comprises a jaw with lateral extensions 56 for capturing or bearing against a lateral facing surface of the foot, for example a spacer lateral surface 114. The spacer lateral surface 114 is a cylindrical face, and has a diameter 114. The height of the base part lateral surface 114 is dependent on the design of the cabinet and tool. Ideally there is enough height to promote a strong relationship of lateral engagement between the tool and the foot. The spacer lateral surface 114 provides a lateral alignment relationship like the surface 14 described above.

The diameter 114 of the spacer is preferably complementarily sized to bear against radially facing surfaces of the tool to help laterally align the position of the tool correctly to the foot. For example, a diameter 114 of the base part 102 may be complementarily sized to bear against radially inward facing surfaces 157 of the jaw 63 to laterally set the position of the tool correctly to the foot, as shown in FIG. 30b, much like the radially inward facing surfaces 57 and diameter 14 described earlier. In other embodiments the lateral surface 114 is not cylindrical, but polygonal. A polygonal surface is able to be used as there may not be relative rotation between the base part 102 and the tool, with relative rotation provided between the base part 102 and the rotating foot part 112. However, a polygonal shape may make it more difficult to initially index the tool about the foot upon first engagement, as it will require more accurate tool alignment to do so. A round or cylindrical lateral indexing surface or surfaces of the spacer means that the tool can engage with the spacer from any angular direction.

FIG. 31 shows a spacer 100 with a thicker base to create a larger surface 114 to engage with the tool inward facing surfaces 157. Lateral alignment with the tool may be provided by another lateral facing surface of the spacer 100, for example an outer diameter 120 of the flange of the spacer 100.

Figure 32:
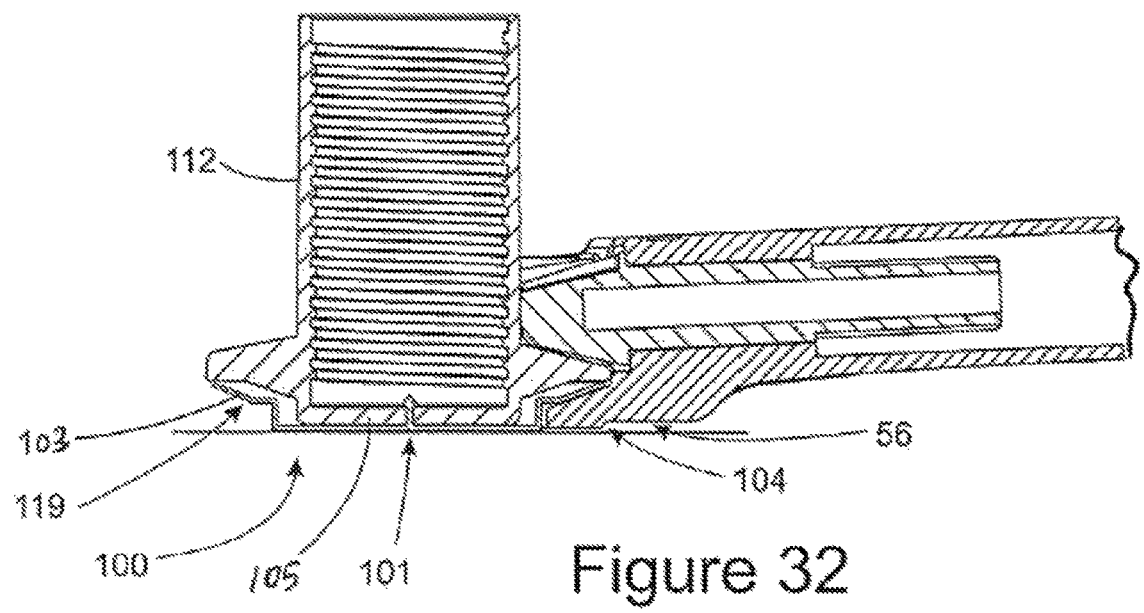
FIG. 32 is a side cross sectional view of the foot and spacer and tool engaged in an alternative embodiment.

FIG. 32 shows an alternative embodiment of a spacer, where the spacer 100 is attached to, or connects to, the rotating foot part 112. A connection 101 between the rotating foot part and the spacer may be configured to prevent substantial rotation between the spacer 100 with the rotating foot part 112, however in another embodiment allows relative rotation between the rotating foot part 112 and the spacer 100. This embodiment also shows a larger socket 102 that the rotating foot part 112 can fit into. Due to the connection 101 being present to align the spacer 100 relative to the rotating part 112 of the foot, the socket 102 does not need to be a snug fit with the base 105. The connection shown is merely an example, and many different types of connection are possible between the spacer 100 and rotating foot part 112.

The connection 101 may be a set height connection which allows a user to adjust the spacing between the spacer 100 and foot part 112. For example, the set height connection 101, may be a threaded type connection, so the spacer 100 can be rotated relative the foot part 112, to allow the overall height of the foot 10 to increase or decrease, or at least raise the foot part 112 further away from the support surface and/or spacer 100.

Figure 29:
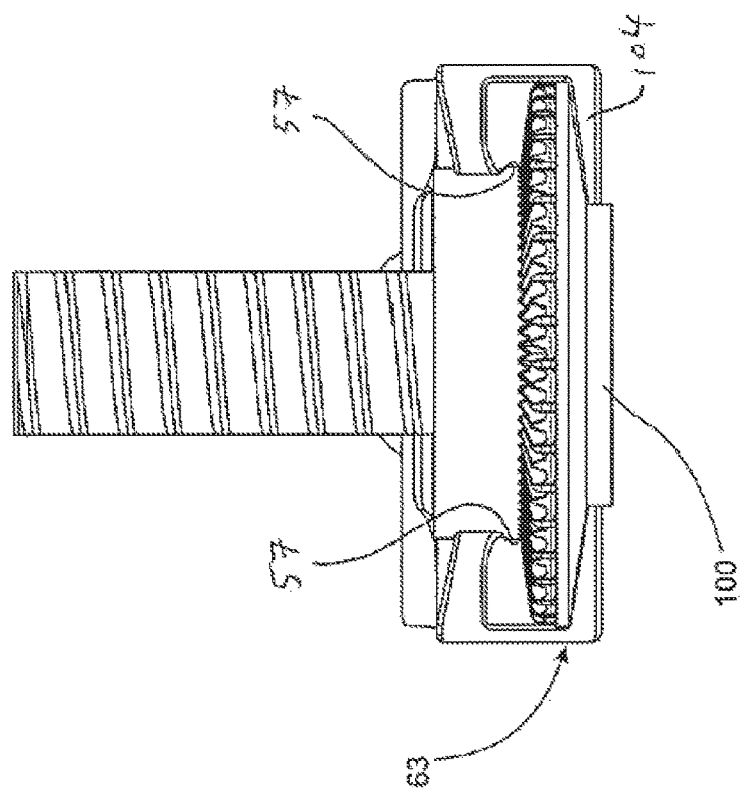
FIG. 29 is a collapsed front view of a foot with the spacer of the embodiment of FIG. 28, with a tool engaged.

In some embodiments, lateral alignment surfaces may be on another part of the foot 10, separate from the spacer 100. For example, the lateral extensions 56 of the tool may laterally engage either the spacer 100 or another part of the foot 10 or leg 1, for example the rotating foot part 112. For example the jaw 63 may provide lateral surfaces 57 to bear against a diameter 14 of the rotating foot part 112, as shown in FIG. 29, whilst a flange 104 (described below) of the tool 50 engages with the flange 103 of the spacer 100 for axial alignment.

Figure 58A:
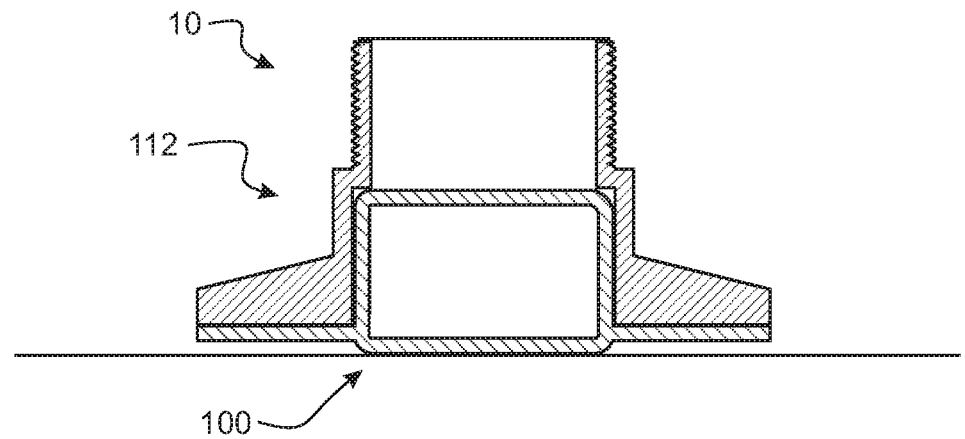
FIG. 58A shows a side cross section view of an alternative embodiment of a rotating foot part and complementary spacer in a first position.
Figure 58B:
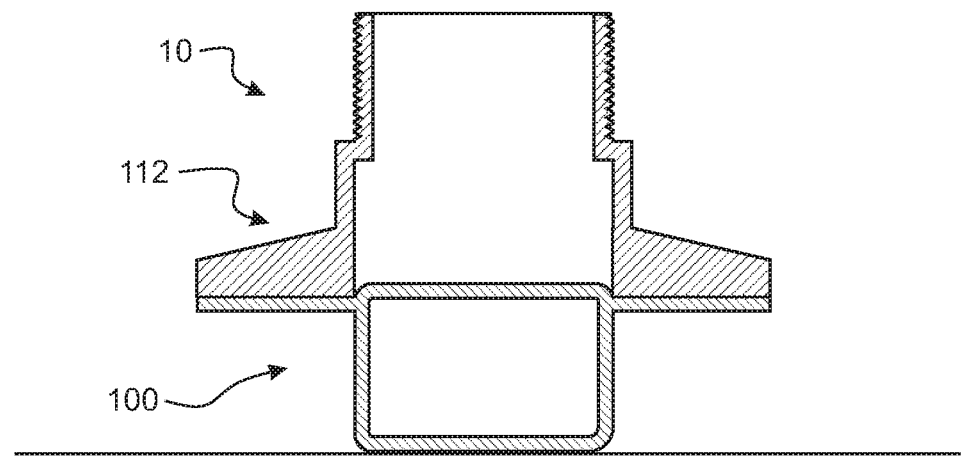
FIG. 58B shows FIG. 58A in a second position.

In a further embodiment as shown in FIGS. 58A and 58B the spacer can be seen to be able and configured to be inserted into and within a portion of the rotating foot part 112. FIG. 58B shows a second position of the spacer 100 of FIG. 58A, where the spacer has been flipped upside down so as to change the height of the rotating foot part 112 from the to supporting surface. The spacer 100 is still able to be inserted and engaged into the rotating foot part 112. As with other embodiments, the spacer 100 shown in FIG. 58 may also comprise axial and/or lateral alignment/bearing surfaces that can be engaged with by the tool 50.

Figure 59A:
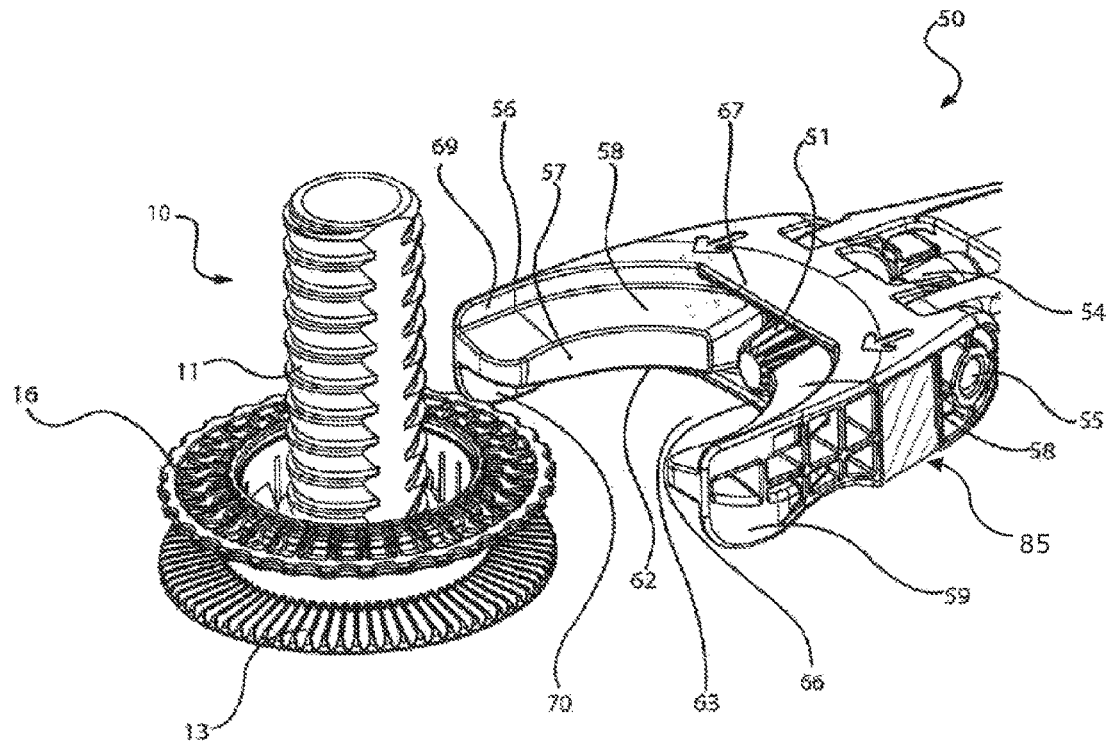
FIG. 59A shows a perspective view of a tool with a lifting feature in a retained position.
Figure 59B:
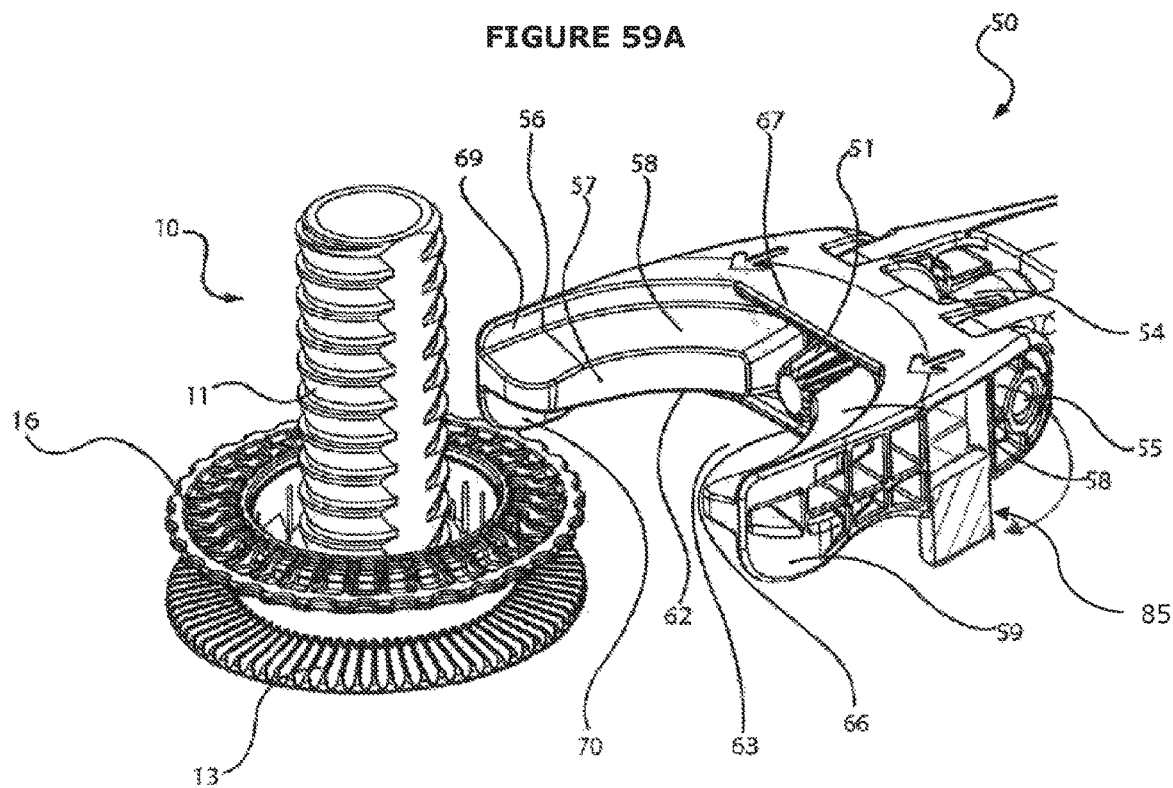
FIG. 59B shows a perspective view of a tool with a lifting feature in an extended position.
Figure 60A:
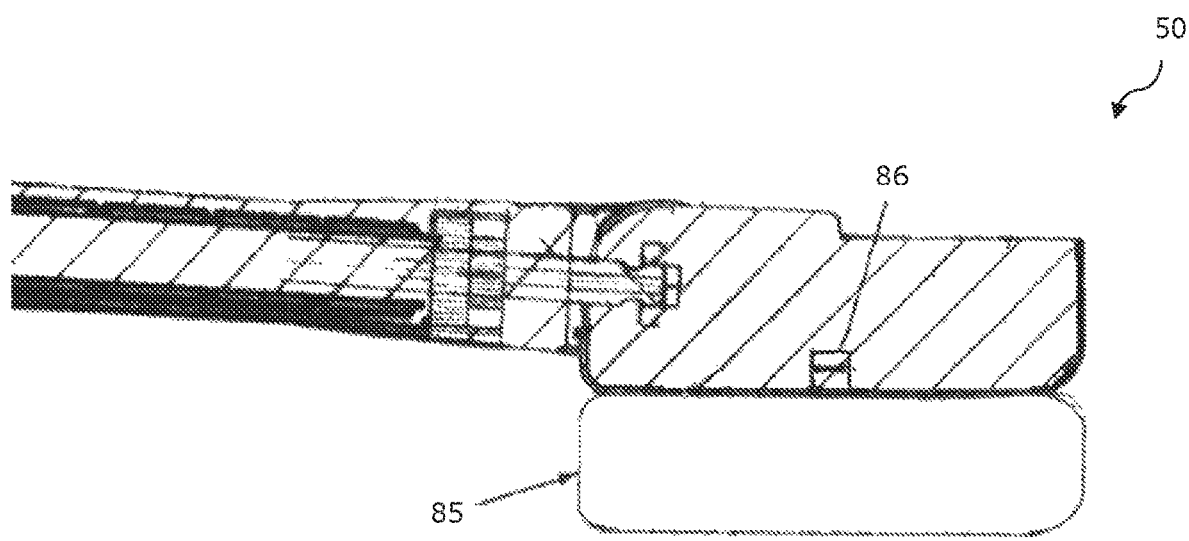
FIG. 60A shows side view a tool with an alternative lifting feature.
Figure 60B:
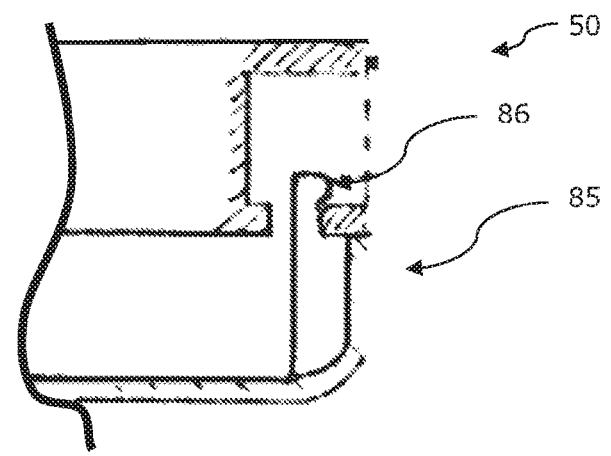
FIG. 60B shows a close-up side cross section view of the connection between the lifting feature and tool of FIG. 60A.

Should a spacer 100 be used to lift a rotating foot part 112 a distance above the supporting surface, then the tool 50 may comprise lifting features 85 that lift the tool 50 a distance above the supporting surface also. Such a feature is shown in FIGS. 59A and 59B relating to 85A and 58B respectively. Preferably to amount of lift the lifting features 85 provide is equal to the amount of the lift that the lifting spacer 100 provides. The lifting features 85 allow the tool 50 to be guided along the supporting surface and still engage at the correct vertical alignment with the foot 10, where the foot 10 comprises a spacer 100 lifting the driven member 13 a distance off the supporting surface. The lifting features 85 as shown in FIG. 59 is a pivotable tab that may swing down from a retained position, FIG. 59A, to a lifting position, FIG. 59B. Alternatively the lifting features 85 may slide down from a retaining position to a lifting position. In alternative embodiments as shown in FIGS. 60A and 60B the lifting feature is a clip-on features 85 utilising a clip 86 to retain the lifting feature 85 onto the tool 50. There may be different sized clip-on features 85 that correspond to like sized spacers 100, so as to allow the driving member to quickly engage with the driven member easily, via sliding the tool along the supporting surface to subsequently engage the foot which is also supported on the supporting surface.

Figure 9:
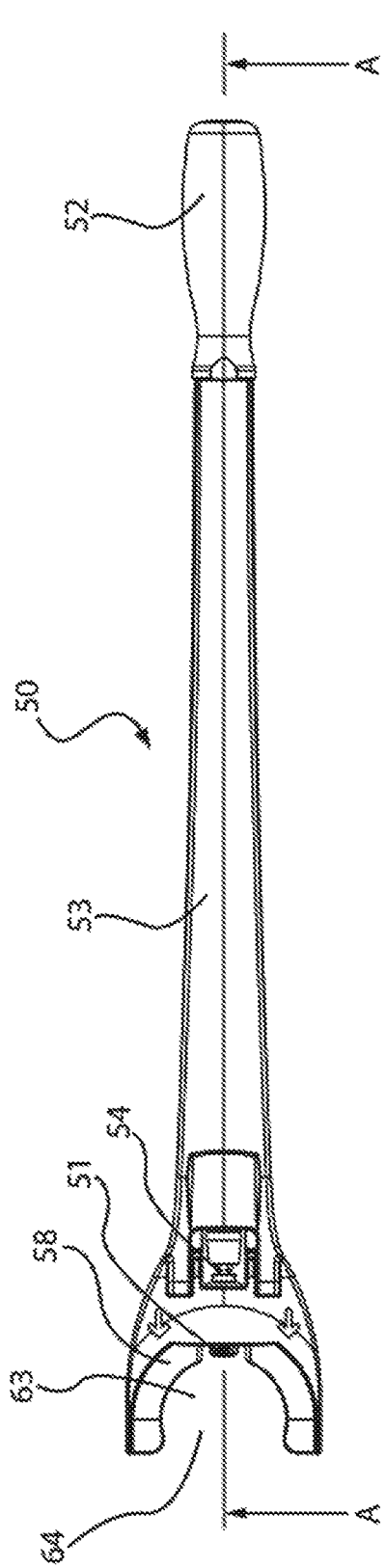
FIG. 9 is a top view of the tool of FIG. 1A.
Figure 10:
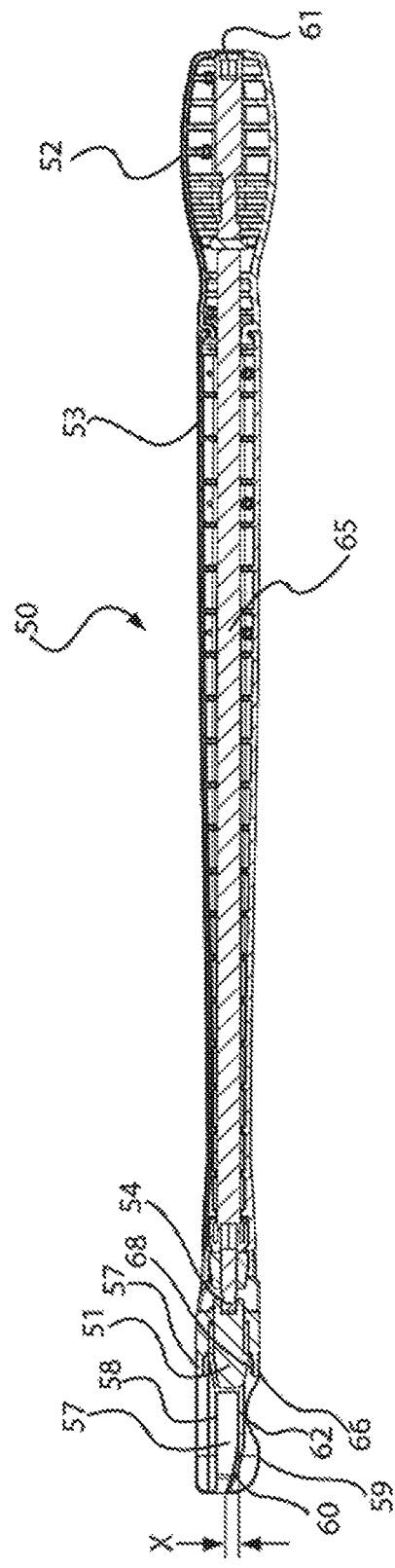
FIG. 10 is a cross sectional view of the tool of FIG. 1A on a longitudinal centre line (A-A in FIG. 9) of the tool.

With reference to FIG. 9, in some embodiments the entrance 64 to the jaw 63 is narrower than the diameter 14 of the foot 10 to which the jaw engages. In other words, in some embodiments the jaw extends around the diameter 14 of the foot 10 by more than 180 degrees to capture the foot in the jaw when the tool is engaged with the foot. To engage the tool with the foot, the jaw elastically deflects slightly (for example lateral extensions 56 bend outwards) to allow the foot to pass through the entrance 64 of the jaw. Once the foot is received in the jaw the jaw returns to its un-deflected position or a less deflected position so that the tool is 'clipped' to the foot. To remove the tool from the foot it is necessary to apply a force to the tool to pull the tool from the foot in the direction of the arm to deflect the lateral extensions to 'unclip' the tool from the foot.

The jaw 63 formed by lateral extensions 56 may be described as being C shaped. In some embodiments the jaw extends around diameter 14 of the foot by 180 degrees, or less than 180 degrees, to capture the foot laterally to releasably retain the tool to the foot in a lateral direction to releasably maintain engagement between the driving member 51 and the driven member 13 as the driving member drives the driven member for height adjustment of the leg 1. The tool, although laterally coupled or secured to the foot to maintain engagement between the driven and driving members, may be released from the foot by moving the tool laterally away from the foot in the direction of the arm of the tool. The tool is laterally coupled or secured to the foot in all other lateral directions. To keep the tool engaged with the foot, a user may push the tool against the foot in the direction of the arm. In the embodiment where the jaw extends around the foot by more than 180 degrees, there is no requirement to push the tool against the foot to maintain engagement as the tool is clipped to the foot.

Figure 45:
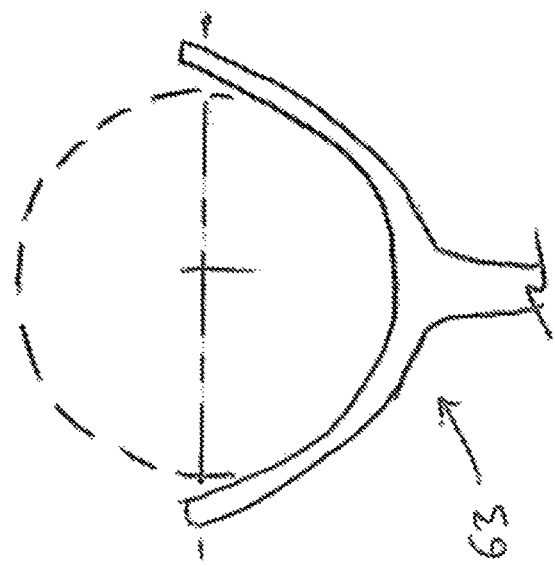
FIGS. 43-45 shows a variety of jaw configurations.
Figure 44:
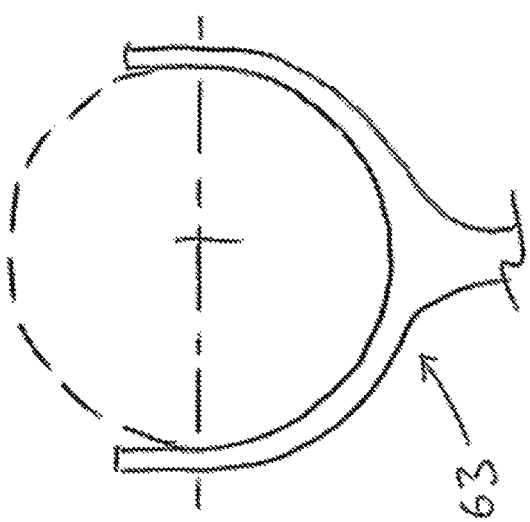
Figure 43:
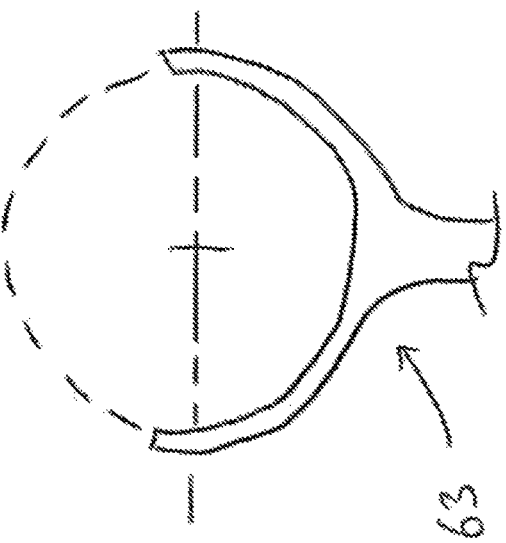

Examples of different jaw entrances are shown in FIGS. 43-45. Where FIG. 43 shows a jaw extending around more than 180 degrees of a diameter of the foot. FIG. 44 shows a jaw extending around 180 degrees. This type of jaw wouldn't need any give or flex to extend about a diameter of the foot. FIG. 45 shows a jaw extending around less than 180 degrees of a diameter of the foot.

Figure 46:
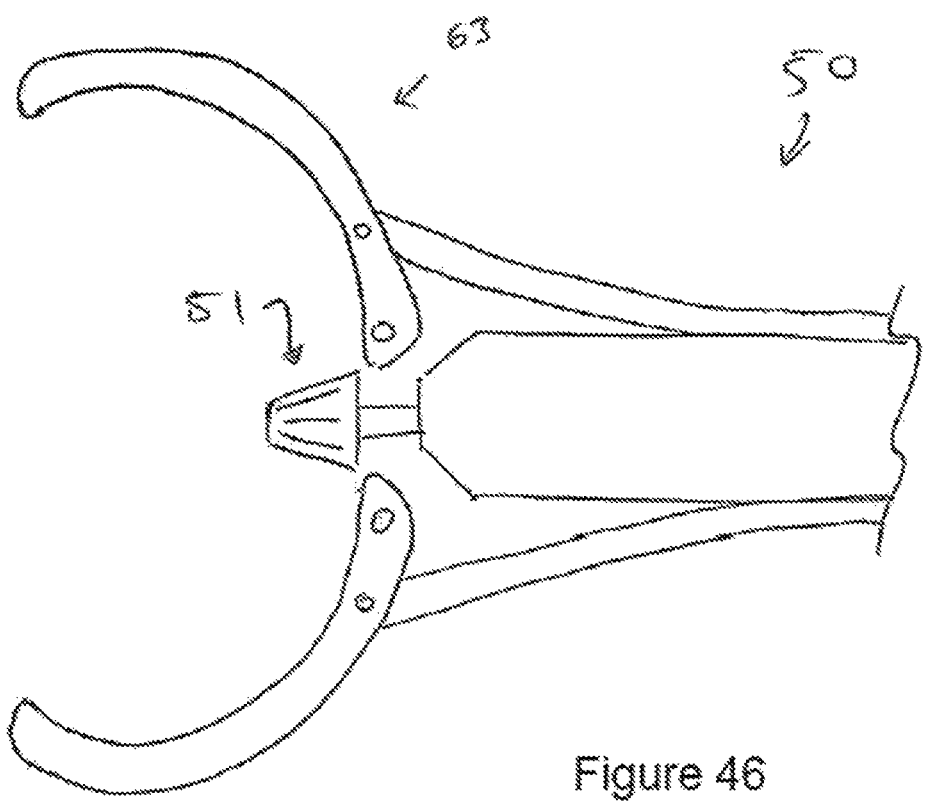
FIG. 46 is a top schematic view of a tool with a jaw of an alternative embodiment in an open condition.
Figure 47:
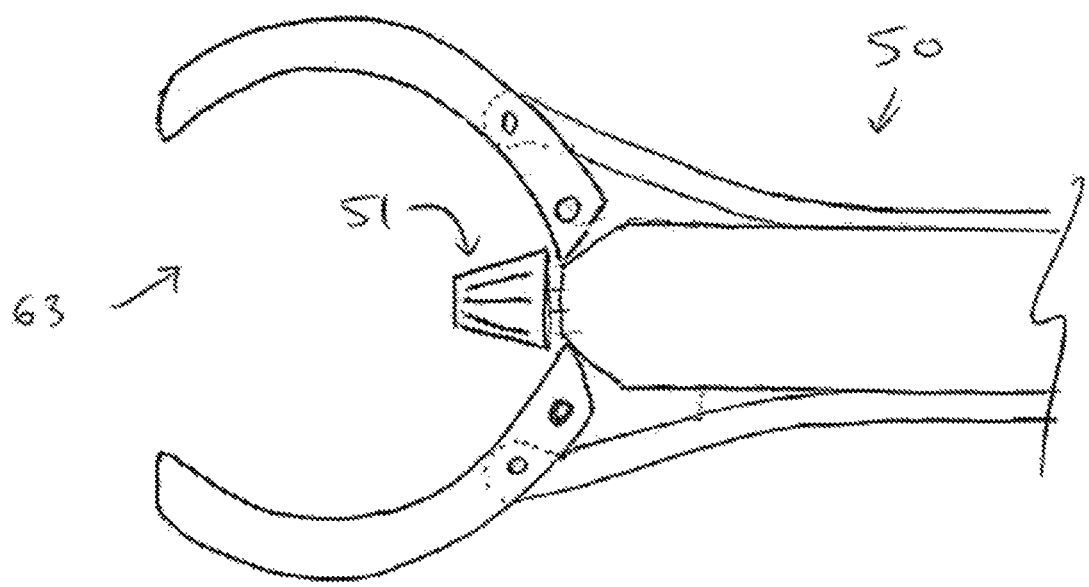
FIG. 47 is a top schematic view of the tool of FIG. 46 in the closed condition.

In an alternative embodiment one or both lateral extensions 56 may pivot between an open position to allow the tool to engage with the foot, and a closed position where the jaw of the tool grabs or closes around a diameter of the foot, as shown in FIGS. 46 and 47. For example, each lateral extension 56 may pivot about a vertical axis so that the jaw 63 may present an open state to receive the foot. Once the foot is received in the jaw the lateral extensions 56 are pivoted to close the jaw around the foot. The tool 50 may be provided with an actuator to move the jaw 63 between an open and closed position. For example the actuator may comprise a rod that extends from the handle to the jaws of the tool and a mechanism to cause translational movement of the rod along the arm of the tool to rotate the lateral extensions between the open and closed positions. The actuator preferably allows the jaw to be operated from the handle end of the tool. The tool may comprise an over centre type mechanism to help keep the jaw relatively locked in the closed position.

The configurations of jaw 63 described above may be used for one or more of; axial alignment (holding the driving member (typically vertically) into the driven member); lateral alignment (centering the driving member with the driven member) and in some embodiments, to hold the driving member radially into the driven member.

For axial alignment of the tool and the foot, in some embodiments the tool comprises an axial direction registration surface 58 and the foot comprises a corresponding axial direction registration surface 15. In some embodiments, contact between the tool and foot axial direction registration surfaces 58, 15 releasably retain the tool to the foot in an axial direction to releasably maintain axial direction engagement between the driving member 52 and the driven member 13. In some embodiments contact between the axial direction registration surfaces of the tool and foot holds the driving member against the driven member. In the embodiments illustrated in FIGS. 1A to 11, the axial direction registration surface 15 is provided by a flange 16 axially spaced from the driving member or feature 13. The tool is captured axially between the flange 16 and the driving member or feature 13 to axially align the position of the tool correctly to the foot for engagement between the driving member and the driven member.

Alternative axial direction registration surface(s) or features 58 are shown in FIGS. 35 and 36. FIG. 35 shows an extended portion 300 extending from the driving member that can engage with a complementary groove 301 to ensure that the driving member 51 is axially engaged with the driven member 13. The extended portion 300 is preferably cylindrical in shape, extends from the tip of the driving member but does not engage with the driven teeth of the foot. The cylindrical shape of the extended portion 300 allows the extended portion 300 to rotate within the groove 301. At the same time the extended portion 300 is also configured to slide along the groove 301, or at least slip relative to the groove 301.

FIG. 36 shows another embodiment of a foot with multiple axial direction registration surfaces or features 58. These features 58 are able to provide a face or edge for the tool 50 to be received on or against to allow an axial resistive force between the tool and foot. Some examples of a feature 58 are an upper facing surface, a lower facing surface, a radially extending flange, a slot, an angled surface, et cetera or a combination of the above. Any feature that is able to have a resistive axial load upon it from the tool, and also allows the tool to rotate relative to the foot, will suffice for a feature 58 that is able to axially support the tool or prevent the tool from becoming disengaged axially with the driven member. FIG. 36 also shows a threaded member that acts in the same mode as the embodiment shown in FIG. 12, where the threaded foot 11 does not rotate relative the support surface.

Figure 26E:
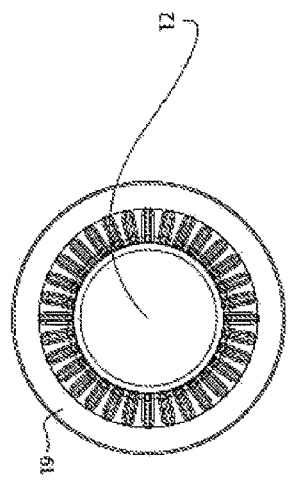
FIG. 26E is a bottom view of the foot of FIG. 26A
Figure 26B:
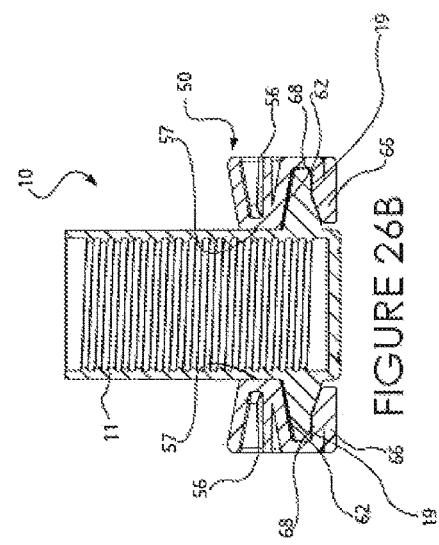
FIG. 26B is a cross sectional view of the foot and tool of FIG. 26A, the cross section being on a longitudinal centre line of the foot and lateral to the tool.
Figure 26D:
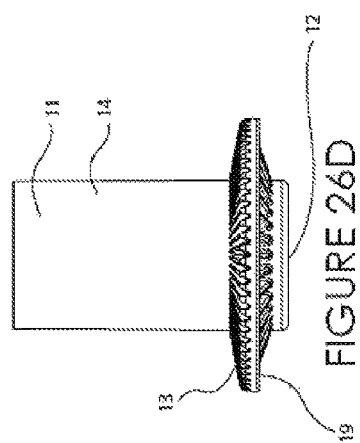
FIG. 26D is a side view of the foot of FIG. 26A.
Figure 26A:
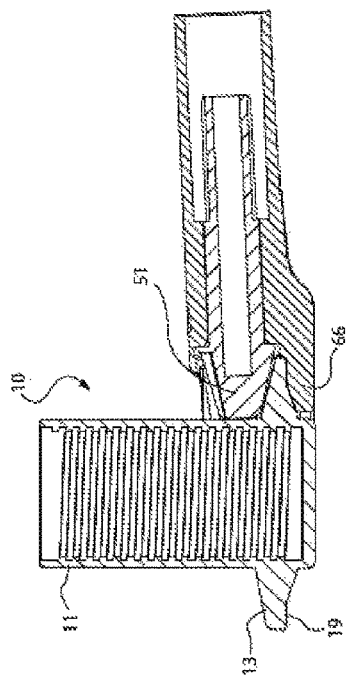
FIG. 26A is a cross sectional view of an alternative foot and portion of a tool, with the tool engaged with the foot, the cross section being on a longitudinal centre line of the tool and the foot.
Figure 26C:
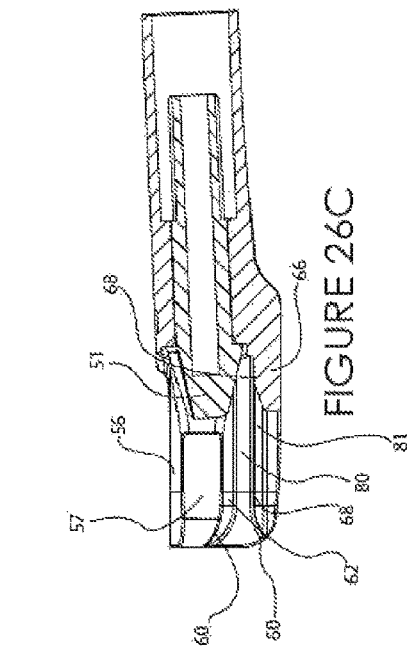
FIG. 26C shows the cross section of the tool of FIG. 26A with the foot removed.

In some embodiments, the tool comprises a first axial direction registration surface and a second oppositely facing axial direction registration surface, for example surfaces 58 and 62. In the illustrated embodiment of FIGS. 1A to 11 the first and second axial direction registration surfaces are able to be captured in a slot or channel extending circumferentially around the foot. A circumferential channel 18 in the foot is defined by the axial direction registration surface 15 and the oppositely facing rotary rack 13. Surface 15 and the driven member 13 form axial sides of the channel 18. The axial direction registration surfaces of the tool are preferably provided on the lateral extensions 56. When aligning the tool with the foot, the first axial direction registration surface 58 of the tool bears against the foot axial direction registration surface 15, and/or the second axial direction registration surface 62 of the tool bears against surfaces of the rotary rack 13 to axially locate the tool to the foot. Tooth tips of teeth of the rotary rack 13 form a discontinuous annular axial direction registration surface. In some embodiments, each tooth comprises a flat portion at a tip of the tooth, as illustrated by the embodiment of FIG. 26D, the flat portions of the teeth combining to form the discontinuous axial direction registration surface.

In some embodiments, an axial direction registration surface of the driving member contacts an axial direction registration surface of the foot to position the tool to the foot in the axial direction. For example, the pinion 51 may be captured between the rack 13 and surface 15, a tooth tip or tips of the pinion providing an axial direction registration surface of the tool to contact surface 15 to maintain the driving member 51 in contact with the driven member 13. With the tool engaged with the foot, the driving member 51 may be axially captured between the driven member 13 and axial direction registration surface 15. As the pinion rotates, each tooth tip may contact the surface 15, each tooth tip providing an axial direction registration surface as it rotates into contact with the surface 15.

Figure 48:
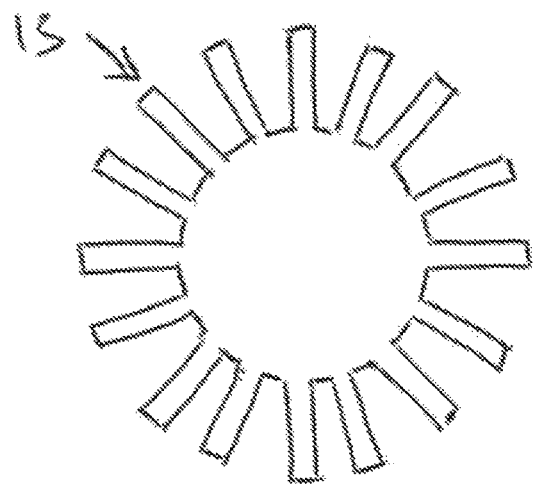
FIG. 48 shows a top schematic view of a driven member of a spoked formation.
Figure 49:
FIG. 49 shows a side schematic view of the driven member of FIG. 48 engaged with a spoked driving member.
Figure 50:
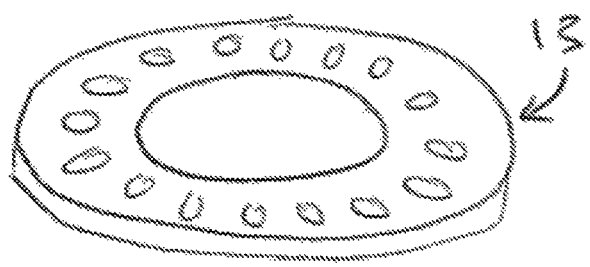
FIG. 50 shows a top schematic view of a driven member of a slotted configuration.
Figure 51:
FIG. 51 shows a side schematic view of a spoked driving member engaged with the driven member of FIG. 50.
Figure 52:
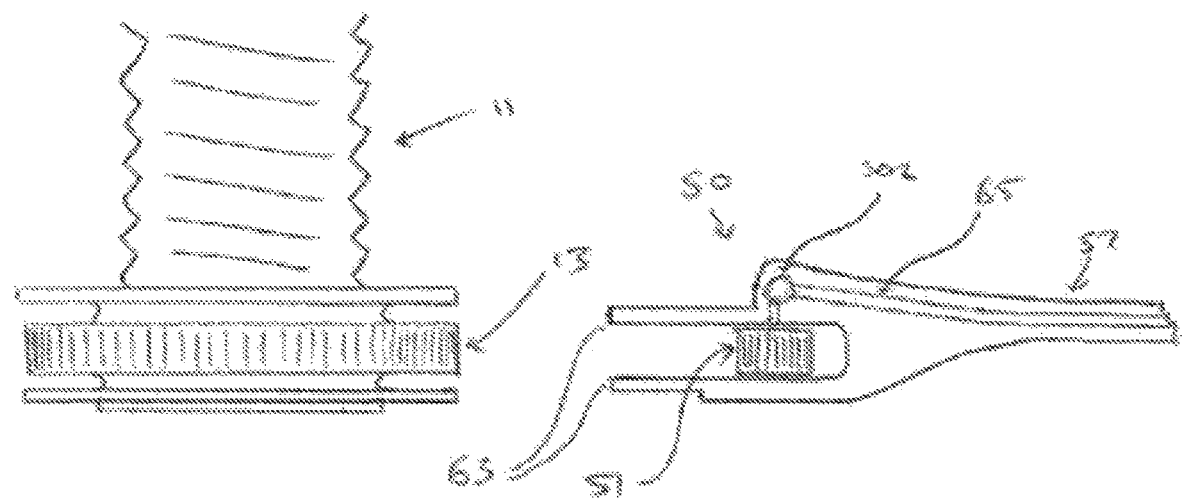
FIG. 52 shows a side schematic view of a foot and complimentary tool of an alternative embodiment where the driving member is rotated about a vertical axis or near vertical axis.
Figure 53:
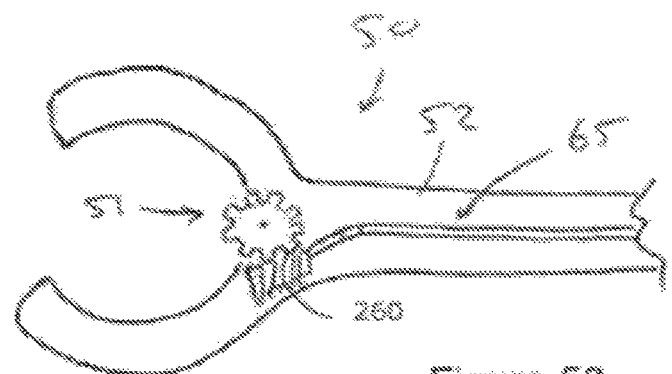
FIG. 53 is a top schematic view of a tool with an alternative embodiment driving member and associated transmission.
Figure 54:
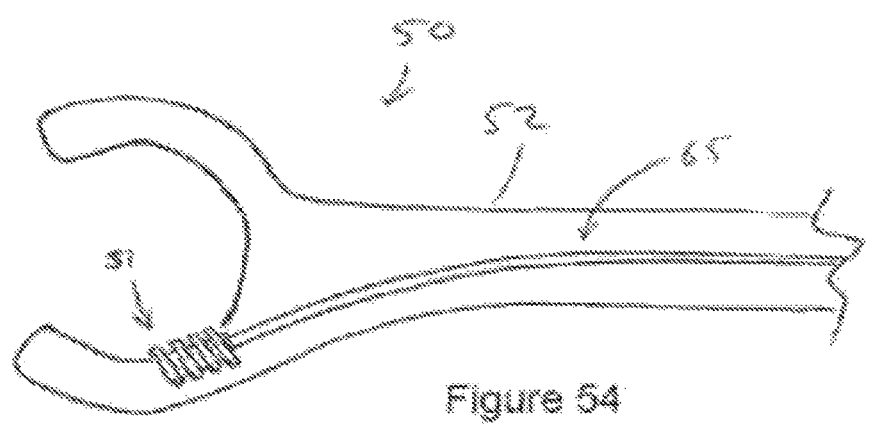
FIG. 54 is a top schematic view of a tool with an alternative embodiment driving member.

Alternative combinations of driving members 51 and driven members 13 are shown in FIGS. 48 to 51. FIG. 48 shows a top schematic view of a driven member 13 of a spoked configuration. The spoked configuration driven member 13 is configured to be adapted to engage with a like driving member 51 as shown in FIG. 49. FIG. 50 shows a top perspective view of a driven member 13 with holes, slots or sockets configured and adapted to receive complementary spokes from a driving member 51 as shown in FIG. 51. Further configurations of driving member 51 configurations are shown in FIGS. 52-54. The spoke shaped driving member may be mounted for rotation about an axis that is perpendicular to the axis of the driven member and that are preferably intersecting axes.

FIG. 52 shows a side schematic view of a foot with a vertical tooth driven member 13 to be complementary engaged with a vertically toothed driving member 51 of a tool 50. The driven member and the driving member are mounted for rotation relative each other about respective and parallel axes. The driving member 51 is driven by the shaft 65 and may consist of a joint 302 that can convert the rotation of the shaft 55 to the direction of rotation of the driving member 51. The tool 50 as shown in FIG. 52 may also comprise jaws 63 for axial engagement, lateral engagement, or hold in engagement conditions.

FIG. 53 shows an alternative embodiment of a tool 50, comprising a vertical rotation driving member 51 which is driven by the driving shaft via a worm gear 260 attached to the driving shaft 55. The driving member 51 mounted for rotation about an axis parallel the axis of the driven member may be used with the driven member 13 as shown in FIG. 52.

A further embodiment of a tool 50 is shown in FIG. 54, wherein the shaft 65 drives a worm gear driving member 51 which can directly engage with a complementary shaped driven member 13 to be driven by the driving member.

In the illustrated embodiment of FIGS. 1A to 10, the driving member is preferably located between lateral extensions 56. With the driving member 51 located in the jaw of the tool (defined by lateral extensions 56), the driving member is located within the circumferential slot or channel 18 that receives the jaw of the tool when the tool is engaged with the foot, and the driven member or feature provides an axial direction registration surface against which the second axial direction registration surface of the tool bears for axial positioning. In an alternative embodiment, the driving member 51 may be spaced axially from the jaw, so that the jaw engages with a circumferential slot or channel spaced axially from the driven member or feature 13.

In the illustrated embodiments of FIGS. 1A to 11, the driven member 13 is a circular flange comprising a rotary rack and the tool is captured axially between the driven member and the axial direction registration surface 15 for alignment. In some embodiments, the driven member 13 may be captured between the driving member 51 and a flange extending from the tool to bear against an opposite axial side 19 of the driving member 13, for example flange 66 (best shown in FIG. 10). In some embodiments, flange 66 of the tool provides a back support for the driven member or feature. Where the object (for example a cabinet) being supported by the foot is heavy, torque transmitted from the driving member to the driven member may produce a force acting to deflect the driven member 13 away from the driving member and out of engagement, or the driving member may tend to lift off the driven member or feature. The flange 66 may support the back or opposite side 19 of the driven member 13 to keep the driven member or feature 13 in contact with the driving member 51. In some embodiments, with the tool engaged with the foot, the driven member 13 is captured between the lateral flange 66 of the tool and the driving member 51. In some embodiments, flange 66 provides an axial direction registration surface 68 to contact corresponding axial direction registration surface 19 of the foot to releasably maintain engagement between the driving member and the driven member or feature in an axial direction.

As described previously, a spacer 100 may be utilized intermediate the foot such as the rotating foot part 112 and a supporting surface—as shown in FIGS. 28 to 32, and FIG. 58. The spacer may be configured for helping tool axial alignment, and axial application of force, between the tool 50 and the foot 10. In some embodiments the tool comprises a flange 104 with an axially facing bearing surface 168 and the spacer 100 comprises a corresponding axial direction registration surface 119. The relationship between the axial direction registration surface 168 and axial direction registration surface 119 of the spacer is configured similar to the relationship between the axial direction registration surface 68 and corresponding axial direction registration surface 19 described herein, to axially align the tool to the foot, to engage the driven member 13 of the foot with the driving member of the tool 50. As shown in FIGS. 30a and 30b lateral extensions 56 may also provide the surfaces for axial support against the spacer.

FIGS. 30a-34 show alternative embodiments of a spacer 100 and tool setup. FIG. 30a shows a thin spacer 100 being used intermediate the rotating foot part 112 and supporting surface 106. A thin base part 100 may be required where overall height is an issue.

The spacer 100 may impart axial force from the tool to the driven member 13, i.e. to a back side of the driven member. However, in some embodiments, the spacer 100 does not rotate with the driven member 13 and rotating foot part 100 when the driven member is rotated by the tool. The spacer may be made from a low friction material, to provide a low friction interface between the rotating foot part 112 and the tool 50 and between the rotating foot part 112 and the supporting surface 106. An example of a low friction material is Ultra High Density Polyethylene or similar. An alternative material may be used depending on the forces present in the structure being supported by the leg. For example if the structure is lightweight, the material of the spacer 100 may not need to be as low friction as UHDP.

In some embodiments, as shown in FIGS. 31 and 32, the spacer 100 does not impart an axial force from the tool to the driven member 13. Instead the spacer 100 receives the axial force from the tool and this is reacted by an axial force into the rotating foot part 112 which is held in the socket of the spacer 100. However, preferably the flange 103 of the spacer bears against a bottom surface (back side) of the driven member 13, as shown in FIGS. 29 and 30, so that there is no gap between the driven member 13 and the spacer 100. The axial direction registration surface 168 of the tool bears against the axial direction registration surface of the flange 103, and the flange 103 bears against the axial direction registration surface of the rotating foot part, i.e. the bottom surface of the driven member 13. In some embodiments the flange 104 is an annular flange to extend fully about the longitudinal axis of the leg.

In some embodiments, during rotational operation of the tool with the driven member 13 the spacer 100 does not rotate, or at least has minimal rotation, with respect to the rotating features of the foot/leg. I.e. the spacer 100 has rotational engagement with the rotating foot part 112, so that there is relative rotation between the rotating foot part 112 and the spacer 100 of the foot 10.

As previously mentioned, the spacer 100 may be connected or not connected to the rotating foot part 112 of the leg. An example of a connected spacer 100 is shown in FIG. 32. The connection of the connected spacer 100 to the foot part 112 allows relative rotation (i.e. rotational engagement) between the rotating foot part 112 and the spacer 100. It is this rotational engagement connection that allows relative rotation between the rotating foot part 112 and the spacer 100, but not the tool and the spacer 100.

In alternative embodiments, the connection between the spacer 100 to the foot part 112 is a fixed rotation connection so that if either of the foot part 112 or the base part 100 is rotated, the respective other part rotates also. In this alternative embodiment, the relative rotation of the tool with respect to the spacer 100 is achieved via slippage between the engaged surfaces of the tool and foot, i.e. the spacer 100 of the foot. Preferably the slippage between the engaged surfaces is due to a low friction material to provide a low friction interface. This low friction interface allows relatively easy slippage/relative rotation between the tool and the spacer 100, and preferably between the base part 100 and the floor or supporting surface, to provide a low friction interface between the rotating foot part 112 and the supporting surface 106 and between the rotating foot part 112 and the tool. The spacer 100 may have a fixed rotation connection via a number of engagements. One such engagement may be a press type fit between the socket 102 and a complementary feature of the rotating foot part 112. Other such engagements such as high friction interfaces, off rotational axis connections, weldments, adhesive, snug fits, or other engagements known in the art may be used to provide a fixed rotation connection between the rotating foot part 112 and the spacer 100.

In some embodiments, the flange 103 comprises the low friction material/low friction material interface as described previously. This allows a low friction interface between the tool and the spacer 100. In alternative embodiments, the portion of the spacer 100 that is not the flange 103 comprises the low friction material or low friction material interface. I.e. the socket 102 as shown in FIG. 28 may be composed of, or comprise, a low friction material so there is a low friction interface between the spacer 100 and the rotating foot part 112. The ground contacting surface of the spacer may be made form a higher friction material such as rubber. As such, the spacer 100 may be manufactured with two materials, wherein at least one of the materials is a low friction material. The spacer 100 may be formed from two separate pieces and joined together, or the spacer 100 may be integrally formed from two materials via for example a two-part injection moulding process. The spacer 100 may be an integrally moulded part formed from a single material, and preferably a low friction material.

In further embodiments, the spacer 100 may comprise an insert (not shown) that fits within the socket that allows the rotating foot part 112 to bear against. The insert may easily rotate with respect to the axial alignment surfaces and lateral alignment surfaces (if present). For example the insert comprise a bearing that allows the insert to rotate with respect to the rest of the spacer 100. This easily rotational capability of an insert allows the spacer not to rely on a low friction interface between the rotating foot part of the leg and the spacer 100, or between the base part 100 and the tool. In an alternative embodiment, the insert may be a very thin low friction material shim (not shown) that is located intermediate the spacer 100 and the rotating foot part 112.

It is envisaged that the spacer 100 may be configured to have any one or more of the features shown and described and in combination. The drawings show a relatively thin base part, but thicker base parts could be created depending on the material characteristics and spacing required. For example, if the axial forces are high, then stronger flanges 103 may be required to prevent deformation during operation.

FIG. 31 also shows an axial facing surface 119a that faces substantially perpendicular to the rotational axis of the foot. It allows the jaw 104 of the tool to index therewith in the axial direction. The perpendicular axial facing surface may be able to withstand axial force of the tool better than an angled face, however it may be more difficult to engage the tool to the foot. FIG. 31 shows both surfaces, the axial and lateral alignment/bearing surfaces being on the spacer 100.

In some embodiments the substantially axial direction registration surface 119a is located adjacent the periphery of the driven member 13 (not shown). Preferably, the flange 103 follows the profile of the underside of the driven member 13—as shown in FIG. 30. So in embodiments where the flange 103 bears against the driven member 13 it does so with the greater possible surface area to reduce overall friction, since an axial force applied by the tool is spread over a larger area.

In some embodiments, the bearing surface 119 is integral with the lateral surface 114 (as shown in FIG. 32). I.e. the bearing surface 119 offers both axial support and lateral support for the tool. However in other embodiments, the axial support and lateral support may be provided by different features and/or different parts of the foot. For example the flange 104 is used to axially engage the spacer, whilst the lateral extensions 56 are used to laterally engage rotating part of the foot 11 as shown in FIG. 30.

Figure 33:
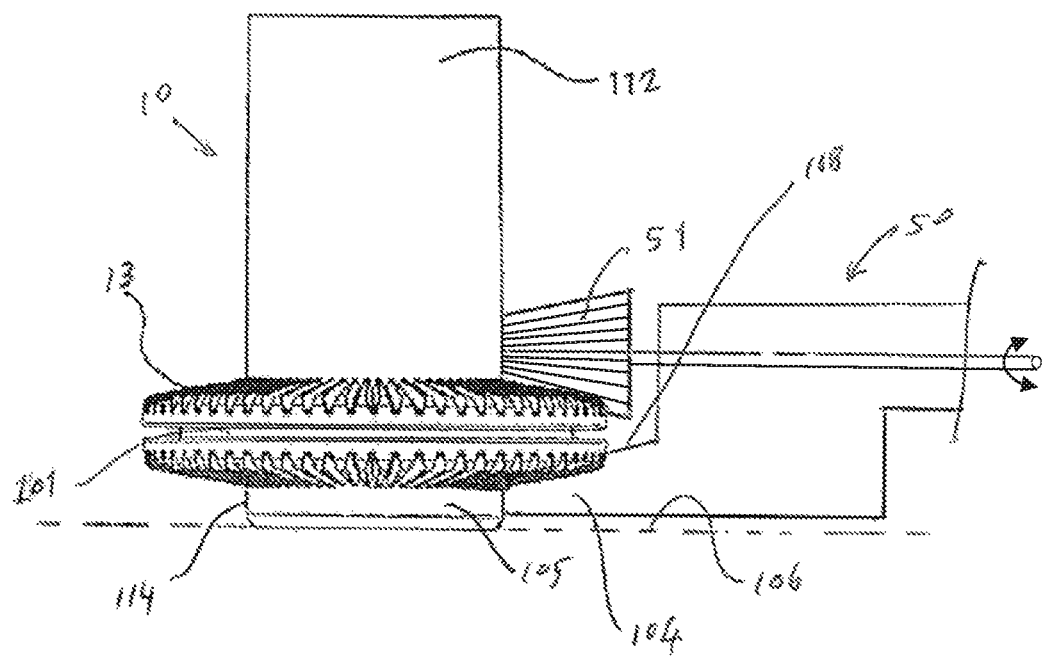
FIG. 33 is a side view of the foot and a schematic representation of a tool engaged with the foot in an alternative embodiment.

In some embodiments, as shown in FIG. 33, the spacer 100, which may be rotationally attached or connected to the rotating foot part 112 by a rotational connection 101, comprises radial teeth facing downwards or towards the floor or supporting surface 106. In use the spacer 100 may remain stationary. The tool 50 comprises a flange 104 with an axial direction registration surface 168, and wherein the axial direction registration surface comprises one or more teeth to engage the teeth of the spacer 100. Axial alignment between the tool 50 and the foot 10 is achieved in the same way as in FIGS. 30 to 32. However, the engagement between the teeth of the spacer 100 and the tooth or teeth of the flange 168 also achieves lateral alignment between the tool and the foot. As the teeth are radially aligned, the tool may approach the foot from many angular positions equal to the number of teeth of the base part 100. In some embodiments, the spacer 100 has more radial teeth than the driven member. The tool may additionally comprise a jaw as described earlier, to engage about the rotating foot apart 112 (i.e. about the threaded shaft or socket 11) or the spacer 100 (i.e. about diameter 114 or diameter 120).

Figure 34:
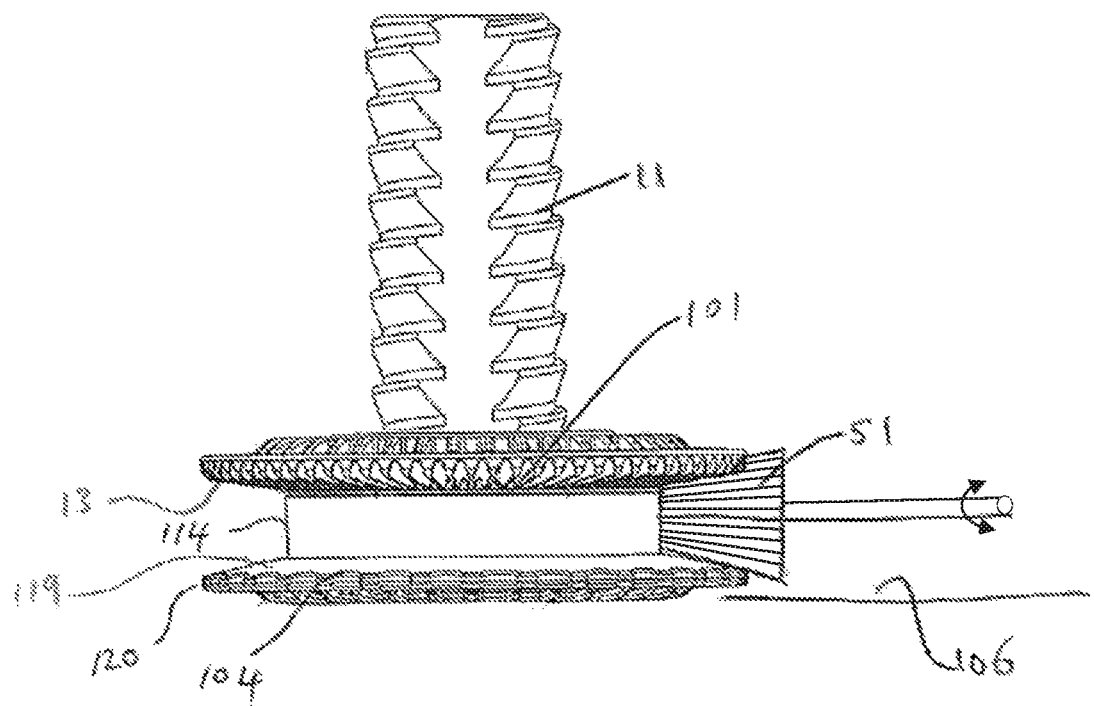
FIG. 34 is a side view of the foot and a schematic representation of a pinion of a tool engaged with the foot in an alternative embodiment.

In the embodiments of FIGS. 28 to 33, the rotating foot part 112 comprises the driven member 13 with radial teeth facing away from the floor or support surface 106, and the spacer 100 has an axial direction registration surface 119 facing away from the teeth of the rotating foot part to engage the tool. In some embodiments, as shown in FIG. 34, the rotating foot part 112 comprises the driven member 13 with radial teeth facing towards the supporting surface 106, and the spacer 100 comprises an axial direction registration surface 119 facing towards the teeth of the driven member of the rotating foot part. The axial direction registration surface is provided by a flange 104 of the spacer 100. In a preferred embodiment the spacer 100 is connected to the rotating foot part 112 by a rotational connection 101 so that the rotating foot part 112 rotates relative to the spacer 100. In use the spacer 100 may be stationary. The pinion 51 of the tool may be captured between the driven member 13 and axial direction registration surface 119, a tooth tip or tips of the pinion providing an axial direction registration surface of the tool to contact surface 119 to maintain the driving member 51 in contact with the driven member 13. With the tool engaged with the foot, the driving member 51 may be axially captured between the driven member 13 and axial direction registration surface 119. As the pinion rotates, each tooth tip of the pinion may contact the surface 119, each tooth tip providing an axial direction registration surface as it rotates into contact with the surface 119. In the embodiment of FIG. 34, lateral alignment between the tool and the foot may be achieved by any one or more of the earlier embodiments. For example, the tool may comprise a jaw to engage the spacer 100 laterally for example about diameter 114 and/or diameter 120. Alternatively or additionally the tool may engage around the rotating foot part, for example around a threaded shaft or socket of the rotating foot part, or an outer circumference of the driven member 13.

In some embodiments as described above, the tool is thus axially coupled to the foot in both axial directions. For example the tool cannot lift away from the foot. The tool is released from the foot by pulling the tool laterally away from the foot. That is, to disengage the tool from the foot, the tool is moved radially away from the foot. To disengage the tool from the foot a user only needs to move the tool laterally/radially away from the foot without requiring the user to move the tool axially relative to the foot. For example, the user does not need to lift the tool off the foot before pulling the tool laterally away from the foot. Lifting the tool off the foot can be a difficult or cumbersome task when disengaging the tool from a foot at the rear of a cabinet or other object being supported. Also, with low toe-kick height designs for cabinetry which are becoming increasingly popular (and also often involve obstacles such as plumbing), there is limited or no height clearance making lifting the tool off the foot even more difficult.

In some embodiments such as the embodiment illustrated in FIGS. 1A to 10, the tool comprises a lateral member 56 that engages a circumferentially extending slot or channel 18 in the foot for axial positioning. In some embodiments, the foot may comprise a disc or circular flange coaxial with the threaded shaft to be received in a corresponding recess or slot in the tool. For example, the driven member or other flange may be received in a horizontal slot of the tool. For example, in some embodiments, a slot may be formed between surface 58 and flange 67 for receiving flange 16 of the foot 10. In some embodiments, flanges 66 and 67 (best shown in FIG. 10) of the tool may locate on surfaces 19 and 20 of the foot to position the tool relative to the foot in the axial direction. In some embodiments, the tool flanges 66 and 67 provide a first axial direction registration surface and a second opposite facing axial direction registration surface to bear corresponding axial direction registration surfaces 19 and 20 of the foot. Contact between the tool and foot axial direction registration surfaces releasably retains the tool to the foot in an axial direction to releasably maintain engagement between the driving member and the driven member or feature. In some embodiments, axial facing surface 62 may provide a guiding surface to bring the driving member and the driven member or feature into initial contact, and surface 68 and surface 19 releasably maintaining engagement between the driving member and the driven member or feature once the driving member and the driven member or feature are engaged.

In the illustrated embodiment, the driven member or feature 13 being a rotary rack is positioned to face upwardly. For a right hand threaded shaft, this arrangement ensures that right hand turning (clockwise) of the handle 52 of the tool works to lift the height of the object being supported. In an alternative embodiment the rotary rack may be positioned to face downwards, so that left hand turning of the handle works to raise the supported object. In a further alternative, the threaded shaft may comprise a left hand thread. With the rotary rack facing downwards and a left hand threaded shaft, right hand turning of the handle works to raise the object. The inventor considers that right hand turning of the tool handle for raising the object is a preferred arrangement as right hand turn of the handle to lift the object may be considered to be intuitive by a user. In yet another alternative, the threaded shaft may comprise a left hand thread, and the rack may face upwards so that left hand turning of the of the handle works to raise the supported object.

In the embodiments illustrated in FIGS. 1A to 11, the driven member or feature 13 is fixed to or on the shaft 11 so that the driven member or feature remains at a fixed height relative to a floor surface or other surface on which the foot is to be positioned when the foot is supporting the weight of the object on the floor surface or other surface. For example, in some embodiments the driven member may be integrally formed with the shaft, or may be attached to the shaft. For such an arrangement, in some embodiments the tool comprises a positioning feature or features for setting the driving member at a height relative to the floor surface or other surface so that the driving member is positioned axially relative to the foot for engagement with the driven member, the height of the driven member and height of the driving member both being referenced from the floor surface or other surface. For example, in the embodiment of FIGS. 1A to 10, the tool comprises guides 59 that contact the floor surface to present the tool at the correct height or axial position relative to the foot for engagement with the foot.

The guides 59 or axial positioning features may provide an initial alignment of the tool to the foot. The tool may comprise ramp features 60 (best shown in FIG. 10) to accommodate some vertical misalignment between the foot and the tool. For example, in a particular installation, prior to adjustment a foot may be raised off the floor surface so that correct axial positioning of the tool relative to the foot is not initially provided by guides 59. Guiding axial alignment between the tool and the foot and therefore between the driven member and the driving member is preferably provided by the ramp features bearing against an axial direction registration surface of the foot. For example, in the embodiments illustrated in FIGS. 1A to 10, the ramps or cam surfaces 60 make sliding contact with the rotary rack to lift or guide the tool into correct axial position with the foot, even when the foot is initially raised slightly off the floor surface. In the illustrated embodiment of FIGS. 1A to 10, the ramp or cam surface 60 provides axial alignment of distance X indicated on FIG. 10. If foot 10 was initially raised off the floor by distance X, with the tool supported on guides 59 on the floor, as a user pushes the tool into the foot, cam surface 60 will contact the foot and guide the tool to the correct axial position defined by axial facing surface 62. In some embodiments the ramp surface and the axial facing surface 62 are continuous.

Figure 12:
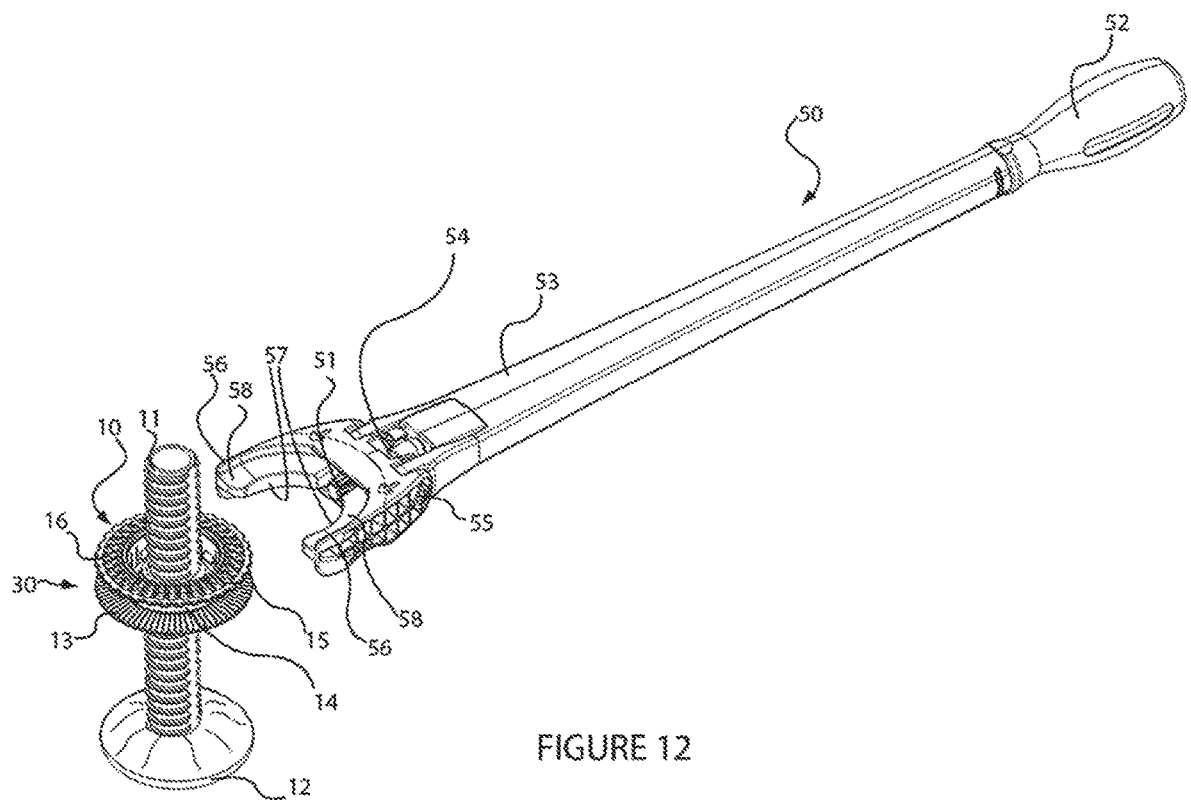
FIG. 12 is a perspective view of an alternative foot and the tool of FIG. 1A for adjusting the foot to adjust the height of an object supported by the foot.
Figure 18:
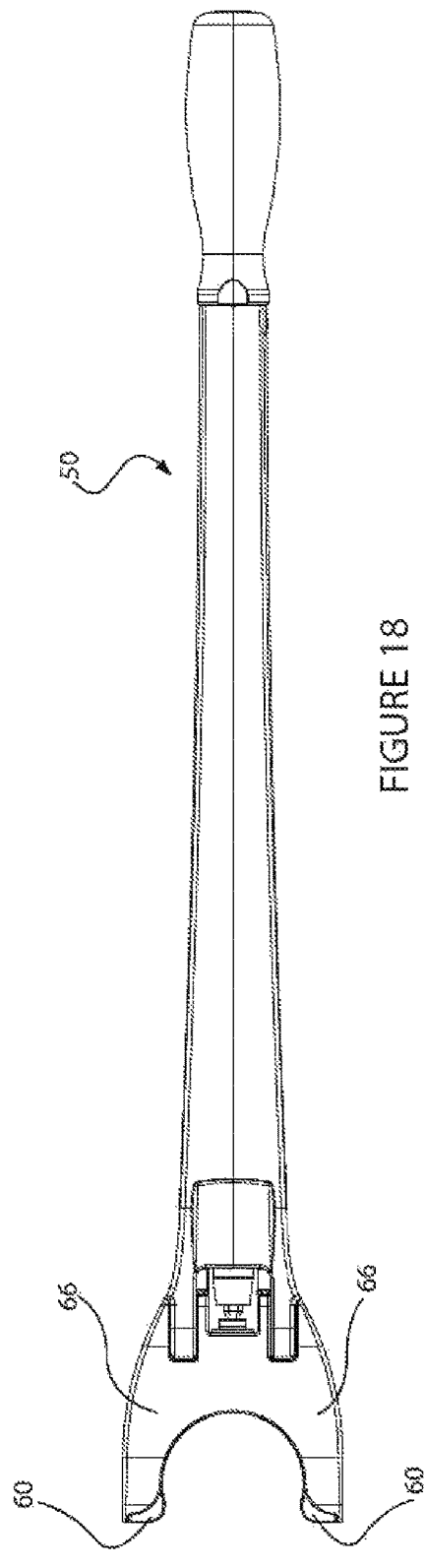
FIG. 18 is a bottom view of the tool of FIG. 13A.

In some embodiments, as illustrated in FIG. 12, the threaded shaft is received in a threaded component 30 that is adapted to remain at a fixed height relative to the object being supported by the foot. The threaded component 30 is free to rotate relative to the object being supported. In some embodiments the threaded component 30 forms part of a foot assembly 10 or height adjustable leg assembly. The threaded shaft 11 is adapted to be rotationally fixed to the object being supported. For example, the shaft may be provided with a flat longitudinal surface 17 or surfaces to mate with a socket (not illustrated) attached to or formed with the object supported by the foot, the socket comprising a corresponding flat surface or surfaces. A height adjustable leg assembly may comprise the shaft 11, corresponding socket (not shown) and the threaded component 30. In such an embodiment the threaded component 30 comprises the driven member or feature 13, to be driven by the tool to adjust the relative axial positions of the threaded shaft and the threaded component. For example, as shown in FIG. 12, the threaded component may comprise a rotary rack 13 to be driven by the driving member 51 of the tool 50, as described above. The threaded component 30 may be described as a coupling or coupling part of the height adjustable leg for coupling to the tool so that the tool is releasably engaged to the height adjustable leg for height adjustment.

In the embodiment of FIG. 12, the position of the threaded component 30 is not fixed relative to the floor surface or other surface supporting the base 12 of the foot. The threaded component raises or lowers with the supported object as the foot is adjusted by the tool for height adjustment. In this embodiment, the tool 50 does not locate axially off the floor surface for initial alignment with the foot, as described for the embodiment of FIGS. 1A to 10. Final axial and lateral alignment of the tool and the threaded component may be achieved in the same way as described with reference to the embodiment of FIGS. 1A to 10.

By way of example the foot 10 has been described above as comprising a threaded shaft 11. For example the driven member 13 may be integrally formed with the threaded shaft, or may be attached or releasably attached to the shaft. In some embodiments, the foot may be provided without or separate to a threaded shaft 11. For example, a height adjustable leg for supporting a cabinet, appliance or structure may comprise a threaded shaft 11, and a foot according to some embodiments of the present invention may be adapted to be attached, fixed or fitted to an end of the threaded shaft. For example, as shown in FIG. 13A, a foot 10 according to some embodiments of the present invention may comprise the driven member 13 and an interface detail for fitting the foot 10 to a shaft 11. In the illustrated embodiment shown in FIG. 13A the interface feature is a socket. The foot comprises the socket 101 for receiving an end 111 of the threaded shaft to attach the foot to the end of the shaft. The shaft may form part of a height adjustable leg for supporting the cabinet, appliance or structure, and the foot is adapted to be fitted to the height adjustable leg. For example, a height adjustable leg may comprise threaded shaft 11 and a threaded socket 5 or component adapted to be attached or fixed to the cabinet or structure or other object to be supported. In the embodiment illustrated in FIG. 12, the threaded component 30 may be called a foot. The foot 30 supports a cabinet or other object on the threaded shaft 11. The threaded shaft provides a leg on which the cabinet or object is supported via the foot 30.

Further embodiments are described with reference to FIGS. 13A to 24. In the embodiment of FIG. 13A, the foot 10 may be described as a coupling or coupling part of a height adjustable leg for coupling to the tool so that the tool is releasably engaged to the height adjustable leg for height adjustment. As described above with reference to FIGS. 1A to 11, in some embodiments the axial position of the tool relative to the foot or coupling may be set by a flange extending from the tool that bears against an opposite axial side 19 of the driving member 13, for example flange 66, as best shown in FIG. 10. FIG. 13A illustrates an embodiment that also comprises a flange 66 that bears against the back side 19 of the driven member. In some embodiments the driven member 13 may be captured axially between the driving member 51 and the flange 66. In some embodiments the driven member may be captured between the flange 66 bearing against a back side 19 of the driven member and a second axial surface 62 (best illustrated in FIG. 19) bearing against surfaces of the rotary rack 13 to axially locate the tool to the foot. Tooth tips of teeth of the rotary rack 13 may form a discontinuous annular axial facing bearing surface. In the embodiment of FIGS. 13A to 21, the flange 66 provides a back support for the driven member 13. Transmitting torque from the driving member to the driven member may produce a force that acts to deflect the driven member 13 away from the driving member and out of engagement, or the driving member may lift off the driven member or feature. In the embodiment of FIGS. 13 to 21, the flange 66 supports the back or opposite side 19 of the driven member 13 to keep the driven member or feature 13 in contact or engaged with the driving member 51.

With the tool engaged with the foot, the driven member 13 may be captured between the lateral flange 66 of the tool and the driving member 51, or between the lateral flange 66 and the axial surface 62 bearing against the rotary rack. The flange 66 provides an axial facing bearing surface 68 to contact corresponding axial facing surface 19 of the foot to releasably maintain engagement between the driving member and the driven member or feature in an axial direction. The axial facing surface 19 of the foot may be a discontinuous surface. For example, the back side of the driven member may comprise radial ribs for strength. The ribs may bear against the bearing surface 68 of the tool as the foot rotates when driven by the driving member of the tool. As shown in FIG. 13B, the foot 10 may be provided without the upper flange 15 of the foot illustrated in FIG. 2 as the axial alignment of the tool to the foot in FIG. 13A is provided by the driven member 13 being received between the driven member and/or axial surface 62 and the flange or back support 66. The flange 66 contacts the back side of the driven member with the tool engaged with the foot at least at an angular position at which the driving member engages the driven member, to prevent the rotary rack flexing away from the pinion, or the pinion lifting off the rotary rack. Preferably the flange engages the back side of the rack at a perimeter portion of the back side of the rack. In some embodiments the flange supports a substantial portion of the back side of the driven member. For example, the flange 66 may contact more than 50% of the back side of the rotary rack. Preferably the back support 66 contacts the back of the rack by 180 degrees or more around the rack.

Figure 19:
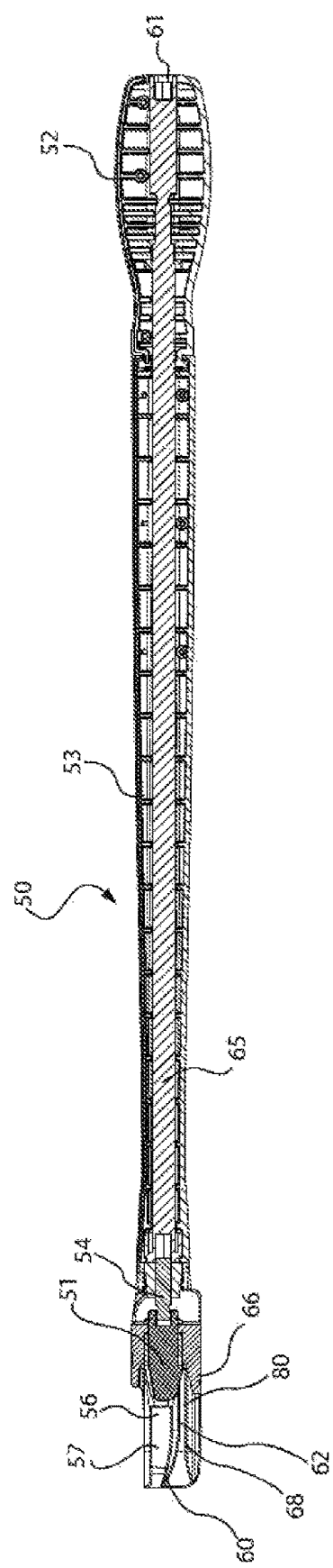
FIG. 19 is a cross sectional view of the tool of FIG. 13A on a longitudinal centre line of the tool.
Figure 21:
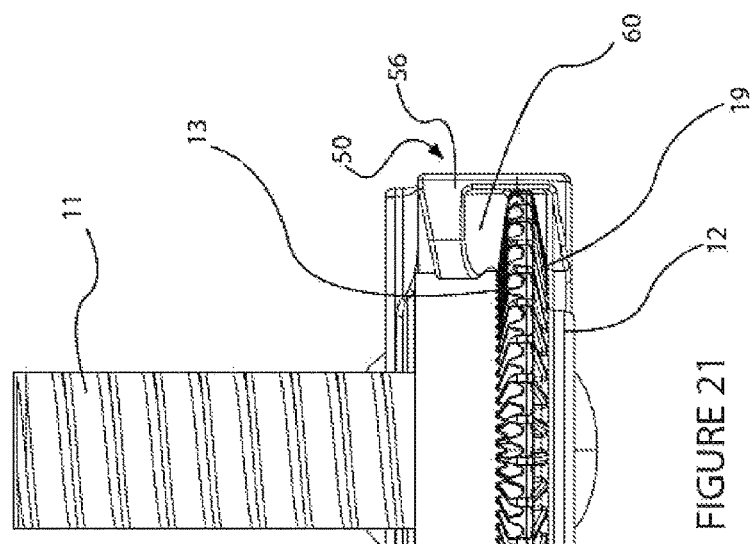
FIG. 21 is an end view of the foot and tool of FIG. 13A with the tool engaged with the foot.
Figure 20:
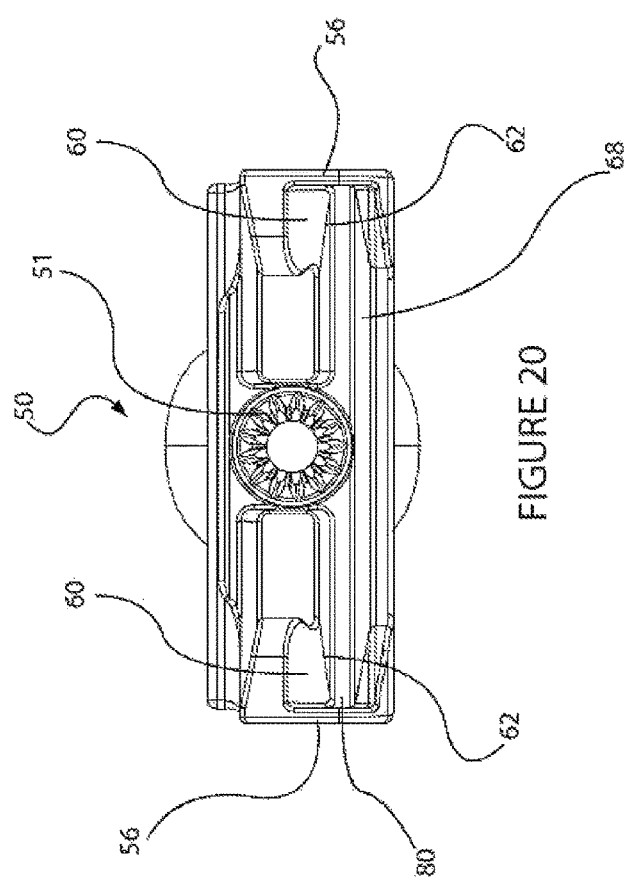
FIG. 20 is an end view of the tool of FIG. 13A on a driving member end of the tool.
Figure 23:
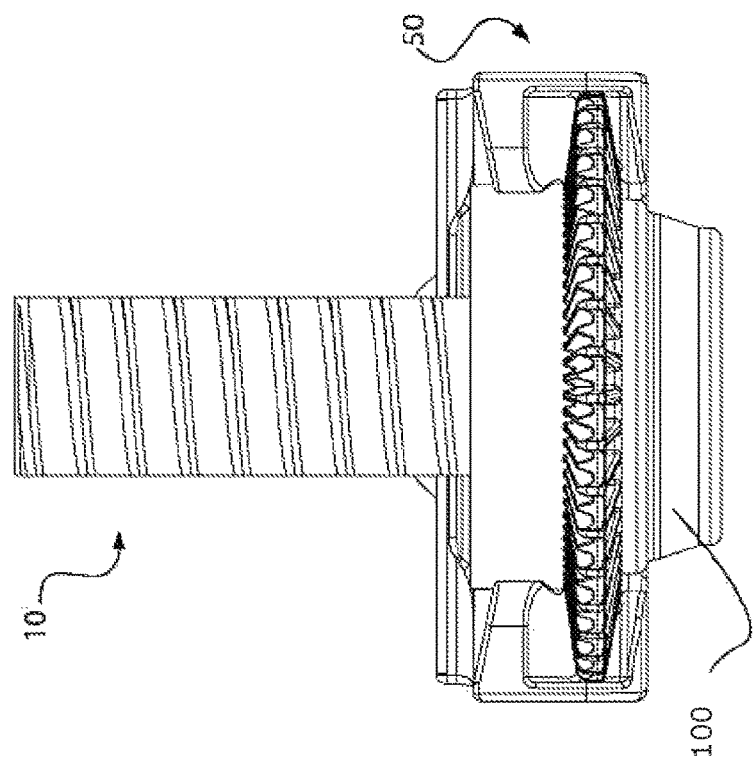
FIG. 23 is an end view of the foot and tool of FIG. 13A with the tool engaged with the foot and with the spacer shown in FIG. 22 attached to the base of the foot, the tool engaging with the foot in a manner as described with reference to the previous figure.
Figure 22:
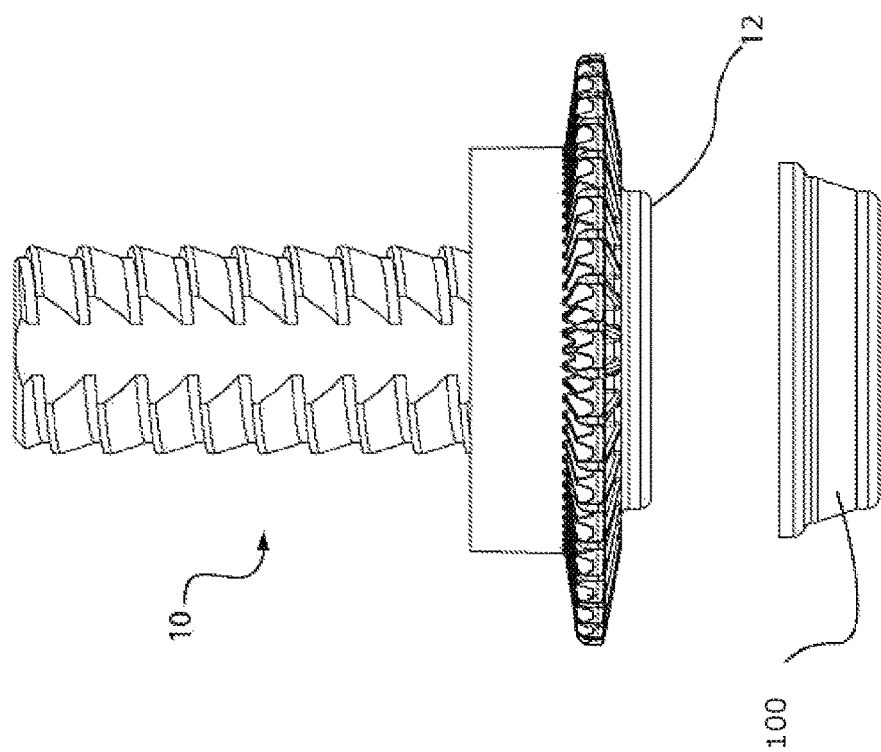
FIG. 22 is a side view of the foot illustrated in FIG. 13B and with a spacer shown spaced from the base of the foot.
Figure 24:
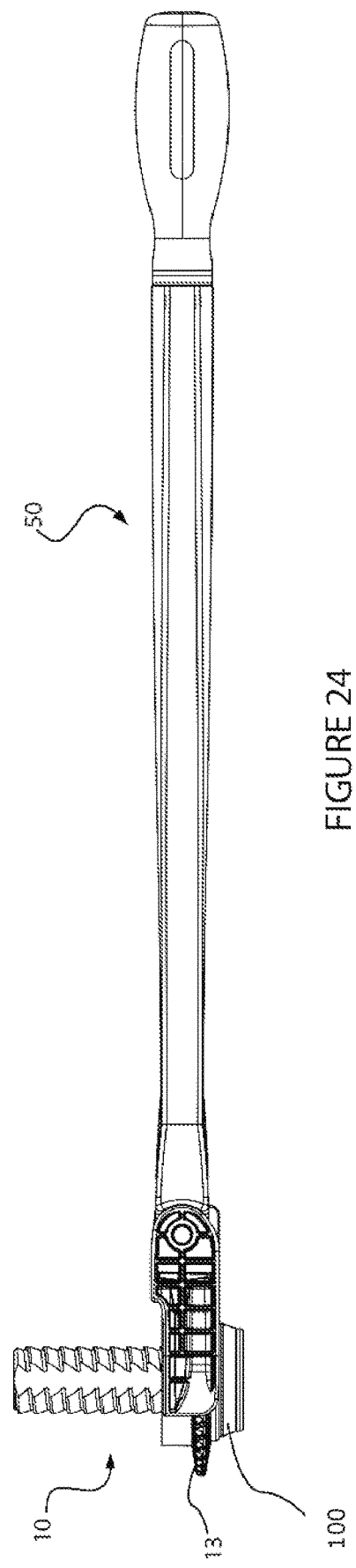
FIG. 24 is a side view of the foot and the tool of FIG. 13A with the tool engaged with the foot and with the spacer shown in FIG. 22 attached to the base of the foot.

As shown in FIGS. 19 and 20, in some embodiments the tool comprises a first axial direction registration surface 68 and a second axial direction registration surface 62. When aligning the tool with the foot, the first axial direction registration surface 68 of the tool may bear against the back side 19 of the driven member and the second axial direction registration surface 62 of the tool may bear against surfaces of the rotary rack 13 to axially locate the tool to the foot. The first and second axial direction registration surfaces 68, 62 face together to form sides of a slot or channel 80. The driven member 13 is received in the slot 80 and contacts the axial direction registration surface 68, 62 to position the tool axially to the foot. In some embodiments the surfaces 68, 62 each have a ramp surface 60 at an opening of the slot of channel to provide converging surfaces extending into the slot to assist with aligning the tool to the foot to ensure correct engagement between the rack and pinion.

In some embodiments, the axial distance between the axial direction registration surfaces 62, 68 may be greater than the axial thickness of the driven member 13, such that the slot 80 allows for some axial misalignment between the foot and the tool. Final alignment of the tool to the foot and engagement of the driving member to the driven member may be achieved by the first axial surface 68 acting on the back side of the rack to pull the driving member 51 onto the driven member 13. With the driving member engaged with the driven member a gap may exist between the driven member and axial facing surface 62.

In the embodiment illustrated in FIGS. 13A to 24, in use the driven member or feature 13 is fixed or attached to or on the shaft 11 so that the driven member or feature remains at a fixed height relative to a floor surface or other surface on which the foot is to be positioned when the foot is supporting the weight of the object on the floor surface or other surface. For such an arrangement, in some embodiments the tool comprises a positioning feature or features for setting the driving member at a height relative to the floor surface or other surface so that the driving member is positioned axially relative to the foot for engagement with the driven member, the height of the driven member and height of the driving member both being referenced from the floor surface or other surface. For example the tool comprises guides or sides 59 that contact the floor surface to present the tool at the correct height or axial position relative to the foot for engagement with the foot. The lateral extensions 56 may act as the guides, a bottom surface of the lateral extension 56 contacts the surface supporting the base of the foot to set the tool at an appropriate height to engage the foot.

The guides 59 or axial positioning features may provide an initial alignment of the tool to the foot. The tool may comprise ramp features 60 (best shown in FIG. 20) to accommodate some vertical misalignment between the foot and the tool. For example, in a particular installation, prior to adjustment a foot may be raised off the floor surface so that correct axial positioning of the tool relative to the foot is not initially provided by guides 59. Guiding axial alignment between the tool and the foot and therefore between the driven member and the driving member is preferably provided by the ramp features bearing against an axial direction registration surface of the foot. For example, the ramps or cam surfaces 60 make sliding contact with the rotary rack to lift or guide the tool into correct axial position with the foot, even when the foot is initially raised slightly off the floor surface.

For the back support flange 66 to pass underneath or behind the driven member the driven member 13 is spaced from the base 12 of the foot as shown in FIG. 13B, so that a gap is provided between the surface on which the base of the foot sits and the back side 19 of the driven member. In some embodiments, as shown in FIG. 17 the back support flange 66 may be approximately C shaped to fit around the base 12 of the foot. In some embodiments the back support flange is approximately C shaped and extends round the base and the driven member by more than 180 degrees. In some embodiments the C shaped back support flange 66 may act as a lateral jaw to capture a diameter of the coupling to laterally position the tool to the foot from the base 12 of the foot, in a similar way to the way in which the jaw 63 formed by lateral extensions 56 fits around diameter 14 of the foot described with reference to the embodiment of FIGS. 1A to 10. In the illustrated embodiment an upper jaw is provided by the lateral extensions 56 and a lower jaw is provided by the flange 66. A benefit of having two axially spaced jaws is that the jaws prevent twisting or bending of the foot, or prevent the tool twisting relative to the foot when driving the foot for height adjustment. Preferably the foot and tool and complementarily sized so that there is a small clearance between each jaw and the diameter or diameters of the foot that the jaws grab around. For example, preferably the radial clearance between the radial face of each jaw and the foot is less than 1 mm. In some embodiments jaw 62 is clamped onto the diameter of the foot. For example the lateral extensions 56 of the jaw may be slightly flexed outwardly with the tool coupled to the foot.

In some embodiments the tool may comprise two pairs of jaws for laterally positioning the tool to the foot, the two jaws spaced axially apart. In some embodiments the tool may comprise a first jaw positioned on one axial side (for example above) the driven member and a second jaw positioned on the other axial side (for example below) the driven member.

In some of the illustrated embodiments the coupling takes the weight of the object being supported by the height adjustable leg. In some embodiments the coupling may not take any load or weight of the object being supported by a height or length adjustable leg. For example, with reference to the embodiment of FIG. 13A, a height adjustable leg may comprise a threaded shaft 11, a corresponding threaded socket as described above (e.g. item 5 in FIG. 1A), and a coupling 10 fitted (fixed) to the threaded shaft part way along the threaded shaft 11 (for example a short distance from a bottom end of the threaded shaft) so that the coupling does not contact the floor surface supporting the object on the leg. An end or base of the threaded shaft may contact the floor surface to support the weight of the object being supported by the leg.

Further embodiments are described with reference to FIGS. 25A to 25C. In the embodiment of FIGS. 25A to 25C the foot or coupling 10 comprises a driven member 13 integrally formed with a threaded socket 11. The threaded socket engages a threaded shaft (for example threaded shaft 5 shown in FIG. 25C) attached to the object being supported by the foot. The tool of FIGS. 25A to 25C comprises a handle 52 as a torque input and may also include a torque input 61 for engaging another tool as described earlier. The driving member 51 of the tool 50 and the torque input 52 are fixed together to rotate only on a lateral axis 115 relative to the longitudinal axis 116 of the leg. That is, in some embodiments as illustrated in FIGS. 25A to 25C, there is no articulation between the torque input 52, 61 and the driving member 51.

Where there is no articulation between the torque input 52, 61 and the driving member 51 such that the driving member and the torque input rotate only on the same lateral axis 115, preferably the lateral axis is at an angle to the longitudinal axis of the leg when the driving member and driven member are engaged. For example, as best illustrated in FIG. 25C, with the driving member 51 engaged with the driven member 13, the lateral axis 115 (which may be a longitudinal axis of the tool 50) is arranged at an angle to the longitudinal axis 116 of the leg. In other words, with the tool engaged with the foot 10, the longitudinal axis of the tool on which the driving member and torque input rotate is at an angle to the longitudinal axis of the leg.

Without articulation between the driving member and torque input, preferably the lateral axis on which the driving member and torque input rotate is at an angle so that the torque input (for example handle) is raised from the floor surface or other surface on which the foot rests. With the lateral axis at an angle, the handle 52 is raised from the floor surface so that a user can grab the handle or manipulate the torque input more easily than if the torque input was against or closer to the floor.

In some embodiments the lateral axis on which the driving member and torque input rotate is at an angle (100 in FIG. 25C) of 80 to 88 degrees, or 85 to 88 degrees, or 86 to 88 degrees, or 87 to 88 degrees. In a preferred embodiment the angle may be about 87.5 degrees.

Figure 56:
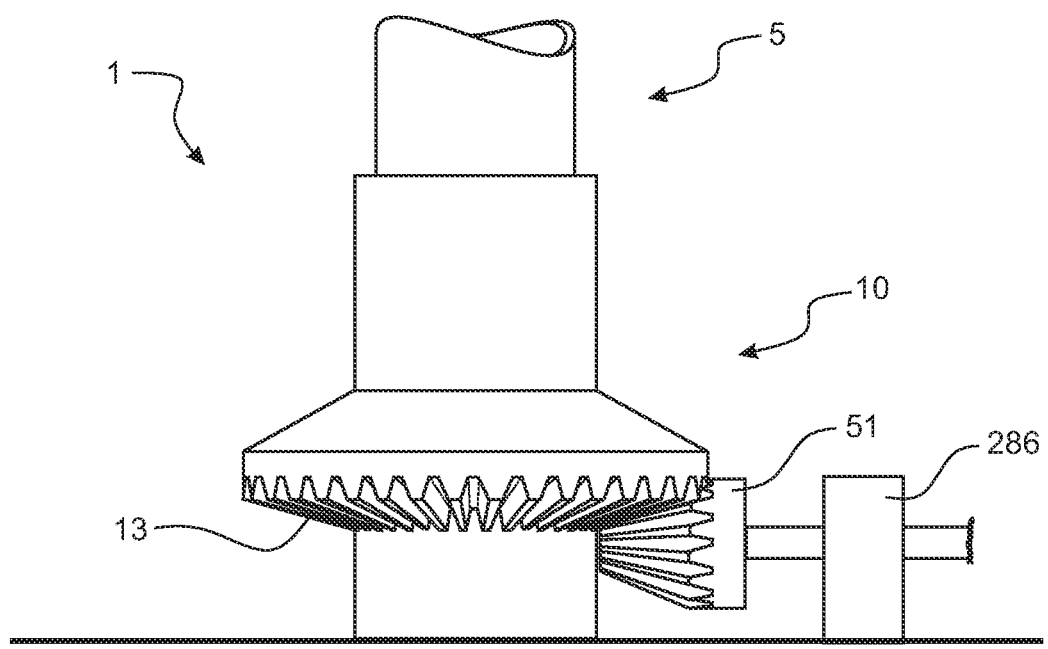
FIG. 56 is a side view of a foot and tool wherein the tool is able to register in an axial direction reliant on the floor adjacent.

In some embodiments the driven member or feature 58 remains, in operation, at a fixed height relative to a floor surface or other surface supporting the leg at least when driving the coupling to raise the object being supported. The tool axial position relative the driven member may therefore be referenced from the floor surface for engagement with the coupling, to assist with engagement between the tool and foot. FIG. 56 shows driver 51 of the tool referenced from the floor by a floor chock. The floor chock is able to press onto the floor that supports the foot and upwardly hold the driver for meshing engagement with the driven member as seen in FIG. 56. The tool may the utilise jaws for lateral alignment with the foot. Such may be provided for engagement above or below the driven member. The driven member teeth 13 may present downwardly for engagement by such an held up driving member.

To maintain a constant angular relationship between the tool 50 and the foot 10, it in one embodiment it is preferred that the tool 50 engages with a diameter of the foot, or a surface such as the floor, to prevent rotational movement between the foot and tool. FIGS. 37-39 show simplified schematic embodiments of a tool with members 302 which allow the tool 50 to engage with the foot 10 so that a constant angular relationship is maintained between the tool 50 and the foot 10, or more preferably the driven member and driving member. That is, the axis of rotation of the driver remains fixed relative the floor/axis of the foot. FIG. 37A shows a side schematic view with an upper and lower member 302 that prevents the tool 50 from rotating towards or away from the supporting surface. This encourages the driving member 51 to be maintained at a constant angle to the driven member. This helps keep engagement between the tool and foot. FIG. 37B is a top view of FIG. 37A, where the members 302 are seen to wrap around a diameter of the foot. FIG. 38 shows a simplified embodiment of FIG. 37, where only an upper member 302 is utilised to prevent rotation of the tool away from the supporting surface. The members 302 in both FIGS. 37 and 38 are likely to be configured in the shape of a jaw that can at least partially extend around the periphery of a diameter, or outside surface, of the foot 10. FIG. 39 shows a further embodiment of an angular stop, or lower member 302, that is configured to help prevent rotation of the driving member 51 towards the supporting or ground surface.

As described earlier with reference to other embodiments, the tool comprises lateral extensions 56 to laterally engage with a diameter of the coupling 10. In the embodiment of FIGS. 25A to 25C the tool laterally engages to an external diameter of threaded socket 11.

The tool 50 of FIGS. 25A to 25C may be simpler than previously illustrated embodiments, for example embodiments of FIGS. 1A and 13A, for example because the tool of FIGS. 25A to 25C does not have articulation between the driving member and the handle. The only moving parts in the tool of FIGS. 25A to 25C are the driving member 51, the torque input, and the shaft connected directly between the handle and the driving member. The driving member 51, shaft 65 and handle 52 rotate relative to a head of the tool adapted to couple to the coupling 10. In some embodiments the shaft 65 may not be shrouded by an arm. The embodiment of FIGS. 25A to 25D may be a cheaper alternative to a more expensive embodiment. For example, the tool of FIGS. 25A to 25C may be for home use (and may be used only once or a limited number of times), whereas a more expensive version of the tool may be for a professional installer (of for example cabinetry) where the tool is to be used many times over a long time period.

In some embodiments, as illustrated by the embodiment of FIGS. 25A to 25D, the handle 52 has engagement features on an outside surface. In the particular illustrated embodiment, the engagement features are longitudinal slots 110. In the illustrated embodiment there are four slots 110 spaced apart around a circumference of the handle. There could be more than four slots, or less than four slots, for example two slots oppositely opposed on a circumference of the handle. In some embodiments the engagement features may be longitudinally extending ribs on an outer surface of the handle spaced apart around a circumference of the handle. In some embodiments there may be two or more ribs.

The engagement features on the outside of the handle are adapted to engage with an inner surface of a handle extension. For example, a handle extension may be a length of pipe or an elongate member with a socket for receiving the handle. An example handle extension 200 is illustrated in FIG. 25D partly shown in cross section. Handle 52 of tool 50 is received in a socket 210 of handle extension 200. The socket has complementary engagement features for example ribs or slots for engaging the slots or ribs on the handle to rotationally lock the handle extension to the handle. The example of FIG. 25D has ribs 211 for engaging slots 110 (shown in hidden detail in FIG. 25D) of tool handle 52. The handle extension may provide a further handle 252 for turning the driving member 51 of tool 50 via the engagement with the handle 52 of the tool. The handle extension 200 may allow the tool to reach the legs at the rear of a particularly deep cabinet or other structure being supported by legs comprising a coupling or foot according to some embodiments of the present invention. Further, as the handle extension 200 is detachable from the handle 52, the tool and handle extension may be of a length to allow both to fit within a typical size of tool box for convenient storage and transportation. In some embodiments the tool handle 52 may comprise an internal bore comprising engagement features for interfacing with corresponding engagement features on an outer surface of a handle extension.

The length of the engagement features of the handle 52 for interfacing with the handle extension 200 provides for an inflexible or rigid coupling between the handle and handle extension. By comparison, the torque input 61 for connecting for example a power tool provides for relatively short length of engagement such that the power tool engaging with the socket 61 can be moved (for example pivoted) relative to the tool 50. However, the engagement between the handle 52 and handle extension provides for no movement between the handle 52 and the handle extension 200. For example, the socket 211 may engage the handle 52 over a length of at least 50 mm, or 60 mm, or 70 mm or more.

In this specification and claims, the phrase "rotary rack" is used to describe a ring gear with axial facing gear teeth, for example a face gear, crown gear or bevel gear. Further, the rotary rack in the illustrated embodiments may be described as a straight bevel gear. A ring gear allows for the driving member or pinion to engage with the driven member from a lateral direction. In a preferred embodiment the driving member and driven member are bevel gears.

The gears releasably mesh together in a lateral direction when engaging the tool with the coupling. That is the gears laterally mesh together when engaging the tool with the coupling. The gears are releasably meshed together when the tool is engaged with the coupling. When the tool is disengaged from the coupling the gears are separated.

In this specification and claims, the term "gear" is intended to mean a rotary gear that is free to rotate continuously in at least one direction. Preferably the driving member is a gear that is free to rotate in both directions.

In some embodiments the rotary rack has an outer diameter in the range of about 30 mm to 100 mm, or about 40 mm to 90 mm, or about 50 mm to 80 mm. In some embodiments, the outer diameter of the rotary rack is about 60 mm, or 70 mm, or 80 mm.

In some embodiments the rotary rack has a width (distance between an outer radius and inner radius of the rack face) of about 5 to 20 mm, or about 8 to 15 mm, or about 10 to 12 mm. In some embodiments the rack width is about 10 mm. The pinion may have a length substantially similar to the width of the rotary rack.

In some embodiments the rotary rack may have about 40 to 200 teeth, or 50 to 100 teeth, or 60 to 80 teeth, or about 70 teeth.

In some embodiments the pinion is generally frustoconical, having a smaller diameter at a forward end (furthest from the handle end of the tool) and a larger diameter at a rearward end (nearest the handle end of the tool). In some embodiments the pinion may be generally cylindrical having straight sides. The pinion may have a diameter of about 5 to 20 mm, or about 7 to 18 mm. Where the pinion is generally frustoconical, in some embodiments the pinion has a diameter at a smaller end of about 5 to 15 mm and a diameter at a larger end of about 10 to 30 mm. In some embodiments, the small end and large end of the pinion have diameters of about 9 to 10 mm and 16 to 17 mm.

As described above, in some embodiments the pinion is fixed to the torque input without any articulation between the pinion and torque input. In such an embodiment, the pinion and rack are arranged so that the angle of the lateral axis on which the pinion rotates is at an angle such that the height of the handle or arm of the tool is less than the height of a typical toe-kick height of a cabinet when the tool is engaged to a foot at the rear of the cabinet and with the handle of the tool extending beyond the front of the cabinet. Preferably the pinion and rack are arranged so that the lateral axis of the pinion and torque input is less than about 12.5 degrees so that the handle or arm of the tool clears the bottom of the cabinet.

Where the pinion is frustoconical, the toothed surface of the rotary rack is inclined to mesh with the pinion. This arrangement allows for the thickness of the rotary rack at the perimeter of the rotary rack to be less than the thickness of the rotary rack at an inner diameter of the rotary rack (for example where the rack meets the diameter portion 14 of the coupling, or the threaded socket or shaft).

In some embodiments, as illustrated in FIG. 13B, the back side of the rotary rack is inclined, and the surface 68 of the tool that provides a back support for the rotary rack is inclined to match, to support the back of the rack as described above. Where the back side of the rotary rack is inclined, the thickness of the rotary rack at the perimeter of the rotary rack is less than the thickness of the rotary rack at an inner diameter of the rotary rack.

A reduced thickness at the outer perimeter of the rack compared to the thickness at the inner perimeter of the rack can assist in some embodiments with engagement of the rack to the pinion. Where the pinion is frustoconical and/or a surface of the back support flange 66 is inclined, the pinion and the back support flange 66 of the tool present an axial gap between the pinion and the flange 66 that converges from the forward end of the pinion towards the rearward end of the pinion. As the thickness of the rack at the perimeter of the rack is less than the axial gap between the pinion and the flange 66 at the forward end of the pinion the driven member of the foot is easily received between the pinion and the surface 68 of the back support flange 66. In some embodiments this arrangement assists with alignment of the rack to the pinion to ensure the pinion engages with the rack as the tool engages the foot from a lateral direction. For example, where the axial gap between axial surfaces 62 and 68 is greater than the thickness of the driven member 13, final axial alignment of the tool to the foot and engagement of the pinion to the rotary rack may be achieved by the first axial surface 68 and the pinion capturing the rotary rack between the pinion and surface 68. In some embodiments, the back support flange 66 may have a ramped surface 81 for receiving the rack between the pinion and the flange.

Preferably the back side 19 of the rack is at an angle of 0 to 12.5 degrees (where 0 degrees is perpendicular to the longitudinal axis of the foot). An acute angle or perpendicular is preferred so that the flange 66 exerts a predominantly upward component of force to counteract the pinion lifting off the rack or the rack deflecting from the pinion when the pinion drives the rack. For example, with reference to FIGS. 26A to 26D, in some embodiments the back side of the rack 13 comprises a portion 19 that is substantially perpendicular to the longitudinal axis of the foot. Preferably the perpendicular portion 19 is at a perimeter portion of the back side of the rack. As shown in FIG. 26B, the flange 66 of the tool has a corresponding axial facing bearing surface 68 that is also perpendicular to the longitudinal axis of the tool when the tool is engaged with the foot.

Other gear arrangements may be envisaged. For example, in some embodiments, the driving member and driven member may comprise spur gears, when meshed together the driven member and driving member having parallel rotational axis. The driving member may be a pinion and the driven member a gear, the pinion and gear having parallel rotational axes. In such an embodiment, a worm gear or bevel gear or universal joint or joints may couple the driving member to tool handle 52 or torque input.

In some embodiments the foot (including the spacer) or coupling may be formed from a plastics material, for example moulded from Acetal or other suitable plastics material. The tool may also be generally formed from plastics materials, for example Acetal, polypropylene and/or ABS. The foot and/or spacer may also be composed of metal/s, wood, and/or composites etc. The pinion of the tool may be formed from steel or a suitable plastics material, for example glass filled nylon. In the embodiments of FIGS. 10 and 19 the shaft 65 may be formed from steel, and in the embodiment of FIG. 65 the shaft may be formed from Aluminium, for example a hollow extrusion.

A foot or coupling and a tool according to the present invention are adapted so that the tool remains continuously engaged with the driven member or feature when driving the driven member or feature to rotate the coupling or foot. For example, the tool can rotate the coupling by a part revolution, a full revolution, or many revolutions and in both directions without being disengaged from the coupling. The tool does not need to be disengaged and reengaged from and to the coupling during complete adjustment of the leg height. The tool can adjust the length of the leg up and down without disengaging the tool from the coupling. The tool is adapted to be held stationary in a circumferential direction relative to the leg when the driving member drives the driven member or feature for adjusting the height of the object supported by the leg. Thus the tool is not limited to working in a particular arc length around the leg, but remains in a stationary angular position relative to the leg during height adjustment. With the driving member engaged to the driven member or feature, rotation of the tool handle or other torque input about an axis independent of the longitudinal axis of the leg (e.g. the shaft of the foot) drives the driven member or feature for height adjustment of the leg. The tool may be used to adjust the leg in both directions without removing the tool from the coupling. For example, the handle of the tool may be rotated in one direction (for example clockwise) to increase the height of the leg and then in the opposite direction (anti-clockwise) to reduce the height of the leg, while the tool remains continuously engaged to the leg. In other words, the tool is adapted so that the direction of height adjustment (up or down) can be reversed without removing the tool from the coupling. The driving member stays continuously engaged with the driven member to effect a change in height of the leg in at least one direction. For example, in some embodiments the tool can drive the coupling by more than 180 degrees, or 270 degrees, or at least one full revolution, or 2 revolutions, or 3 revolutions or more, in either or both directions without disengaging the driving member from the driven member. The handle of the tool remains stationary or does not rotate substantially around the leg, for example by less than one full revolution, or less than 270 degrees, or less than 180 degrees, or less than 90 degrees, or less than 45 degrees. The tool is adapted to adjust the height of the leg by many degrees of rotation of the coupling for minimal degrees of rotation of the tool about the about the longitudinal axis of the leg.

In some embodiments the driving member stays continuously engaged with the driven member to effect a change in height of the leg in both directions. This is particularly useful for fine tuning the height of a leg to achieve a level installation of a cabinet or other object. Where an adjustment in one direction overshoots a height level, adjustment in the opposite direction can be made immediately without removing the tool from the foot. This can be a significant advantage when adjusting the heights of many legs in a single installation, for example when installing kitchen cabinetry which often includes 30 or more legs. Typically some legs require adjustment upwards and others require adjustment downwards, requiring many changes in direction of adjustment. Likewise, there is no need to disengage a third party torque input such as a power drill, to change direction. When installing cabinetry having many legs for height adjustment, the speed and simplicity of adjustment provided by the tool and coupling of the present invention provides a substantial contribution to the art.

Figure 27B:
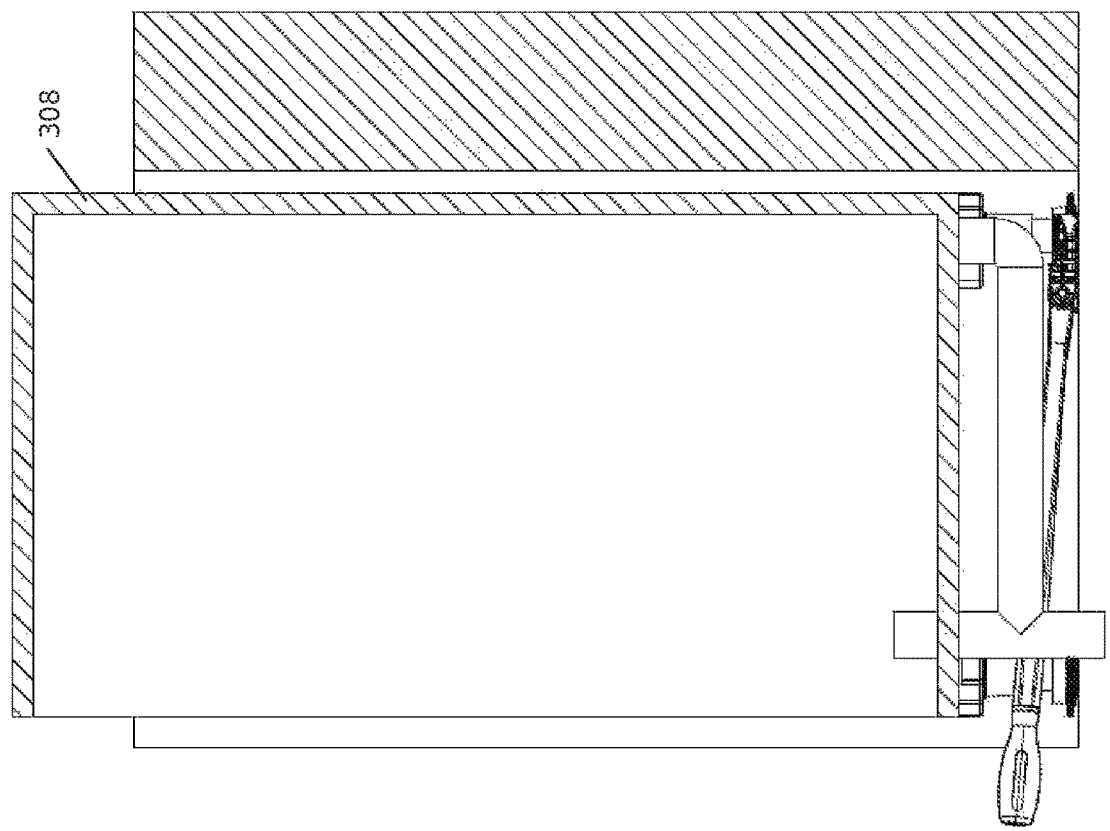
FIGS. 27A and 27B illustrate a plan and side view of a cabinet installation 308 in which access to rear legs of the cabinet is limited by an obstruction beneath the cabinet.
Figure 27A:
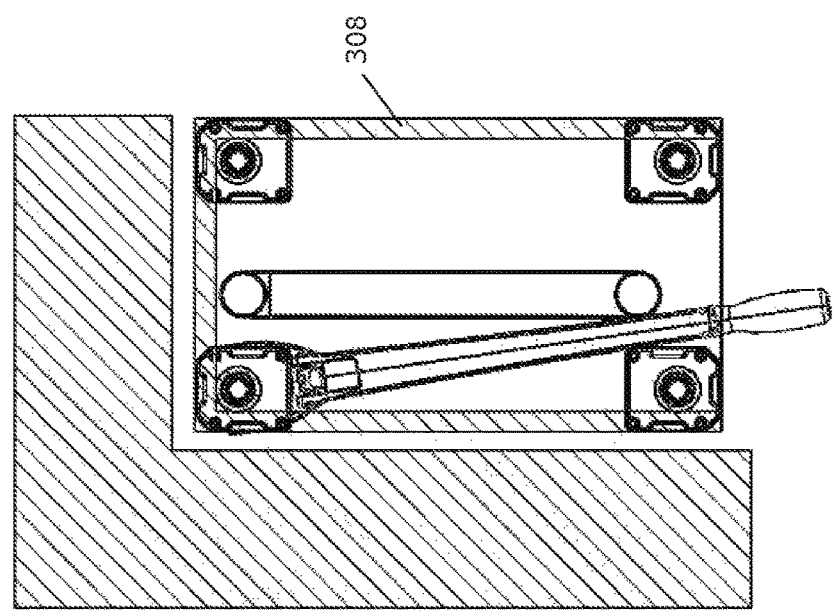

A user holds the tool stationary relative to the leg, for example by arm 53 of the tool with one hand, while turning the tool handle to adjust the leg height with the other hand, or simply by handle 52 or another tool coupled to tool 50 via socket 61. In use, as the driving member is used to drive the driven member, the arm of the tool does not rotate about the longitudinal axis of the leg but may remain stationary. Further, the tool can engage the foot or coupling laterally from essentially any angular direction relative to a longitudinal axis of the threaded shaft of the leg. These features of the tool and foot provide a significant advantage when installing and levelling cabinetry, especially in circumstances where access to one or more legs is limited. For example, with reference to FIGS. 27A and 27B which illustrate a plan and a side view of a narrow cabinet installed in the corner of a room. Access to the rear left foot is available at a narrow radial position, access being limited by an adjacent wall and also obstructions under the cabinet, which in the illustrated example is plumbing fittings or pipe work and a front leg. In such a limited space, adjustment by a prior art tool that scribes an arc about the foot is very difficult. For a tool as described, adjustment of the rear foot is accomplished with the arm of the tool remaining stationary in the limited angular position shown and with the tool continuously engaged with the foot.

Figure 57A:
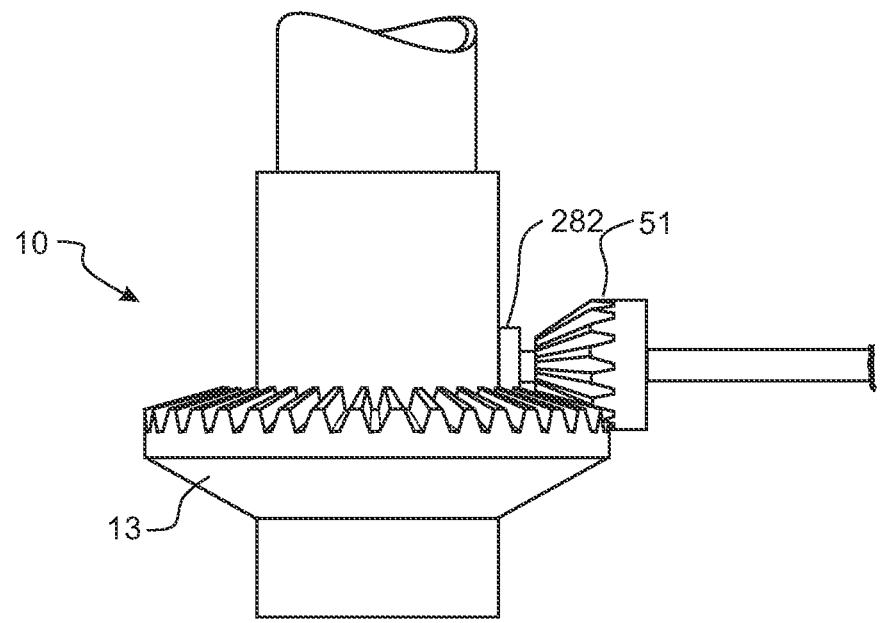
FIG. 57A shows a side view of a driven member and a driver coupled together for radial registration relative each other.
Figure 57B:
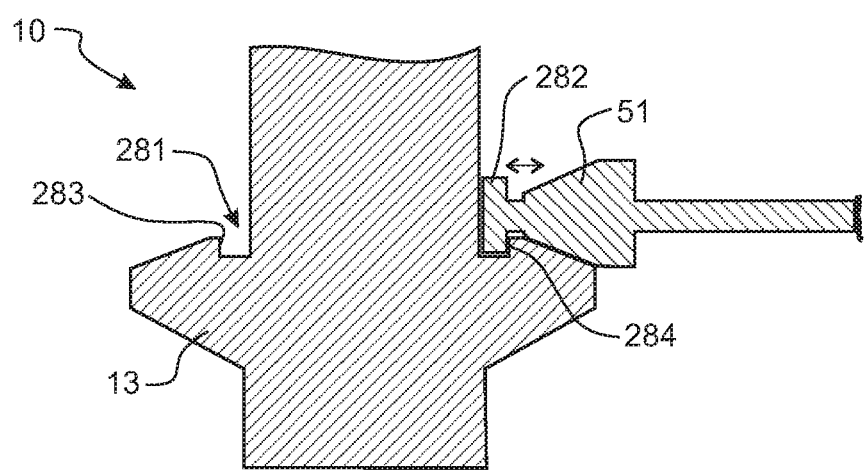
FIG. 57B shows a cross section view of FIG. 57A.

Whilst radial registration of the driven member and driving member can usually be easily achieved by a person using the tool and pushing the tool onto the foot, a radial registration may be provided for as seen in FIGS. 57A & 57B. Here the driven member or other part of the foot may comprise of an annular race track 281 that presents a radially facing surface 283 against which a complimentary surface 284 of a lug 282 of the driving member can locate in a radially outward direction. The lug can be dropped into the race track to be captured therein in a radial direction to then hold the driving member in a radial direction to the driven member.

As described above the leg may be used for height adjustment. Where a leg is used for sideways support, the longitudinal axis of the threaded shaft would be oriented horizontally. For example the present invention may be applied to a leg supporting a side of a cabinet or appliance from an adjacent wall. In this specification and claims, the term "height" is not intended to be limited to use only in vertical orientation but any orientation. Thus the term "height" in this specification and claims should be read broadly to mean "length" or "distance".

The foregoing description of the invention includes preferred forms thereof. Modifications may be made thereto without departing from the scope of the invention.

I claim:

1. Apparatus for adjusting the height of a cabinet above a supporting surface comprising:
   (a) a length adjustable leg having an elongate axial direction, for supporting the cabinet and comprising:
      a first part for securing to or forming part of the cabinet and presenting an external or internal threaded region,
      a foot comprising:
         a rotatable foot part that comprises a rotationally driven member and an externally or internally threaded member to rotate about an axis of rotation coaxial with the axial direction with the driven member and to engage with the internally or externally threaded region of the first part to allow the distance between the foot and the cabinet to be adjusted upon rotation of the foot part relative to the first part about the axis of rotation, and
         a spacer to engage the foot part and locate between the supporting surface and the foot part to support the foot part above said supporting surface, wherein the spacer comprises a radially extending flange having an axial direction registration surface or surfaces,
   (b) a tool comprising a driving member, a torque input for applying torque to the driving member, and the tool adapted to bear against the registration surface or surfaces to axially locate the tool to the foot so that the driving member is held relative to the driven member in the axial direction to engage the driven member and allow the driven member and foot part to be driven by the driving member about the axis for length adjustment of the leg.

2. The apparatus of claim 1, wherein the registration surface or surfaces of the flange substantially faces in a direction away from the driven member and is/are in use elevated above the supporting surface.

3. The apparatus of claim 1, wherein the tool comprises a tool flange presenting surface to engage the registration surface of the flange and be held axially relative to the foot thereby.

4. The apparatus of claim 1, wherein the foot part rotationally engages with the spacer to rotationally support the foot part on said supporting surface, the spacer remaining rotationally fixed relative to the supporting surface.

5. The apparatus of 1, wherein the foot part engages with the spacer to rotationally support the foot part on said supporting surface, the spacer remaining rotationally fixed relative to the foot part.

6. The apparatus of claim 1, wherein the foot part engages with the spacer in an adjustable manner to allow the height of the foot part above the supporting surface to be adjusted.

7. The apparatus of claim 6, wherein the adjustable manner is by a threaded engagement between the spacer and the foot part.

8. The apparatus as claimed in claim 1, wherein the tool comprises a jaw to laterally engage the tool to at least one of: the foot, a foot base, the spacer, and the first part, to laterally align the driven member and driving member.

9. The apparatus as claimed in claim 1, wherein the tool comprises a jaw to laterally engage the tool to the spacer to laterally align the driven member and driving member.

10. A length adjustable leg having an elongate axial direction, for supporting a cabinet and being adjustable in length by a tool comprising a rotary driving member and a torque input for applying torque to the driving member, the leg comprising:
   a first part for securing to or forming part of the cabinet and presenting an external or internal threaded region,
   a foot comprising:
      a rotatable foot part that comprises a rotationally driven member and an externally or internally threaded member to rotate about an axis of rotation coaxial with the axial direction with the driven member and to engage with the internally or externally threaded region of the first part to allow the distance between the foot and the cabinet to be adjusted upon rotation of the foot part relative to the first part about the axis of rotation, and a spacer to engage the foot part and locate between the supporting surface and the foot part to support the foot part above said supporting surface, wherein the spacer comprises a radially extending flange having an axial direction registration surface or surfaces for the tool to bear against to axially locate the tool to the foot so that the driving member is held relative to the driven member in the axial direction and engage the driven member and allow the driven member and foot part to be driven by the driving member about the axis for length adjustment of the leg.

11. An apparatus for adjusting the height of a cabinet, appliance, or structure above a supporting surface comprising:

a height adjustable leg that has a longitudinal axis and that comprises a foot part comprising a driven member able to be rotated relative to the supporting surface about the longitudinal axis, and a tool comprising a handle and a driving member to rotate relative to the handle about a rotational axis of the driving member that extends in use parallel to the longitudinal axis and a torque input for applying torque to the driving member that includes a first gear drivingly coupled to the driving member, wherein the driving member and the driven member are gears that can releasably mesh together from a plurality of radial directions relative to the longitudinal axis of the leg and at a plurality of radial locations relative to the longitudinal axis of the leg, wherein the driving member and the driven member gears are helical gears, and wherein the driving member gear is vertically orientated and the rotational axis of the driving member is parallel to a rotational axis of the driven member.

12. The apparatus of claim 11, wherein the first gear is a worm gear driven by a drive shaft extending along the handle.

13. The apparatus of claim 11, wherein the tool comprises at least one extension arm, the at least one extension arm and the driving member can releasably register the tool in the longitudinal axis direction relative to the foot part to releasably hold the driving member in engagement with the driven member to allow the driving member to drive the driven member to rotate the foot part about the longitudinal axis for height adjustment of the leg without needing to rotate the handle about the longitudinal axis.

14. The apparatus of claim 11, wherein the driven member rotates about a threaded shaft.

15. The apparatus of claim 14, wherein the threaded shaft is rotationally fixed relative to the cabinet, appliance, or structure.

16. The apparatus of claim 11, wherein the foot part comprises one or more axial direction registration surfaces that are adapted to receive a portion of the tool to allow the tool to axially bear against, to aid the driven member and driving member to be operatively engaged.

17. The apparatus of claim 11, wherein the driving member is held at a constant angle relative to one or more selected from; the supporting surface and the driven member.

* * * * *